United States Patent
Tadi et al.

(10) Patent No.: US 11,989,340 B2
(45) Date of Patent: *May 21, 2024

(54) SYSTEMS, METHODS, APPARATUSES AND DEVICES FOR DETECTING FACIAL EXPRESSION AND FOR TRACKING MOVEMENT AND LOCATION IN AT LEAST ONE OF A VIRTUAL AND AUGMENTED REALITY SYSTEM

(71) Applicant: MINDMAZE GROUP SA, Lausanne (CH)

(72) Inventors: Tej Tadi, Lausanne (CH); Robert Leeb, Lausanne (CH); Nicolas Bourdaud, Lausanne (CH); Leandre Bolomey, Lausanne (CH); Gangadhar Garipelli, Lausanne (CH); Skander Mensi, Lausanne (CH); Julien Pilet, Lausanne (CH); Dat Ngo, Lausanne (CH); Yann Lebrun, Lausanne (CH); Arthur Giroux, Lausanne (CH); Sylvain Cardin, Lausanne (CH); Nicolas Merlini, Lausanne (CH)

(73) Assignee: MINDMAZE GROUP SA, Lausanne. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/163,327

(22) Filed: Jan. 29, 2021

(65) Prior Publication Data

US 2022/0011864 A1  Jan. 13, 2022
US 2023/0367389 A9  Nov. 16, 2023

Related U.S. Application Data

(63) Continuation of application No. 16/678,163, filed on Nov. 8, 2019, now abandoned, which is a
(Continued)

(51) Int. Cl.
*G06F 3/01* (2006.01)
*G06F 3/0346* (2013.01)
(Continued)

(52) U.S. Cl.
CPC .............. *G06F 3/012* (2013.01); *G06F 3/015* (2013.01); *G06F 3/017* (2013.01); *G06F 3/0346* (2013.01);
(Continued)

(58) Field of Classification Search
CPC .......... G06F 3/015; G06F 3/012; G06F 3/017; G06F 3/0346; G06F 18/214; G06F 18/22;
(Continued)

(56) References Cited

U.S. PATENT DOCUMENTS 4,248,244 A  2/1981 Charnitski
4,856,891 A  8/1989 Pflibsen
(Continued)

FOREIGN PATENT DOCUMENTS

CN  101579238  11/2009
CN  102436662  5/2012
(Continued)

OTHER PUBLICATIONS

Office Action (Non-Final Rejection) dated Dec. 21, 2021 for U.S. Appl. No. 17/000,671 (pp. 1-14).
(Continued)

*Primary Examiner* — Grant Sitta
(74) *Attorney, Agent, or Firm* — GRAESER ASSOCIATES INTERNATIONAL INC.; Dvorah Graeser

(57) ABSTRACT

Systems, methods, apparatuses and devices for detecting facial expressions according to EMG signals for a virtual and/or augmented reality (VR/AR) environment, in combi-
(Continued)

nation with a system for simultaneous location and mapping (SLAM), are presented herein.

16 Claims, 59 Drawing Sheets

Related U.S. Application Data continuation of application No. 16/261,693, filed on Jan. 30, 2019, now Pat. No. 10,521,014, which is a continuation-in-part of application No. PCT/IB2018/000524, filed on Jan. 19, 2019.

(60) Provisional application No. 62/481,760, filed on Apr. 5, 2017, provisional application No. 62/448,373, filed on Jan. 19, 2017.

(51) Int. Cl.
*G06F 18/2132* (2023.01)
*G06F 18/214* (2023.01)
*G06F 18/22* (2023.01)
*G06F 18/2415* (2023.01)
*G06F 18/2453* (2023.01)
*G06F 18/25* (2023.01)
*G06V 40/10* (2022.01)
*G06V 40/16* (2022.01)

(52) U.S. Cl.
CPC ............ *G06F 18/214* (2023.01); *G06F 18/22* (2023.01); *G06F 18/24155* (2023.01); *G06F 18/2453* (2023.01); *G06F 18/254* (2023.01); *G06V 40/10* (2022.01); *G06V 40/174* (2022.01); *G06V 40/176* (2022.01); *G06F 18/21326* (2023.01); *G06F 2218/02* (2023.01); *G06F 2218/04* (2023.01); *G06F 2218/08* (2023.01); *G06F 2218/12* (2023.01); *G06V 40/15* (2022.01)

(58) Field of Classification Search
CPC ........... G06F 18/24155; G06F 18/2453; G06F 18/254; G06F 18/21326; G06F 2218/02; G06F 2218/04; G06F 2218/08; G06F 2218/12; G06K 9/00503; G06K 9/0051; G06K 9/00523; G06K 9/00536; G06K 9/6215; G06K 9/6256; G06K 9/6278; G06K 9/6287; G06K 9/6292; G06K 2009/6237; G06V 40/10; G06V 40/174; G06V 40/176; G06V 40/15; G06V 40/175
See application file for complete search history.

(56) References Cited

U.S. PATENT DOCUMENTS

| | | | |
|---|---|---|---|
| 4,876,541 A | 10/1989 | Storer | |
| 5,767,941 A | 6/1998 | Ferguson | |
| 5,771,238 A | 6/1998 | Sutton | |
| 6,078,361 A | 6/2000 | Reddy | |
| 6,233,017 B1 | 5/2001 | Chaddha | |
| 6,266,930 B1 | 7/2001 | Kitabatake | |
| 6,404,817 B1 | 6/2002 | Saha | |
| 6,409,602 B1 | 6/2002 | Wiltshire | |
| 6,434,695 B1 | 8/2002 | Esfahani | |
| 6,785,574 B2 | 8/2004 | Kajitani | |
| 6,929,549 B1 | 8/2005 | Yamada | |
| 7,274,368 B1 | 9/2007 | Keslin | |
| 7,554,549 B2 | 6/2009 | Sagar | |
| 8,130,225 B2 | 3/2012 | Sullivan | |
| 8,132,826 B2 | 3/2012 | Schindzielorz | |
| 8,144,153 B1 | 3/2012 | Sullivan | |
| 8,194,632 B2 | 6/2012 | Lin | |
| 8,493,286 B1 | 7/2013 | Agrama | |
| 8,908,960 B2 | 12/2014 | Sullivan | |
| 9,037,530 B2 | 5/2015 | Tan | |
| 9,155,487 B2 | 10/2015 | Linderman | |
| 9,191,643 B2 | 11/2015 | Sweeney | |
| 9,275,487 B1 | 3/2016 | Van Gelder | |
| 9,314,692 B2 | 4/2016 | Konoplev | |
| 9,351,658 B2 | 5/2016 | Lee | |
| 9,389,694 B2 | 7/2016 | Ataee | |
| 9,552,510 B2* | 1/2017 | Li | G06V 40/174 |
| 9,622,703 B2 | 4/2017 | Badower | |
| 9,817,498 B2 | 11/2017 | Song | |
| 9,928,633 B2 | 3/2018 | Cotter | |
| 9,968,264 B2* | 5/2018 | Tzvieli | A61B 5/411 |
| 10,013,605 B1 | 7/2018 | Oakes, III | |
| 10,120,413 B2 | 11/2018 | Aimone | |
| 10,154,810 B2 | 12/2018 | Tzvieli | |
| 10,156,949 B2 | 12/2018 | Lee | |
| 10,235,807 B2 | 3/2019 | Thomas | |
| 10,485,471 B2 | 11/2019 | Ray | |
| 10,515,474 B2* | 12/2019 | Tadi | G06K 9/00536 |
| 10,521,014 B2* | 12/2019 | Tadi | G06F 3/017 |
| 10,835,167 B2 | 11/2020 | Voss | |
| 10,943,100 B2* | 3/2021 | Tadi | G06V 40/174 |
| 11,000,669 B2* | 5/2021 | Derungs | A61B 5/0205 |
| 11,105,696 B2* | 8/2021 | Mariani | A43B 3/44 |
| 11,195,316 B2 | 12/2021 | Tadi | |
| 11,295,470 B2 | 4/2022 | Condolo | |
| 11,328,533 B1* | 5/2022 | Tadi | G06N 20/00 |
| 11,367,198 B2 | 6/2022 | Tadi | |
| 11,464,449 B2 | 10/2022 | Koivumaa | |
| 11,495,053 B2* | 11/2022 | Tadi | G06F 18/245 |
| 11,709,548 B2 | 7/2023 | Tadi | |
| 2002/0097678 A1 | 7/2002 | Bisher | |
| 2003/0109306 A1 | 6/2003 | Karmarkar | |
| 2003/0117651 A1 | 6/2003 | Matraszek | |
| 2003/0167019 A1 | 9/2003 | Viertio-Oja | |
| 2004/0061902 A1 | 4/2004 | Tang | |
| 2004/0117513 A1 | 6/2004 | Scott | |
| 2004/0229685 A1 | 11/2004 | Smith | |
| 2005/0180613 A1 | 8/2005 | Bronstein | |
| 2006/0071934 A1 | 4/2006 | Sagar | |
| 2006/0235318 A1 | 10/2006 | Ordonez Smith | |
| 2007/0179396 A1 | 8/2007 | Le | |
| 2008/0058668 A1 | 3/2008 | Seyed Momen | |
| 2008/0065468 A1 | 3/2008 | Berg | |
| 2008/0075394 A1 | 3/2008 | Huang | |
| 2008/0181507 A1 | 7/2008 | Gope | |
| 2008/0218472 A1 | 9/2008 | Breen | |
| 2008/0292147 A1 | 11/2008 | Bronstein | |
| 2009/0326406 A1 | 12/2009 | Tan | |
| 2010/0156935 A1 | 6/2010 | Lim | |
| 2010/0211397 A1 | 8/2010 | Park | |
| 2010/0315524 A1 | 12/2010 | Gordon | |
| 2011/0181601 A1 | 7/2011 | Mumbauer | |
| 2011/0243380 A1 | 10/2011 | Forutanpour | |
| 2012/0130266 A1* | 5/2012 | Mathan | A61B 5/4833 600/544 |
| 2012/0134548 A1 | 5/2012 | Rhoads | |
| 2012/0172682 A1 | 7/2012 | Linderman | |
| 2012/0274798 A1 | 11/2012 | Takahashi | |
| 2013/0021447 A1 | 1/2013 | Brisedoux | |
| 2013/0279577 A1 | 10/2013 | Schwarz | |
| 2013/0314401 A1 | 11/2013 | Engle | |
| 2014/0043434 A1 | 2/2014 | Asano | |
| 2014/0118582 A1 | 5/2014 | Artyomov | |
| 2014/0153816 A1 | 6/2014 | Cohen | |
| 2014/0164056 A1 | 6/2014 | Johnson | |
| 2014/0249397 A1* | 9/2014 | Lake | A61B 5/296 600/386 |
| 2014/0267413 A1 | 9/2014 | Du | |
| 2014/0267544 A1 | 9/2014 | Li | |
| 2014/0323148 A1 | 10/2014 | Schmalstieg | |
| 2014/0364703 A1 | 12/2014 | Kim | |
| 2015/0178988 A1 | 6/2015 | Montserrat Mora | |
| 2015/0192950 A1 | 7/2015 | Tubbs | |
| 2015/0213646 A1 | 7/2015 | Ma | |
| 2015/0304789 A1* | 10/2015 | Babayoff | G10K 15/02 381/303 |

(56) References Cited

U.S. PATENT DOCUMENTS

| | | |
|---|---|---|
| 2015/0310262 A1 | 10/2015 | Do |
| 2015/0310263 A1 | 10/2015 | Zhang |
| 2015/0313498 A1 | 11/2015 | Coleman |
| 2015/0325004 A1 | 11/2015 | Utsunomiya |
| 2016/0042548 A1 | 2/2016 | Du |
| 2016/0077547 A1 | 3/2016 | Aimone |
| 2016/0119541 A1 | 4/2016 | Alvarado-Moya |
| 2016/0191887 A1 | 6/2016 | Casas |
| 2016/0193732 A1 | 7/2016 | Breazeal |
| 2016/0235324 A1* | 8/2016 | Mershin ............... A61B 5/6803 |
| 2016/0300252 A1 | 10/2016 | Frank |
| 2016/0317058 A1 | 11/2016 | Kaminski |
| 2016/0323565 A1 | 11/2016 | Van Baarsen |
| 2016/0328875 A1 | 11/2016 | Fang |
| 2016/0350979 A1 | 12/2016 | Zeng |
| 2016/0360970 A1 | 12/2016 | Tzvieli |
| 2017/0039750 A1 | 2/2017 | Tong |
| 2017/0060256 A1 | 3/2017 | Heck |
| 2017/0069094 A1 | 3/2017 | Kim |
| 2017/0109864 A1 | 4/2017 | Ohba |
| 2017/0140578 A1 | 5/2017 | Xiao |
| 2017/0205903 A1 | 7/2017 | Miller |
| 2017/0231490 A1 | 8/2017 | Toth |
| 2017/0347908 A1 | 12/2017 | Watanabe |
| 2017/0352183 A1 | 12/2017 | Katz |
| 2017/0364374 A1 | 12/2017 | Maiden |
| 2017/0367590 A1 | 12/2017 | Sebe |
| 2018/0027222 A1 | 1/2018 | Ogasawara |
| 2018/0107275 A1 | 4/2018 | Chen |
| 2018/0120936 A1 | 5/2018 | Keller |
| 2018/0139431 A1 | 5/2018 | Simek |
| 2018/0204356 A1 | 7/2018 | Xia |
| 2018/0211102 A1 | 7/2018 | Alsmadi |
| 2018/0211398 A1 | 7/2018 | Schmidt |
| 2018/0225866 A1 | 8/2018 | Zhang |
| 2018/0239956 A1 | 8/2018 | Tadi |
| 2018/0240261 A1 | 8/2018 | Tadi |
| 2018/0262744 A1 | 9/2018 | Tadi |
| 2018/0325447 A1 | 11/2018 | Hriso |
| 2018/0335930 A1 | 11/2018 | Scapel |
| 2019/0001129 A1 | 1/2019 | Rosenbluth |
| 2019/0004639 A1 | 1/2019 | Faulkner |
| 2019/0025919 A1 | 1/2019 | Tadi |
| 2019/0029528 A1 | 1/2019 | Tzvieli |
| 2019/0082990 A1 | 3/2019 | Poltorak |
| 2019/0138096 A1* | 5/2019 | Lee ........................ G10L 25/51 |
| 2019/0150777 A1 | 5/2019 | Guo |
| 2019/0155386 A1 | 5/2019 | Tadi |
| 2019/0188281 A1 | 6/2019 | Bivens |
| 2019/0200888 A1 | 7/2019 | Poltorak |
| 2019/0212752 A1 | 7/2019 | Fong |
| 2019/0369727 A1 | 12/2019 | Li |
| 2020/0069941 A1 | 3/2020 | Campean |
| 2020/0129855 A1 | 4/2020 | Ambinder |
| 2020/0129856 A1 | 4/2020 | Bond |
| 2020/0162719 A1 | 5/2020 | Tadi |
| 2020/0177870 A1 | 6/2020 | Tadi |
| 2020/0193614 A1 | 6/2020 | Tadi |
| 2020/0254613 A1 | 8/2020 | Condolo |
| 2020/0319710 A1 | 10/2020 | Tadi |
| 2020/0320765 A1 | 10/2020 | Tadi |
| 2020/0410702 A1 | 12/2020 | Zhang |
| 2021/0145302 A1 | 5/2021 | Kaminski |
| 2021/0174071 A1 | 6/2021 | Tadi |
| 2022/0171960 A1 | 6/2022 | Nelson |
| 2022/0172710 A1 | 6/2022 | Brady |
| 2022/0182598 A1 | 6/2022 | Tadi |
| 2023/0020138 A1 | 1/2023 | Bouton |
| 2023/0078978 A1 | 3/2023 | Tadi |
| 2023/0333635 A1 | 10/2023 | Tadi |
| 2023/0398356 A1* | 12/2023 | Poltorak ............ A61N 1/36031 |
| 2023/0418380 A1 | 12/2023 | Tadi |

FOREIGN PATENT DOCUMENTS

| | | |
|---|---|---|
| CN | 102892008 | 1/2013 |
| CN | 103810463 | 5/2014 |
| CN | 104460955 | 3/2015 |
| CN | 104504366 | 4/2015 |
| CN | 104834917 | 8/2015 |
| CN | 106095101 | 11/2016 |
| CN | 106569591 | 4/2017 |
| DE | 102011052836 | 2/2012 |
| EP | 1032872 | 9/2000 |
| EP | 1433118 | 6/2004 |
| EP | 2118757 | 11/2009 |
| EP | 2453658 | 5/2012 |
| EP | 2808760 | 12/2014 |
| EP | 3064130 A1 | 9/2016 |
| EP | 3155560 | 4/2017 |
| JP | 2016126500 | 7/2016 |
| KR | 20120094857 | 8/2012 |
| KR | 101307046 | 7/2013 |
| KR | 20150057424 | 5/2015 |
| KR | 20150099129 | 8/2015 |
| KR | 101585561 | 1/2016 |
| KR | 20160053749 | 5/2016 |
| WO | 2008108965 | 9/2008 |
| WO | 2015025251 | 2/2015 |
| WO | 2015192117 | 12/2015 |
| WO | 2016034008 | 3/2016 |
| WO | 2016083826 | 6/2016 |
| WO | 2016165052 | 10/2016 |
| WO | 2017015949 | 2/2017 |
| WO | 2018146546 A1 | 8/2018 |

OTHER PUBLICATIONS

Ahsan, R., Md., et.al., EMG Signal Classification for Human Computer Interaction: A Review, European Journal of Scientific Research vol. 33, No. 3 (2009) pp. 1-23 of pdf.

AlZoubi, O. et.al. Classification of EEG for Affect Recognition: An Adaptive Approach, Conference Paper, Dec. 2009, pp. 1-11pdf.

AlZoubi, O., et al., Classification of EEG for Affect Recognition: An Adaptive Approach, Conference Paper, Dec. 2009, pp. 52-61.

Angkoon P., et at., The Relationship between Anthro-pometric Variables and Features of Electromyography Signal for Human-Computer Interface. Dr. Ganesh Naik. Applications, Challenges, and Advancements in Electromyography Signal Processing, IGI Global, 2014, 9781466660908, pp. 1-28.

Barreto, A. B. PhD., A practical EMG-based human-computer interface for users with motor disabilities, Journal of Rehabilitation Research and Development, vol. 37, No. 1 Jan./Feb. 2000, pp. 53-64.

Bartlett, M., et al., Automatic Analysis of Spontaneous Facial Behavior: A Final Project Report, Jan. 2001, pp. 1-40.

Cristhian Manuel Duran Acevedo et.al., Development of an Embedded System for Classification of EMG Signals, 2014, pp. 1-5 of pdf.

Dr Jan et al., "Fusion of Terrestrial LiDAR Point Clouds with Color Imagery", (Mar. 16, 2013), URL: http://www.cis.rit.edu/DocumentLibrary/admin/uploads/CIS000202.PDF, XP055284936.

Dubuisson, S., et al., A solution for facial expression representation and recognition, Signal Processing Image Communication 17 (2002) pp. 657-673.

Gillies, M., et.al., Semi-Autonomous Avatars: A New Direction for Expressive User Embodiment, https://doi.org/10.1075/aicr.74.17gil, Published online: Nov. 27, 2008, pp. 1-20.

Giuseppina, Carla Gini, et al., New Results on Classifying EMG Signals for Interfacing Patients and Mechanical Devices, New Trends in Medical and Service Robots, Mechanisms and Machines Science, vol. 20, (2014), pp. 1-16pdf.

Gruebler, A., et al., Design of a Wearable Device for Reading Positive Expressions from Facial EMG Signals, IEEE Transactions on Affective Computing, vol. 5, No. 3, Jul.-Sep. 2014, pp. 1-11 of pdf.

Hamedi, M., et.al. Time-Frequency Facial Gestures EMG Analysis using Bilinear Distribution, Conference Paper Nov. 2015, pp. 1-6 of pdf.

(56) References Cited

OTHER PUBLICATIONS

Hema, C.R. et al., Classification of Human Emotional States using Facial Electromyogram signals, Conference: International Post Graduate Research Conference ENGGPOS 2015 At: Karpagam University, Coimbatore, Mar. 2015, pp. 1-7.

Hsieh, C., et al., Effective Semantic features for facial expressions recognition using SVM, International Journal of Multimedia Tools and Applications, Mar. 2015, pp. 1-23pdf.

Huang, C., The Review of Applications and Measurements in Facial Electromyography, Journal of Medical and Biological Engineering vol. 25, No. 1 (2005), pp. 15-20.

Krepki, R., et al., Berlin Brain-Computer Interface (BBCI) towards a new communication channel for online control multimedia, Jan. 2003, pp. 1-30 pdf.

Lopez, N., Hybrid Human-Machine Interface to Mouse Control for Severely Disabled People, International Journal of Engineering and Innovative Technology, vol. 4 Iss. May 11, 2015, pp. 1-9 of pdf.

Mantoro, T., Distributed Support for Intelligent Environments, Apr. 2006, pp. 1-204.

Martisius, I., Design of a Neural Interface Based System for Control of Robotic Devices, Communications in Computer and Information Science, Sep. 2012, pp. 297-311.

Mohammad-Rezazadeh, I., et al., A novel human-machine interface based on multi-channel facial bioelectric signals, Australasian Physical & Engineering Sciences in Medicine vol. 34, No. 4, (2011) pp. 497-513.

Mohd-Yasin, F., et al., Techniques of EMG signal analysis: Detection, processing, classification and applications,Biological Procedures Online, Feb. 1997-2006, pp. 1-22 www.biologicalprocedures.com.

Notice of Allowance dated Aug. 3, 2021 for U.S. Appl. No. 16/678,182 (pp. 1-10).

Notice of Allowance dated Aug. 8, 2019 for U.S. Appl. No. 16/261,693 (pp. 1-9).

Notice of Allowance dated May 7, 2020 for U.S. Appl. No. 15/875,227 (pp. 1-11).

Novak, D., et al., A survey of methods for data fusion and system adaptation using autonomic nervous system responses in physiological computing, Interacting with Computers vol. 24 (2012) 154-172.

Office Action (Notice of Allowance and Fees Due (PTOL-85)) dated Nov. 26, 2021 for U.S. Appl. No. 16/582,675 (pp. 1-6).

Office Action dated Apr. 24, 2019 for U.S. Appl. No. 15/875,382 (pp. 1-23).

Office Action dated Apr. 30, 2019 for U.S. Appl. No. 16/261,693 (pp. 1-15).

Office Action dated Aug. 16, 2019 for U.S. Appl. No. 15/875,227 (pp. 1-12).

Office Action dated Jan. 11, 2018 for U.S. Appl. No. 15/875,306 (pp. 1-22).

Office Action dated Jan. 22, 2021 for U.S. Appl. No. 16/678,182 (pp. 1-6).

Office Action dated Jul. 31, 2020 for U.S. Appl. No. 16/678,163 (pp. 1-10).

Office Action dated Jul. 9, 2020 for U.S. Appl. No. 16/678,182 (pp. 1-8).

Office Action dated Oct. 18, 2021 for U.S. Appl. No. 16/243,186 (pp. 1-6).

Podrug, E., et al., Surface EMG pattern recognition by using DWT feature extraction and SVM classifier, First Conference of Medical and Biological Engineering in Bosnia and Herzegovina, CMBEBIH 2015, pp. 1-4 pdf.

Putze, F., et.al. Online Recognition of Facial Actions for Natural EEG-Based BCI Applications, Conference Paper Jan. 2011, pp. 1-11 of pdf.

Quan, W., et al., Facial Expression Biometrics Using Statistical Shape Models, Journal on Advances in Signal Processing, vol. 2009, Article ID 261542, pp. 1-18.

Rechy-Ramirez, E.J., et al., Bio-signal based control in assistive robots: a survey, Digital Communications and Networks vol. 1 (2015) 1-18 pdf.

Sheikh, M., Robust Recognition of Facial Expressions on Noise Degraded Facial Images, Thesis, Feb. 2011, pp. 1-129.

Sorci, M., et al., Fisher's Discriminant and Relevant Component Analysis for Static Facial Expression Classification, 15th European Signal Processing Conference (EUSIPCO 2007) pp. 115-119.

Surendran, N.K., et al., Towards Real-Time Facial Expression Recognition, Jan. 2006, pp. 1-9 pdf.

Zhang, X., et al. A real-time, practical sensor fault-tolerant module for robust EMG pattern recognition, Journal of NeuroEngineering and Rehabilitation (2015) pp. 1-16 pdf.

Office Action (Notice of Allowance and Fees Due (PTOL-85)) dated Aug. 17, 2022 for U.S. Appl. No. 17/000,671 (pp. 1-9).

Patel "Human Computer Interaction Based HEMD Using Hand Gesture" SSRN Electronic Journal (May 1, 2017) pp. 1-5.

Office Action (Non-Final Rejection) dated Sep. 14, 2022 for U.S. Appl. No. 17/474,078 (pp. 1-18).

Ye Mao et al, "Real-Time Simultaneous Pose and Shape Estimation for Articulated Objects Using a Single Depth Camera", IEEE Transactions on Pattern Analysis and Machine Intelligence, IEEE Computer Society, USA, vol. 38, No. 8, doi:10.1109/TPAMI.2016.2557783, ISSN 0162-8828, (Aug. 1, 2016), pp. 1517-1532, (Jun. 30, 2016), XP011615574.

Ye Minxiang et al, "A Depth Camera Motion Analysis Framework for Tele-rehabilitation: Motion Capture and Person-Centric Kinematics Analysis", IEEE Journal of Selected Topics in Signal Processing, IEEE, US, vol. 10, No. 5, doi:10.1109/JSTSP.2016.2559446, ISSN 1932-4553, (Aug. 1, 2016), pp. 877-887, (Jul. 25, 2016), XP011617833.

Ye Minxiang et al, "Gait analysis using a single depth camera", 2015 IEEE Global Conference on Signal and Information Processing (GLOBALSIP), IEEE, (Feb. 14, 2015), doi:10.1109/GLOBALSIP.2015.7418202, pp. 285-289, XP032871663.

Merriam Webster Online Dictionary; "synchonize"; obtained Apr. 22, 2023; available at https://www.merriam-webster.com/dictionary/synchronize (Year: 2023) 1 page.

Notice of Allowance dated Feb. 16, 2023 for U.S. Appl. No. 17/940,163 (pp. 1-11).

Office Action (Final Rejection) dated Apr. 26, 2023 for U.S. Appl. No. 17/474,078 (pp. 1-21).

Poynton, Charles, Digital Video and HD Algorithms and Interfaces, 2nd Edition, Published by Morgan Kaufmann Waltham, MA 2012. ISBN 978-0-12-391926-7. 46 pages.

Poynton, Charles, Digital Video and HDTV Algorithms and Interfaces, Published by Morgan Kaufmann Waltham, MA 2003. ISBN-13: 978-1-55860-792-7. 112 pages.

Poynton, Charles, Merging Computing with Studio Video; Converting between R'G'B and 4:2:2, Copyright Mar. 19, 2004, Discreet Logic, www.discreet.com. 8 pages.

Random House Webster's College Dictionary, 2nd Edition, Published by Random House 1997. p. 1260. ISBN -0-679-45570-1. 3 pages.

Random House Webster's College Dictionary, 2nd Edition, Published by Random House 1997. p. 343. ISBN -0-679-45570-1. 3 pages.

Rechy-Ramirez, Ericka Janet, and Huosheng Hu. "Stages for Developing Control Systems using EMG and EEG signals: A survey." School of computer science and electronic engineering, University of Essex (2011): 1744-8050.

Schmidt, Brian, et al., The Interactive Performance of SLIM: a stateless, thin-client architecture, Dec. 12-15, 1999, 17th ACM Symposium on Operating Systems Principles (SOSP'99), Kiawah Island Resort, Charleston, SC., 20 pages, ACM ISBN: 1-58113-140-2.

Shelly, et al., Discovering Computers Fundamentals, 4th Edition. Thomson Course Technology, Boston, MA, 2008. ISBN 10-1-4239-1209-8. 37 pages.

*Sony Interactive Entertainment LLC v. Intellectual Pixels Limited*, IPR 2020-01248, U.S. Pat. No. 8,667,093, Oct. 15, 2021, Demonstratives Final Exhibit. 44 pages.

(56) References Cited

OTHER PUBLICATIONS

*Sony Interactive Entertainment LLC* v. *Intellectual Pixels Limited*, IPR 2021-00237, U.S. Pat. No. 10,681,109, patent Owner's Sur-Reply, dated Jan. 14, 2022. 33 pages.
*Sony Interactive Entertainment LLC* v. *Intellectual Pixels Limited*, IPR 2021-00237, U.S. Pat. No. 8,667,093, Petitioner's Demonstrative Exhibits for Oral Hearing, Oct. 7, 2021. 85 pages.
*Sony Interactive Entertainment LLC* v. *Intellectual Pixels Limited*, IPR 2021-00237, U.S. Pat. No. 8,667,093, Petitioner's Supplemental Reply, Aug. 26, 2021. 5 pages.
SOSP.org, The AMC Symposium on Operating Systems Principles (SOSP) List of Conferences held around the world from 1967 thru 2019 includes the Proceedings/Website for each conference. 2 pages.
*Storer* v. *Hayes Microcomputer Products*, Inc. 960 F.Supp. 498 (1997). Civil Action No. 96-10602-WGY. Mar. 25, 1997. Westlaw. 17 pages.
Syed, Ahamed, V. et al., Digital Subscriber Line (HDSL and ADSL) Capacity of the Outside Loop Plant, IEEE Journal on Selected Areas in Communications, vol. 13, No. 9, Dec. 1995. 10 pages.
The Authoritative Dictionary of IEEE Standards Terms, 7th Edition, Published by Standards Information Network IEEE Press 2000, ISBN 0-7381-2601-2. 4 pages.
The IEEE Standard Dictionary of Electrical and Electronics Terms, Sixth Edition, IEEE Std 100-1996. 5 pages. ISBN 1-55937-833-6.
The Way Back Machine: https://web.archive.org/web/20001209203600/ http://www.webartz.com/fourcc/fccyuv.htm printed on Apr. 13, 2021. FOURCC Definition List (YUV Formats). 9 pages.
The Way Back Machine: https://web.archive.org/web/20001214035600/ http:/webartz.com/fourcc/fcccodec.htm printed on Apr. 13, 2021. Compressed Formats. 7 pages.
The Way Back Machine: https://web.archive.org/web/20001214063500/ http:/webartz.com/fourcc/fccintro.htm printed on Apr. 13, 2021. The Almost Definitive FOURCC Definition List. 3 pages.
The Way Back Machine: https://web.archive.org/web/20001206225500/ http://www.microsoft.com/hwdev/devdes/fourcc.htm printed on Apr. 13, 2021. FOURCC for Video Compression. 5 pages.
Tolly, Kevin, the Great Networking Correction: Frames Reaffirmed, Published IEEE 1997, doi 1089-7801/97. 8 pages.
Understand the concept of bpp and Mbps to define your compressed data rate! Accessed Mar. 31, 2021. https://www.intopix.com/blogs/post/How-to-define-the-compression-rate-according-to-bpp-or-bps 7 pages.
Wang, Zhenyu, et al., Task Driven Computing, School of Computer Science, Carnegie Mellon University, Pittsburg, PA, May 2000, CMU-CS-00-154, 22 Pages.
Webster's New World Dictionary of Computer Terms, 5th Edition, Published by MacMillian 1994, ISBN: 0-671-89993-7. 3 pages.
Ye Mao et al.: "Real-Time Simultaneous Pose and Shape Estimation for Articulated Objects Using a Single Depth Camera", IEEE Transactions On Pattern Analysis and Machine Intelligence, IEEE Computer Society, USA, vol. 38, No. 8, Aug. 1, 2016 (Aug. 1, 2016), pp. 1517-1532, XP011615574, ISSN: 0162-8828, DOI: 10.1109/TPAMI.2016.2557783 [retrieved on Jun. 30, 2016].
Ye, Minxiang, et al. "A depth camera motion analysis framework for tele-rehabilitation: Motion capture and person-centric kinematics analysis." IEEE Journal of Selected Topics in Signal Processing 10.5 (2016): 877-887.
Ye, Minxiang, et al. "Gait analysis using a single depth camera." 2015 IEEE Global Conference on Signal and Information Processing (GlobalSIP). IEEE, 2015.
17th ACM Symposium on Operating Systems Principles, Final Program of the event. Dec. 12-15, 1999. 5 pages.
17th ACM Symposium on Operating Systems Principles, Invitation to submit papers to the event. Dec. 12-15, 1999. 2 pages.
ACM History, copyright 2020, ACM, Inc. 7 pages. https://www.acm.org/about-acm/acm-history.
AlZoubi, Omar, Sidney K. D'Mello, and Rafael A. Calvo. "Detecting naturalistic expressions of nonbasic affect using physiological signals." IEEE Transactions on affective computing 3.3 (2012): 298-310.
Bishop, Gary, et al., Frameless Rendering: Double Buffering Considered Harmful, Department of Computer Science, UNC Chapel Hill. 2 pages.
CCITT The International Telegraph and Telephone Consultative Committee, Series H: Audiovisual and Multimedia Systems coding of moving video. Published in Blue Book, Fascicle III.Nov. 6, 1988. 14 pages.
Chen, Walter Y., The Development and Standardization of Asymmetrical Digital Subscriber Line, IEEE Communications Magazine, May 1999, vol. 37, No. 5, pp. 68-72, www.comsoc.org.
Chinese Office Action issued in App. No. CN201880018740, dated Mar. 30, 2023, 14 pages.
Chinese Office Action issued in App. No. CN201880023942.8, dated Jan. 18, 2023, 21 pages.
Chroma Subsampling, https://www.haivision.com, copyright 2021. 4 pages.
Communication pursuant to Rule 164(2)(b) and Article 94(3) issued in App. No. EP18733666, dated Dec. 9, 2022, 10 pages.
CU Amiga Magazine, Mar. 1998, Quake Amiga article pp. 38-42, 8 pages.
Danciu, Ioana M., et al., Fractal Color Compression in the L*a*b* Uniform color Space*, School of EECS Washington State University, Pullman WA. 1 page.
Encyclopedia of Computer Science, 4th Edition, Nature Publishing Group, NY, NY 2000. ISBN 0-333-77879-0. 29 pages.
Endo, Yasuhiro. 2000. Improving Interactive System Performance using TIPME. Harvard Computer Science Group Technical Report TR-12-99. 120 pages.
EP Examination Report issued in App. No. EP18715953, 5 pages.
Exhibit: *Sony 1024, Sony* v. *IPL*, IPR2021-00237, Picture of tables shown at Hart Deposition.
FCC Record, vol. 15., No. 27, pp. 17132-17922, Sep. 5-Sep. 15, 2000. 149 pages.
Foley, et al., Computer Graphics Principles and Practice, 2nd Edition in C, The Systems programming Series, Addison-Wesley Publishing, 1992, 1993 and 1995. ISBN 0-201-84840-6. 32 pages.
Fuchs, Henry, Beyond the Desktop Metaphor: Toward More Effective Display, Interaction, and Telecollaboration in the Office of the Future via a Multitude of Sensors and Displays. Department of Computer Science University of North Carolina at Chapel Hill. AMCP'98, Lncs 1554, pp. 30-43, 1999. 14 pages.
Gormish, Michael, et al., Proceedings of SPIE—Lossless And Nearly Lossless Compression For High-Quality Images, Proc. SPIE 3025, Very High Resolution and Quality Imaging **, (Apr. 4, 1997); doi: 10.1117/12/270058. 10 pages.
IEEE 802.Mar. 1998—IEEE Standards for Information technology—Telecommunications and information exchange between systems—Local and metropolitan area networks-Specific requirements-Part 3: Carrier Sense Multiple Access with Collision Detection (CSMA/CD) Access Method and Physical Layer Specifications. Published Sept, 28, 1998. 2 pages.
IEEE Compcon 97, San Jose California, Feb. 23-26, 1997, IEEE Computer Society Press Los Alamitos, CA, 1997. 20 pages. ISBN 0-8186-7804-6.
IEEE Standards for Local Area Networks: Carrier Sense Multiple Access with Collision Detection (CSMA/CD) Access Method and Physical Layer Specifications, Published by The Institute of Electrical and Electronics Engineers, Inc., Jun. 24, 1983, 145 pages. ISBN 0-471-82749-5.
IEEE Std. 802.3 1998 Edition, Part 3: Carrier Sense Multiple Access with Collision Detection (CSMA/CD) Access Method and Physical Layer Specifications, ISBN 0-7381-0330-6, 263 pages. Part 2 of 3.
IEEE Std. 802.3 1998 Edition, Part 3: Carrier Sense Multiple Access with Collision Detection (CSMA/CD) Access Method and Physical Layer Specifications, ISBN 0-7381-0330-6, 499 pages. Part 2 of 3.
IEEE Std. 802.3 1998 Edition, Part 3: Carrier Sense Multiple Access with Collision Detection (CSMA/CD) Access Method and Physical Layer Specifications, ISBN 0-7381-0330-6, 500 pages. Part 1 of 3.

(56) References Cited

OTHER PUBLICATIONS

Indian Examination Report issued in App. No. IN201927035579, dated Jan. 11, 2022, 7 pages.
Indian Examination Report issued in App. No. IN201927035792, dated Apr. 20, 2023, 6 pages.
*Intellectual Pixels Limited v. Sony Interactive Entertainment LLC*, Case SACV 19-01432 JVS (KES), Document 104, Page ID #4160, Filed May 12, 2020, Order Regarding Claim Constructions. 22 pages.
*Intellectual Pixels Limited v. Sony Interactive Entertainment LLC*, Case SACV 19-01432 JVS (KES), Document 112, Page ID #4301, Filed Jul. 2, 2020, Order Regarding Motion for Clarification or in the Alternative, Reconsideration. 6 pages.
International Telecommunication Union, Transmission of Non-Telephone Signals; Information Technology—Generic Coding Of Moving Pictures And Associated Audio Information: Video. ITU-T Rec. H.262 Jul. 1995. 211 pages.
ITU/SMPTE Tutorial Digital Terrestrial Television Broadcasting (DTTB), Published by: The Society of Motion Picture and Television Engineers, White Plains, NY, 1994. ISBN 0-940690-24-1. 13 Pages.
Jasperneite, Jurgen, et al. How to Guarantee Realtime Behavior using Ethernet, Copyright IFAC Information Control Problems in Manufacturing, Salvador, Brazil, 2004. 6 pages.
Kompatsiaris, Ioannis, Using Asymmetric Digital Subscriber Line (ADSL) for Fast Internet and Multimedia Services. Published IEEE 2000, doi 0-7803-6301-9. 2 pages.
Lamothe, Andre, Tricks of the Windows Game Programming Gurus, Fundamentals of 2D and 3D Game Programming, Published by Sams, Indianapolis, IN, Oct. 1999, ISBN 0-672-31361-8, 40 pages.
Levoy, Mare. Polygon-Assisted JPEG and MPEG Compressoin of Synthetic Images, Computer Science Department Stanford University. ACM 0-89791-701-4/95/008, 8 Pages.
McDonough, Jerome P., Preservation-Worthy Digital Video, or How to Drive Your Library into Chapter 11, Presented at the Electronic Media Group Annual Meeting of the American Institute for Conservation of Historic and Artistic Works, Portland, OR, Jun. 13, 2004. 12 pages.
McVeigh, Jeff, et al., A Software-Based Real-Time MPEG-2 Video Encoder, IEEE Trtansactions on Circuites and Systems for Video Technology, vol. 10, No. 7, Oct. 2000. Doi: 1051-8215/00. 7 pages.
Microsoft Computer Dictionary, 5th Edition, Copyright 2002, ISBN 0-7356-1495-4, p. 150 and p. 538. 4 pages.
Microsoft Computer Dictionary, 5th Edition, Copyright 2002, ISBN 0-7356-1495-4, p. 224. 3 pages.
Microsoft Computer Dictionary, Fifth Edition, Published by Microsoft, Redmond, Washington, 2002. ISBN 0-7356-1495-4, 8 pages.
MPEG-2 Video, https://mpeg.chiariglione.org/standards/mpeg-2/video accessed Aug. 31, 2021, 4 pages.
Network Basics: Ethernet Protocol, https://www.dummies.com/programming/netorking/network-basics-ethernet-protocol/ Oct. 19, 2020. 2 pages.
Office Action (Notice of Allowance and Fees Due (PTOL-85)) dated Aug. 18, 2023 for U.S. Appl. No. 17/474,078 (pp. 1-8).
PC Magazine, Apr. 23, 1996, vol. 15, No. 8, 12 pages.
PC Magazine, Results for: Search PCMag Encyclopedia for "chroma subsampling", www.pcmag.com. 8 pages.
PC Magazine, Results for: Search PCMag Encyclopedia for "Windows CE", www.pcmag.com. 5 pages.
PC Magazine, vol. 18, No. 16, Sep. 21, 1999. 20 pages. www.pcmag.com.
Pokorny, Pavel, Lossy Compression in the Chroma Subsampling Process, WSEAS Transactions on Comuters, E-ISSN: 2224-2872, vol. 15, 2016. 7 pages.
Office Action (Notice of Allowance and Fees Due (PTOL-85)) dated Dec. 5, 2023 for U.S. Appl. No. 17/474,078 (pp. 1-8).
Office Action dated Nov. 22, 2023 for U.S. Appl. No. 18/317,058 (pp. 1-11).
1 Office Action (Notice of Allowance and Fees Due (PTOL-85)) dated Jan. 18, 2024 for U.S. Appl. No. 17/474,078 (pp. 1-8).

\* cited by examiner

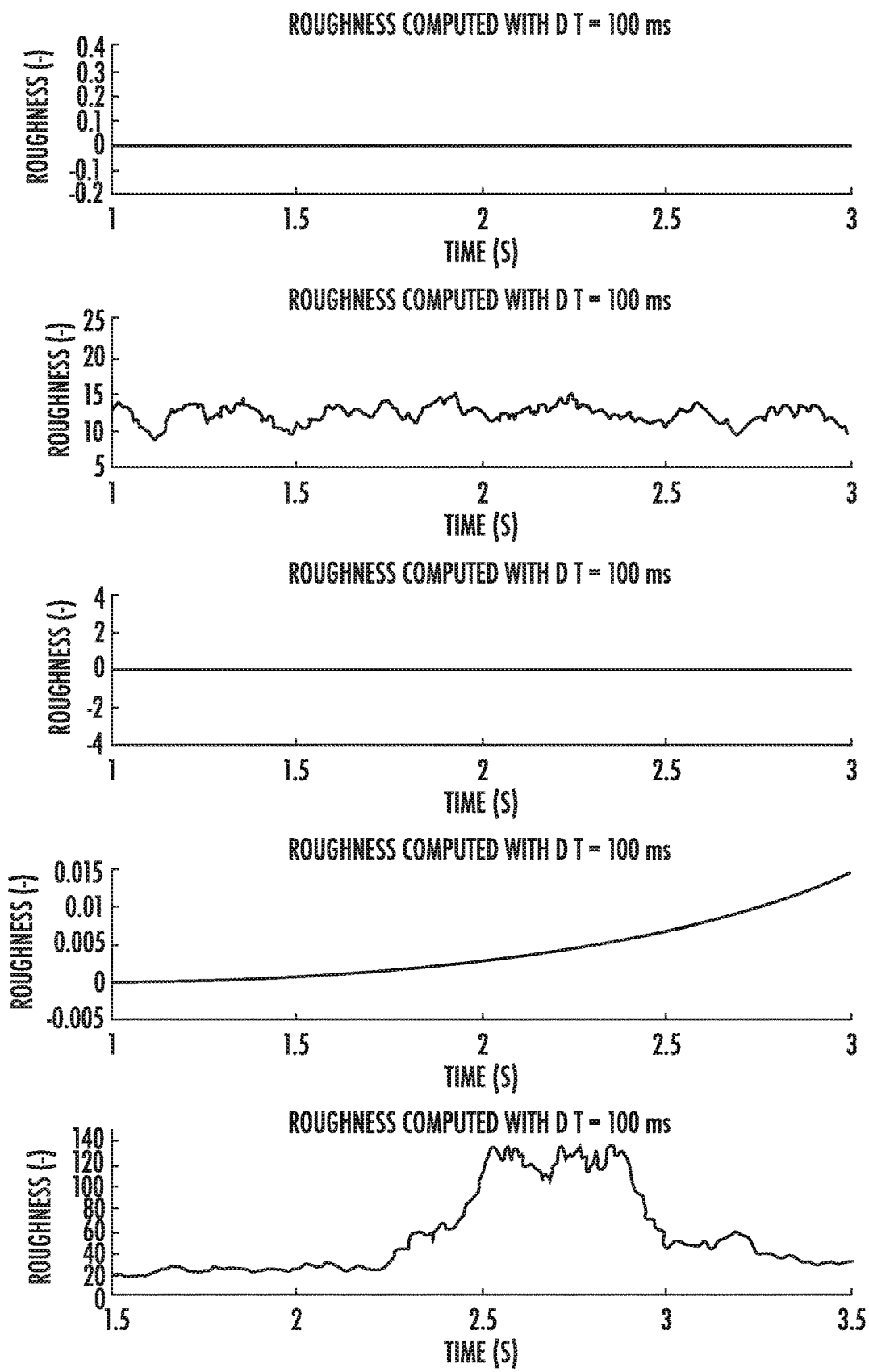
FIG. 7C CONTINUES

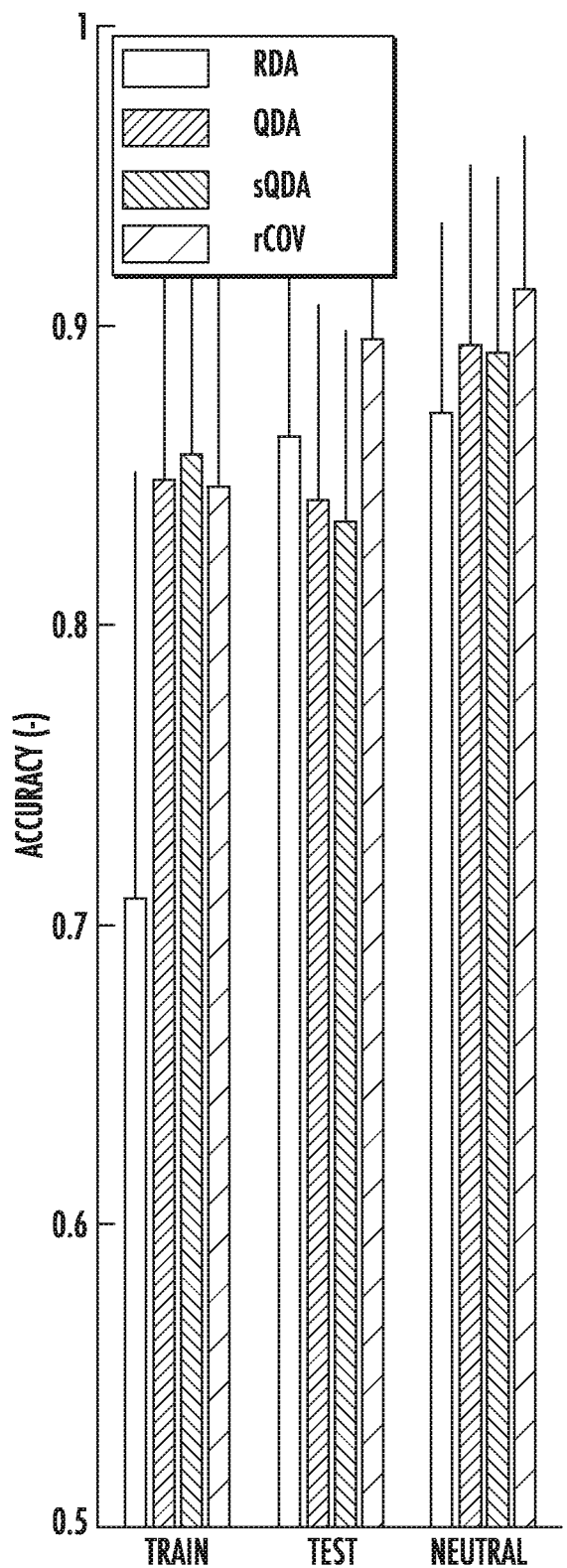
FIG. 8C CONTINUES

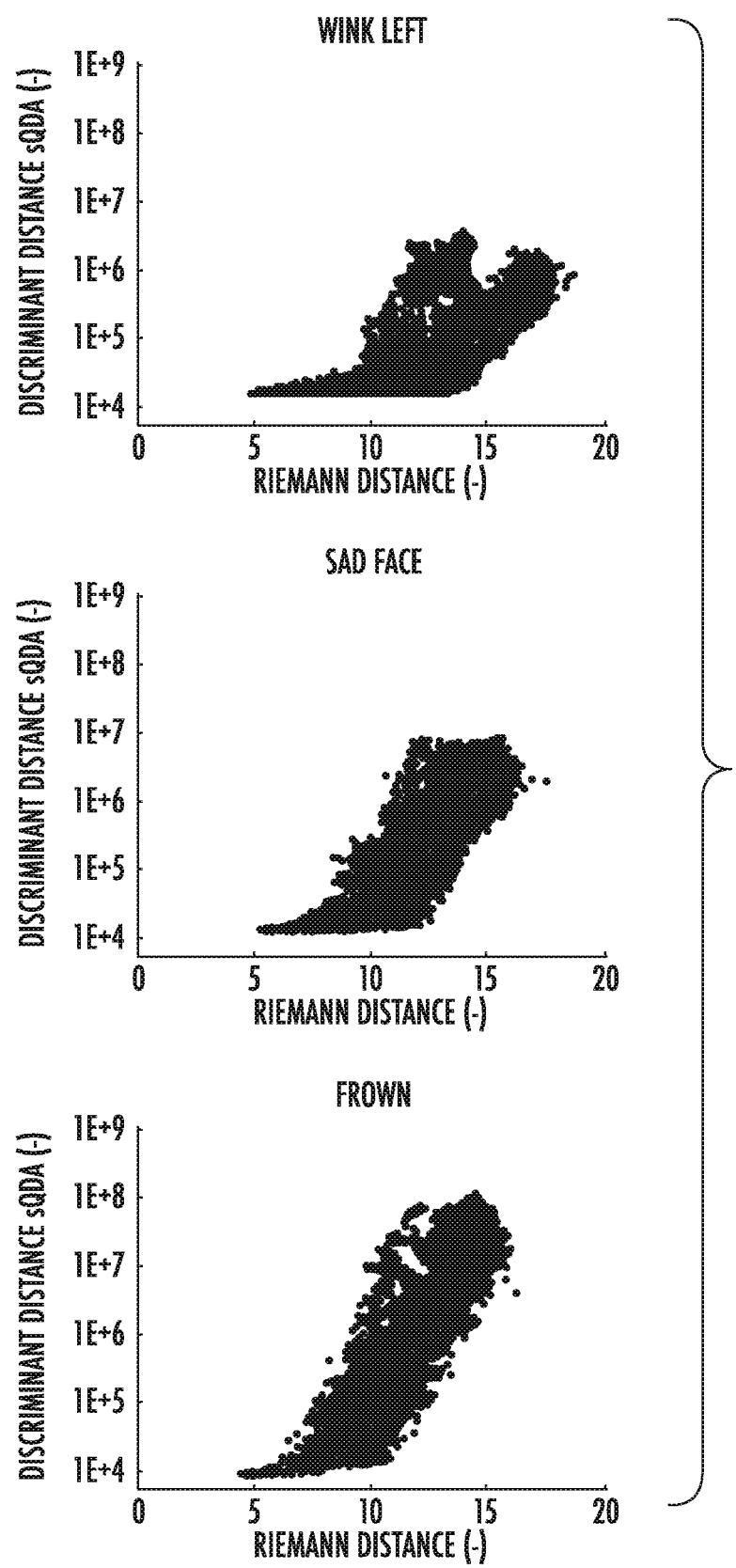
FIG. 8F CONTINUES

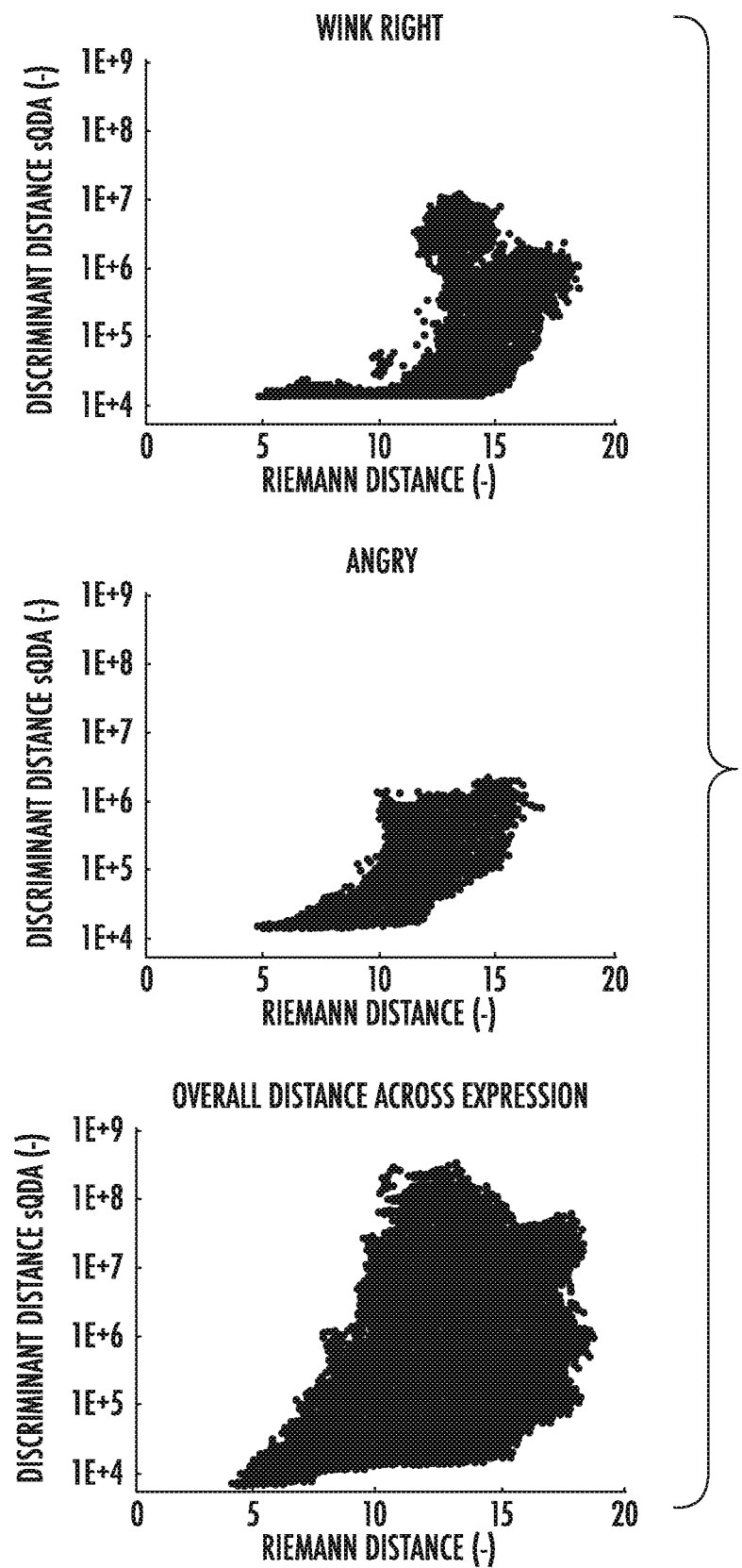
FIG. 8F CONTINUES

SYSTEMS, METHODS, APPARATUSES AND DEVICES FOR DETECTING FACIAL EXPRESSION AND FOR TRACKING MOVEMENT AND LOCATION IN AT LEAST ONE OF A VIRTUAL AND AUGMENTED REALITY SYSTEM

FIELD OF THE DISCLOSURE

The present disclosure relates to systems, methods and apparatuses for detecting muscle activity, and in particular, to systems, methods and apparatuses for detecting facial expression according to muscle activity, including for a virtual or augmented reality (AR/VR) system, as well as such a system using simultaneous localization and mapping (SLAM).

BACKGROUND OF THE DISCLOSURE

In some known systems, online activities can use user facial expressions to perform actions for an online activity. For example, in some known systems, the systems may estimate a user's facial expressions so as to determine actions to perform within an online activity. Various algorithms can be used to analyze video feeds provided by some known systems (specifically, to perform facial recognition on frames of video feeds so as to estimate user facial expressions). Such algorithms, however, are less effective when a user engages in virtual or augmented reality (AR/VR) activities. Specifically, AR/VR hardware (such as AR/VR helmets, headsets, and/or other apparatuses) can obscure portions of a user's face, making it difficult to detect a user's facial expressions while using the AR/VR hardware.

US Patent Application No. 2007/0179396 describes a method for detecting facial muscle movements, where the facial muscle movements are described as being detectable by using one or more of electroencephalograph (EEG) signals, electrooculograph (EOG) signals and electromyography (EMG) signals.

U.S. Pat. No. 7,554,549 describes a system and method for analyzing EMG (electromyography) signals from muscles on the face to determine a user's facial expression using bipolar electrodes. Such expression determination is then used for computer animation.

Thus, a need exists for apparatuses, methods and systems that can accurately and efficiently detect user facial expressions even when the user's face is partially obscured.

SUMMARY OF THE DISCLOSURE

Apparatuses, methods, and systems herein facilitate a rapid, efficient mechanism for facial expression detection according to electromyography (EMG) signals. In some implementations, apparatuses, methods and system herein can detect facial expressions according to EMG signals that can operate without significant latency on mobile devices (including but not limited to tablets, smartphones, and/or the like).

For example, in some implementations, systems, methods and apparatuses herein can detect facial expressions according to EMG signals that are obtained from one or more electrodes placed on a face of the user. In some implementations, the electrodes can be unipolar electrodes. The unipolar electrodes can be situated on a mask that contacts the face of the user, such that a number of locations on the upper face of the user are contacted by the unipolar electrodes.

In some implementations, the EMG signals can be preprocessed to remove noise. The noise removal can be common mode removal (i.e., in which interfering signals from one or more neighboring electrodes, and/or from the facemask itself, are removed). After preprocessing the EMG signals, apparatuses, methods and systems can be analyzed to determine roughness.

The EMG signals can also be normalized. Normalization can allow facial expressions to be categorized into one of a number of users. The categorization can subsequently be used to identify facial expressions of new users (e.g., by comparing EMG signals of new users to those categorized from previous users. In some implementations, determinant and non-determinant (e.g., probabilistic) classifiers can be used to classify EMG signals representing facial expressions.

In some implementations, a user state can be determined before classification of the signals is performed. For example, if the user is in a neutral state (i.e., a state in which the user has a neutral expression on his/her face), the structure of the EMG signals (and in some implementations, even after normalization) is different from the signals from a non-neutral state (i.e., a state in which the user has a non-neutral expression on his or her face). Accordingly, determining whether a user is in a neutral state can increase the accuracy of the user's EMG signal classification.

In some implementations, a number of classification methods can be performed as described herein, including but not limited to a categorization classifier; discriminant analysis (including but not limited to LDA (linear discriminant analysis), QDA (quadratic discriminant analysis) and variations thereof such as sQDA (time series quadratic discriminant analysis); Riemannian geometry; a linear classifier; a Naïve Bayes Classifier (including but not limited to Bayesian Network classifier); a k-nearest neighbor classifier; a RBF (radial basis function) classifier; and/or a neural network classifier, including but not limited to a Bagging classifier, a SVM (support vector machine) classifier, a NC (node classifier), a NCS (neural classifier system), SCRLDA (Shrunken Centroid Regularized Linear Discriminate and Analysis), a Random Forest, and/or a similar classifier, and/or a combination thereof. Optionally, after classification, the determination of the facial expression of the user is adapted according to one or more adaptation methods, using one or more adaptation methods (for example, by retraining the classifier on a specific expression of the user and/or applying a categorization (pattern matching) algorithm).

According to at least some embodiments, there is provided a facial expression determination system for determining a facial expression on a face of a user comprising an apparatus comprising a plurality of EMG (electromyography) electrodes configured for contact with the face of the user; and a computational device configured with instructions operating thereon to cause the computational device to preprocess a plurality of EMG signals received from said EMG electrodes to form preprocessed EMG signals; and classify a facial expression according to said preprocessed EMG using a classifier, wherein said preprocessing comprises determining a roughness of said EMG signals according to a predefined window, and said classifier classifies the facial expression according to said roughness.

Optionally, classifying comprises determining whether the facial expression corresponds to a neutral expression or a non-neutral expression based upon. Optionally, upon determining a non-neutral expression, classifying includes determining said non-neutral expression. Optionally, said predefined window is of 100 ms. Optionally, said classifier classifies said preprocessed EMG signals of the user using at least one of (1) a discriminant analysis classifier; (2) a Riemannian geometry classifier; (3) Naïve Bayes classifier, (4) a k-nearest neighbor classifier, (5) a RBF (radial basis function) classifier, (6) a Bagging classifier, (7) a SVM (support vector machine) classifier, (8) a node classifier (NC), (9) NCS (neural classifier system), (10) SCRLDA (Shrunken Centroid Regularized Linear Discriminate and Analysis), or (11) a Random Forest classifier. Optionally, said discriminant analysis classifier is one of (1) LDA (linear discriminant analysis), (2) QDA (quadratic discriminant analysis), or (3) sQDA. Optionally, said classifier is one of (1) Riemannian geometry, (2) QDA and (3) sQDA.

Optionally, the system further comprises a classifier training system for training said classifier, said training system configured to receive a plurality of sets of preprocessed EMG signals from a plurality of training users, wherein each set including a plurality of groups of preprocessed EMG signals from each training user, and each group of preprocessed EMG signals corresponding to a previously classified facial expression of said training user; said training system additionally configured to determine a pattern of variance for each of said groups of preprocessed EMG signals across said plurality of training users corresponding to each classified facial expression, and compare said preprocessed EMG signals of the user to said patterns of variance to adjust said classification of the facial expression of the user.

Optionally, the instructions are additionally configured to cause the computational device to receive data associated with at least one predetermined facial expression of the user before classifying the facial expression as a neutral expression or a non-neutral expression. Optionally, said at least one predetermined facial expression is a neutral expression. Optionally, said at least one predetermined facial expression is a non-neutral expression. Optionally, the instructions are additionally configured to cause the computational device to retrain said classifier on said preprocessed EMG signals of the user to form a retrained classifier, and classify said expression according to said preprocessed EMG signals by said retrained classifier to determine the facial expression.

Optionally, system further comprises a training system for training said classifier and configured to receive a plurality of sets of preprocessed EMG signals from a plurality of training users, wherein each set comprising a plurality of groups of preprocessed EMG signals from each training user, each group of preprocessed EMG signals corresponding to a previously classified facial expression of said training user; said training system additionally configured to determine a pattern of variance of for each of said groups of preprocessed EMG signals across said plurality of training users corresponding to each classified facial expression; and compare said preprocessed EMG signals of the user to said patterns of variance to classify the facial expression of the user.

Optionally, said electrodes comprise unipolar electrodes. Optionally, preprocessing said EMG signals comprises removing common mode interference of said unipolar electrodes.

Optionally, said apparatus further comprises a local board in electrical communication with said EMG electrodes, the local board configured for converting said EMG signals from analog signals to digital signals, and a main board configured for receiving said digital signals. Optionally, said EMG electrodes comprise eight unipolar EMG electrodes and one reference electrode, the system further comprising an electrode interface in electrical communication with said EMG electrodes and with said computational device, and configured for providing said EMG signals from said EMG electrodes to said computational device; and a mask configured to contact an upper portion of the face of the user and including an electrode plate; wherein said EMG electrodes being configured to attach to said electrode plate of said mask, such that said EMG electrodes contact said upper portion of the face of the user.

Optionally, the system further comprises a classifier training system for training said classifier, said training system configured to receive a plurality of sets of preprocessed EMG signals from a plurality of training users, wherein each set comprising a plurality of groups of preprocessed EMG signals from each training user, and each group of preprocessed EMG signals corresponding to a previously classified facial expression of said training user; wherein said training system configured to compute a similarity score for said previously classified facial expressions of said training users, fuse together each plurality of said previously classified facial expressions having said similarity score above a threshold indicating excessive similarity, so as to form a reduced number of said previously classified facial expressions; and train said classifier on said reduced number of said previously classified facial expressions.

Optionally, the instructions are further configured to cause the computational device to determine a level of said facial expression according to a standard deviation of said roughness. Optionally, said preprocessing comprises removing electrical power line interference (PLI). Optionally, said removing said PLI comprising filtering said EMG signals with two series of Butterworth notch filters of order 1, a first series of filter at 50 Hz and all its harmonics up to the Nyquist frequency, and a second series of filter with cutoff frequency at 60 Hz and all its harmonics up to the Nyquist frequency. Optionally, said determining said roughness further comprises calculating an EMG-dipole. Optionally, said determining said roughness further comprises a movement of said signals according to said EMG-dipole. Optionally, said classifier determines said facial expression at least partially according to a plurality of features, wherein said features comprise one or more of roughness, roughness of EMG-dipole, a direction of movement of said EMG signals of said EMG-dipole and a level of facial expression.

According to at least some embodiments, there is provided a facial expression determination system for determining a facial expression on a face of a user, comprising an apparatus comprising a plurality of EMG (electromyography) electrodes in contact with the face of the user; and a computational device in communication with said electrodes and configured for receiving a plurality of EMG signals from said EMG electrodes, said computational device including a signal processing abstraction layer configured to preprocess said EMG signals to form preprocessed EMG signals; and a classifier configured to receive said preprocessed EMG signals, the classifier configured to retrain said classifier on said preprocessed EMG signals of the user to form a retrained classifier; the classifier configured to classify said facial expression based on said preprocessed EMG signals and said retrained classifier.

According to at least some embodiments, there is provided a facial expression determination system for determining a facial expression on a face of a user, comprising an apparatus comprising a plurality of EMG (electromyography) electrodes in contact with the face of the user; a computational device in communication with said electrodes and configured for receiving a plurality of EMG signals from said EMG electrodes, said computational device including a signal processing abstraction layer configured to preprocess said EMG signals to form preprocessed EMG signals; and a classifier configured to receive said preprocessed EMG signals and for classifying the facial expression according to said preprocessed EMG signals; and a training system configured to train said classifier, said training system configured to receive a plurality of sets of preprocessed EMG signals from a plurality of training users, wherein: each set comprising a plurality of groups of preprocessed EMG signals from each training user, each group of preprocessed EMG signals corresponding to a previously classified facial expression of said training user; determine a pattern of variance of for each of said groups of preprocessed EMG signals across said plurality of training users corresponding to each classified facial expression; and compare said preprocessed EMG signals of the user to said patterns of variance to classify the facial expression of the user.

According to at least some embodiments, there is provided a facial expression determination system for determining a facial expression on a face of a user, comprising an apparatus comprising a plurality of unipolar EMG (electromyography) electrodes in contact with the face of the user; and a computational device in communication with said electrodes and configured with instructions operating thereon to cause the computational device to receive a plurality of EMG signals from said EMG electrodes, preprocess said EMG signals to form preprocessed EMG signals by removing common mode effects, normalize said preprocessed EMG signals to form normalized EMG signals, and classify said normalized EMG signals to determine the facial expression.

According to at least some embodiments, there is provided a system for determining a facial expression on a face of a user, comprising an apparatus comprising a plurality of EMG (electromyography) electrodes in contact with the face of the user; a computational device in communication with said electrodes and configured for receiving a plurality of EMG signals from said EMG electrodes, said computational device including a signal processing abstraction layer configured to preprocess for preprocessing said EMG signals to form preprocessed EMG signals; and a classifier configured to receive said preprocessed EMG signals and for classifying the facial expression according to said preprocessed EMG signals; and a training system for training said classifier, said training system configured to receive a plurality of sets of preprocessed EMG signals from a plurality of training users, wherein each set comprises a plurality of groups of preprocessed EMG signals from each training user, each group of preprocessed EMG signals corresponding to a previously classified facial expression of said training user; compute a similarity score for said previously classified facial expressions of said training users, fuse each plurality of said previously classified facial expressions having said similarity score above a threshold indicating excessive similarity, so as to reduce a number of said previously classified facial expressions; and train said classifier on said reduced number of said previously classified facial expressions.

According to at least some embodiments, there is provided a facial expression determination method for determining a facial expression on a face of a user, the method operated by a computational device, the method comprising receiving a plurality of EMG (electromyography) electrode signals from EMG electrodes in contact with the face of the user; preprocessing said EMG signals to form preprocessed EMG signals, preprocessing comprising determining roughness of said EMG signals according to a predefined window; and determining if the facial expression is a neutral expression or a non-neutral expression; and classifying said non-neutral expression according to said roughness to determine the facial expression, when the facial expression is a non-neutral expression.

Optionally, said preprocessing said EMG signals to form preprocessed EMG signals further comprises removing noise from said EMG signals before said determining said roughness, and further comprises normalizing said EMG signals after said determining said roughness. Optionally, said electrodes comprise unipolar electrodes and wherein said removing noise comprises removing common mode interference of said unipolar electrodes. Optionally, said predefined window is of 100 ms. Optionally, said normalizing said EMG signals further comprises calculating a log normal of said EMG signals and normalizing a variance for each electrode. Optionally, said normalizing said EMG signals further comprises calculating covariance across a plurality of users.

Optionally, the method further comprises before classifying the facial expression, the method includes training said classifier on a plurality of sets of preprocessed EMG signals from a plurality of training users, wherein: each set comprising a plurality of groups of preprocessed EMG signals from each training user, each group of preprocessed EMG signals corresponding to a previously classified facial expression of said training user; said training said classifier comprises determining a pattern of covariances for each of said groups of preprocessed EMG signals across said plurality of training users corresponding to each classified facial expression; and said classifying comprises comparing said normalized EMG signals of the user to said patterns of covariance to adjust said classification of the facial expression of the user.

Optionally, said classifier classifies said preprocessed EMG signals of the user according to a classifier selected from the group consisting of discriminant analysis; Riemannian geometry; Naïve Bayes, k-nearest neighbor classifier, RBF (radial basis function) classifier, Bagging classifier, SVM (support vector machine) classifier, NC (node classifier), NCS (neural classifier system), SCRLDA (Shrunken Centroid Regularized Linear Discriminate and Analysis), Random Forest, or a combination thereof. Optionally, said discriminant analysis classifier is selected from the group consisting of LDA (linear discriminant analysis), QDA (quadratic discriminant analysis) and sQDA. Optionally, said classifier is selected from the group consisting of Riemannian geometry, QDA and sQDA. Optionally, said classifying further comprises receiving at least one predetermined facial expression of the user before said determining if the facial expression is a neutral expression or a non-neutral expression. Optionally, said at least one predetermined facial expression is a neutral expression. Optionally, said at least one predetermined facial expression is a non-neutral expression. Optionally, said classifying further comprises retraining said classifier on said preprocessed EMG signals of the user to form a retrained classifier; and classifying said expression according to said preprocessed EMG signals by said retrained classifier to determine the facial expression.

Optionally, the method further comprises training said classifier, before said classifying the facial expression, on a plurality of sets of preprocessed EMG signals from a plurality of training users, wherein: each set comprising a plurality of groups of preprocessed EMG signals from each training user, and each group of preprocessed EMG signals corresponding to a previously classified facial expression of said training user; and determining a pattern of variance of for each of said groups of preprocessed EMG signals across said plurality of training users corresponding to each classified facial expression, wherein said classifying comprises comparing said preprocessed EMG signals of the user to said patterns of variance to classify the facial expression of the user.

Optionally, the method further comprises training said classifier, before said classifying the facial expression, on a plurality of sets of preprocessed EMG signals from a plurality of training users, wherein: each set comprising a plurality of groups of preprocessed EMG signals from each training user, each group of preprocessed EMG signals corresponding to a previously classified facial expression of said training user; said training further comprises assessing a similarity score for said previously classified facial expressions of said training users, and fusing together each plurality of said previously classified facial expressions having said similarity score above a threshold indicating excessive similarity, to form a reduced number of said previously classified facial expressions wherein said training said classifier comprises training on said reduced number of said previously classified facial expressions.

Optionally, said training further comprises determining a pattern of variance for each of said groups of preprocessed EMG signals across said plurality of training users corresponding to each classified facial expression, wherein said classifying comprises comparing said preprocessed EMG signals of the user to said patterns of variance to adjust said classification of the facial expression of the user.

According to at least some embodiments, there is provided a facial expression determination apparatus for determining a facial expression on a face of a user, comprising a plurality of unipolar or bipolar EMG (electromyography) electrodes in contact with the face of the user and a computational device in communication with said electrodes, the device configured with instructions operating thereon to cause the device to receive a plurality of EMG signals from said EMG electrodes; preprocess said EMG signals to form preprocessed EMG signals by removing common mode effects, normalize said preprocessed EMG signals to form normalized EMG signals, and classify said normalized EMG signals to detect the facial expression.

Optionally, the apparatus further comprises an electrode interface; and a mask which contacts an upper portion of the face of the user, said mask including an electrode plate attached to eight EMG electrodes and one reference electrode such that said EMG electrodes contact said upper portion of the face of the user, wherein said electrode interface being operatively coupled to said EMG electrodes and said computational device for providing said EMG signals from said EMG electrodes to said computational device.

According to at least some embodiments, there is provided a facial expression determination system for determining a facial expression on a face of a user comprising an apparatus comprising a plurality of EMG (electromyography) electrodes configured for contact with the face of the user; and a computational device configured for receiving a plurality of EMG signals from said EMG electrodes, said computational device configured with instructions operating thereon to cause the computational device to preprocess said EMG signals to form preprocessed EMG signals; determining a plurality of features according to said preprocessed EMG using a classifier, wherein said features include roughness and wherein said preprocessing preprocesses said EMG signals to determine a roughness of said EMG signals according to a predefined window; and determine the facial expression according to said features.

Optionally, the instructions are further configured to cause the computational device to determine a level of said facial expression according to a standard deviation of said roughness, wherein said features further comprise said level of said facial expression. Optionally, said determining said roughness further comprises calculating an EMG-dipole, and determining said roughness for said EMG-dipole, wherein said features further comprise said roughness of said EMG-dipole. Optionally, said determining said roughness further comprises a movement of said signals according to said EMG-dipole, wherein said features further comprise said movement of said signals. Optionally, the system further comprises a weight prediction module configured for performing weight prediction of said features; and an avatar modeler for modeling said avatar according to a blend-shape, wherein said blend-shape is determined according to said weight prediction. Optionally, said electrodes comprise bi-polar electrodes.

Optionally, the system, method or apparatus of any of the above claims further comprises detecting voice sounds made by the user; and animating the mouth of an avatar of the user in response thereto. Optionally, upon voice sounds being detected from the user, further comprising animating only an upper portion of the face of the user.

Optionally, the system, method or apparatus of any of the above claims further comprises upon no facial expression being detected, animating a blink or an eye movement of the user.

Optionally said system and/or said apparatus comprises a computational device and a memory, wherein said computational device is configured to perform a predefined set of basic operations in response to receiving a corresponding basic instruction selected from a predefined native instruction set of codes, set instruction comprising a first set of machine codes selected from the native instruction set for receiving said EMG data, a second set of machine codes selected from the native instruction set for preprocessing said EMG data to determine at least one feature of said EMG data and a third set of machine codes selected from the native instruction set for determining a facial expression according to said at least one feature of said EMG data; wherein each of the first, second and third sets of machine code is stored in the memory.

As used herein, the term "EMG" refers to "electromyography," which measures the electrical impulses of muscles.

As used herein, the term "muscle capabilities" refers to the capability of a user to move a plurality of muscles in coordination for some type of activity. A non-limiting example of such an activity is a facial expression.

Embodiments of the present disclosure include, systems, methods and apparatuses for performing simultaneous localization and mapping (SLAM) which addressed the above-noted shortcomings of the background art. In some embodiments, a SLAM system is provided for a wearable device, including without limitation, a head-mounted wearable device that optionally includes a display screen. Such systems, methods and apparatuses can be configured to accurately (and in some embodiments, quickly) localize a wearable device within a dynamically constructed map, e.g., through computations performed with a computational device. A non-limiting example of such a computational device is a smart cellular phone or other mobile computational device.

According to at least some embodiments, SLAM systems, methods and apparatuses can support a VR (virtual reality)

application or AR (augmented reality) application, in combination with the previously described facial expression classification.

Without wishing to be limited to a closed list, various applications and methods may be applied according to the systems, apparatuses and methods described herein. For example and without limitation, such applications may be related to healthcare for example, including without limitation providing therapeutic training and benefits, for cognitive and/or motor impairment. Rehabilitative benefit may also be obtained for neurological damage and disorders, including without limitation damage from stroke and trauma. Therapeutic benefit may also be obtained for example for treatment of those on the autism spectrum. Other non-limiting examples may relate to diagnostic capability of the systems and methods as described herein.

Unless otherwise defined, all technical and scientific terms used herein have the same meaning as commonly understood by one of ordinary skill in the art to which user matter of this disclosure belongs. The materials, methods, and examples provided herein are illustrative only and not intended to be limiting.

Implementation of the apparatuses, methods and systems of the present disclosure involves performing or completing certain selected tasks or steps manually, automatically, or a combination thereof. Specifically, several selected steps can be implemented by hardware or by software on an operating system, of a firmware, and/or a combination thereof. For example, as hardware, a chip or a circuit can be selected for which steps of some of the embodiments of the disclosure can be implemented. As software, selected steps of some of the embodiments of the present disclosure can be implemented as a number of software instructions being executed by a computer (e.g., a processor of the computer) using an operating system. In any case, selected steps of the method and system of some of the embodiments of the present disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to as a "processor" for performing such functionality. Thus, processor, according to some embodiments, may be a hardware component, or, according to some embodiments, a software component.

Some embodiments are described with regard to a "computer", a "computer network," and/or a "computer operational on a computer network," it is noted that any device featuring a processor and the ability to execute one or more instructions may be described as a computer, a computational device, and a processor (e.g., see above), including but not limited to a personal computer (PC), a processor, a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

Embodiments herein are described, by way of example only, with reference to the accompanying drawings. It is understood that the particulars shown in said drawings are by way of example and for purposes of illustrative discussion of some embodiments only.

DETAILED DESCRIPTION OF SOME OF THE EMBODIMENTS

Generally, each software component described herein can be assumed to be operated by a computational device (e.g., such as an electronic device including at least a memory and/or a processor, and/or the like).

Figure 1A:
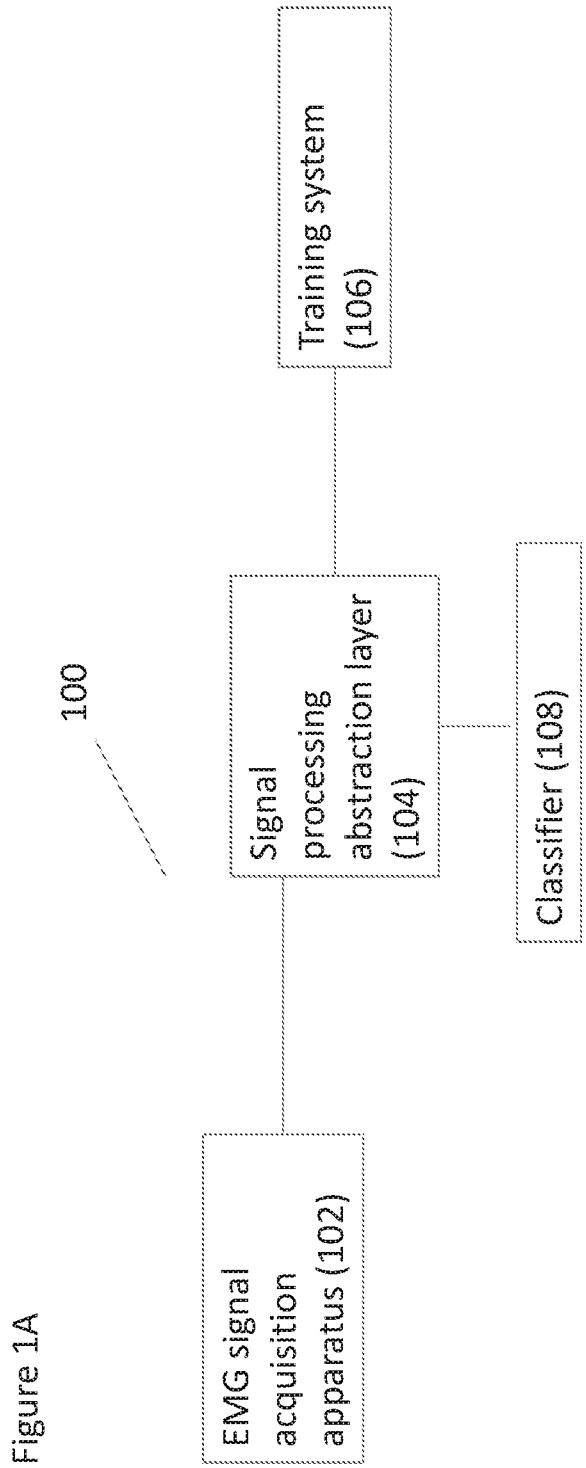
FIG. 1A shows a non-limiting example system for acquiring and analyzing EMG signals according to some embodiments.

FIG. 1A illustrates an example system for acquiring and analyzing EMG signals, according to at least some embodiments. As shown, a system 100 includes an EMG signal acquisition apparatus 102 for acquiring EMG signals from a user. In some implementations, the EMG signals can be acquired through electrodes (not shown) placed on the surface of the user, such as on the skin of the user (see for example FIG. 1B). In some implementations, such signals are acquired non-invasively (i.e., without placing sensors and/or the like within the user). At least a portion of EMG signal acquisition apparatus 102 can adapted for being placed on the face of the user. For such embodiments, at least the upper portion of the face of the user can be contacted by the electrodes.

EMG signals generated by the electrodes can then be processed by a signal processing abstraction layer 104 that can prepare the EMG signals for further analysis. Signal processing abstraction layer 104 can be implemented by a computational device (not shown). In some implementations, signal processing abstraction layer 104 can reduce or remove noise from the EMG signals, and/or can perform normalization and/or other processing in the EMG signals to increase the efficiency of EMG signal analysis. The processed EMG signals are also referred to herein as "EMG signal information."

The processed EMG signals can then be classified by a classifier 108, e.g., according to the underlying muscle activity. In a non-limiting example, the underlying muscle activity can correspond to different facial expressions being made by the user. Other non-limiting examples of classification for the underlying muscle activity can include determining a range of capabilities for the underlying muscles of a user, where capabilities may not correspond to actual expressions being made at a time by the user. Determination of such a range may be used, for example, to determine whether a user is within a normal range of muscle capabilities or whether the user has a deficit in one or more muscle capabilities. As one of skill in the art will appreciate, a deficit in muscle capability is not necessarily due to damage to the muscles involved, but may be due to damage in any part of the physiological system required for muscles to be moved in coordination, including but not limited to, central or peripheral nervous system damage, or a combination thereof.

As a non-limiting example, a user can have a medical condition, such as a stroke or other type of brain injury. After a brain injury, the user may not be capable of a full range of facial expressions, and/or may not be capable of fully executing a facial expression. As non-limiting example, after having a stroke in which one hemisphere of the brain experiences more damage, the user may have a lopsided or crooked smile. Classifier 108 can use the processed EMG signals to determine that the user's smile is abnormal, and to further determine the nature of the abnormality (i.e., that the user is performing a lopsided smile) so as to classify the EMG signals even when the user is not performing a muscle activity in an expected manner.

As described in greater detail below, classifier 108 can operate according to a number of different classification protocols, such as: categorization classifiers; discriminant analysis (including but not limited to LDA (linear discriminant analysis), QDA (quadratic discriminant analysis) and variations thereof such as sQDA (time series quadratic discriminant analysis), and/or similar protocols); Riemannian geometry; any type of linear classifier; Naïve Bayes Classifier (including but not limited to Bayesian Network classifier); k-nearest neighbor classifier; RBF (radial basis function) classifier; neural network and/or machine learning classifiers including but not limited to Bagging classifier, SVM (support vector machine) classifier, NC (node classifier), NCS (neural classifier system), SCRLDA (Shrunken Centroid Regularized Linear Discriminate and Analysis), Random Forest; and/or some combination thereof.

The processed signals can also be used by a training system 106 for training classifier 108. Training system 106 can include a computational device (not shown) that implements and/or instantiates training software. For example, in some implementations, training system 106 can train classifier 108 before classifier 108 classifies an EMG signal. In other implementations, training system 106 can train classifier 108 while classifier 108 classifies facial expressions of the user, or a combination thereof. As described in greater detail below, training system 106, in some implementations, can train classifier 108 using known facial expressions and associated EMG signal information.

Training system 106 can also reduce the number of facial expressions for classifier 108 to be trained on, for example to reduce the computational resources required for the operation of classifier 108 or for a particular purpose for the classification process and/or results. Training system 106 can fuse or combine a plurality of facial expressions in order to reduce their overall number. Training system 106 can also receive a predetermined set of facial expressions for training classifier 108, and can then optionally either train classifier 108 on the complete set or a sub-set thereof.

Figure 1B:
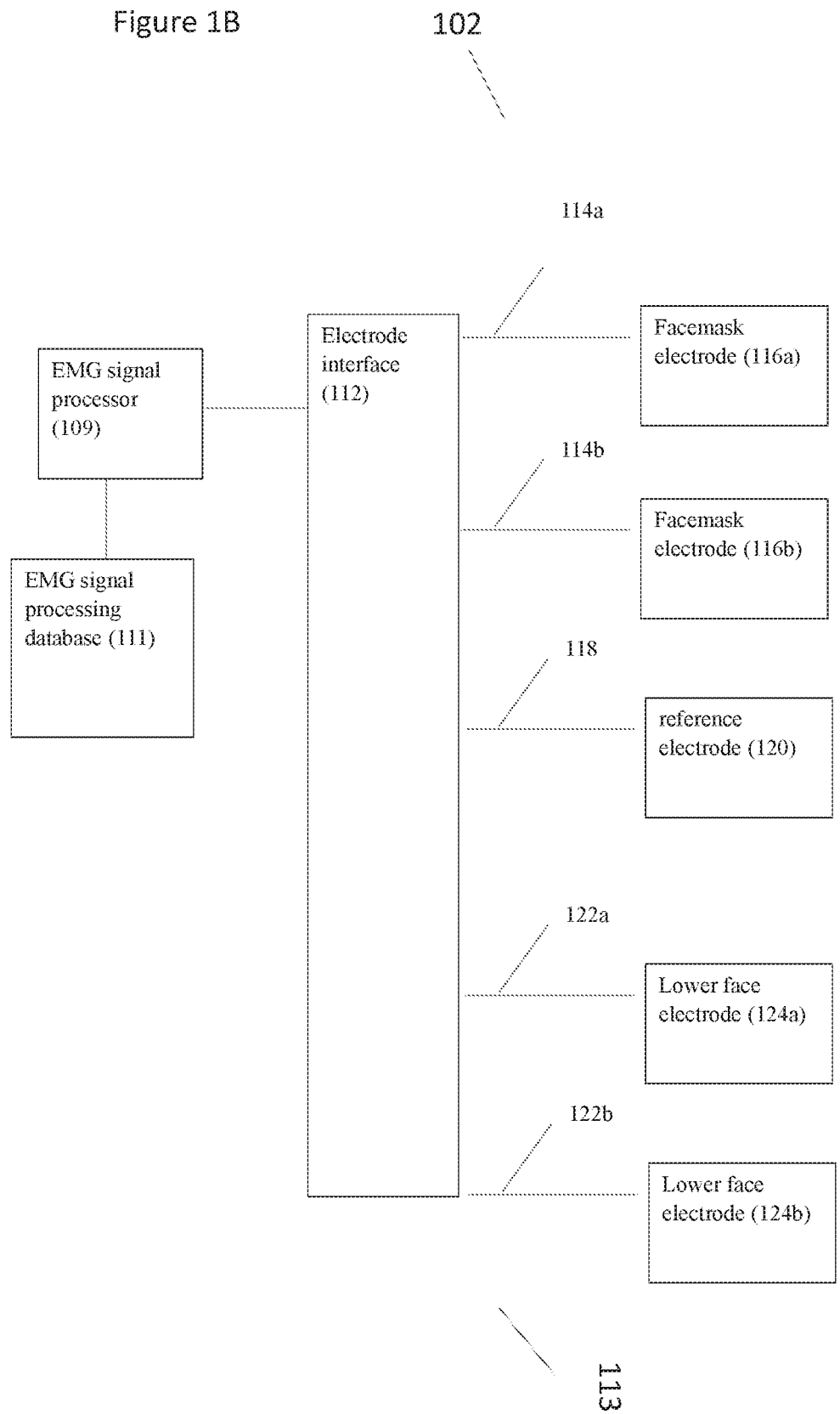
FIG. 1B shows a non-limiting example of EMG signal acquisition apparatus according to some embodiments.

FIG. 1B shows an example, non-limiting, illustrative implementation for an EMG signal acquisition apparatus according to at least some embodiments which may be used with the system of FIG. 1A. For example, in some implementations, EMG signal acquisition apparatus 102 can include an EMG signal processor 109 operatively coupled to an EMG signal processing database 111. EMG signal processor 109 can also be operatively coupled to an electrode interface 112, which in turn can receive signals from a set of electrodes 113 interfacing with muscles to receive EMG signals. Electrodes 113 may be any suitable type of electrodes that are preferably surface electrodes, including but not limited to dry or wet electrodes (the latter may use gel or water for better contact with the skin). The dry electrodes may optionally be rigid gold or Ag/CL electrodes, conductive foam or the like.

In some implementations, the set of electrodes 113 comprise a set of surface EMG electrodes that measure a voltage difference within the muscles of a user (the voltage difference being caused by a depolarization wave that travels along the surface of a muscle when the muscle flexes). The signals detected by the set of surface EMG electrodes 113 may be in the range of 5 mV and/or similar signal ranges. In some implementations, the set of surface EMG electrodes 113 can be aligned with an expected direction of an electrical impulse within a user's muscle(s), and/or can be aligned perpendicular to impulses that the user wishes to exclude from detection. In some implementations, the set of surface EMG electrodes 113 can be unipolar electrodes (e.g., that can collect EMG signals from a general area). Unipolar electrodes, in some implementations, can allow for more efficient facial expression classification, as the EMG signals collected by unipolar electrodes can be from a more general area of facial muscles, allowing for more generalized information about the user's muscle movement to be collected and analyzed.

In some implementations, the set of surface EMG electrodes 113 can include facemask electrodes 116a, 116b, and/or additional facemask electrodes, each of which can be operatively coupled to an electrode interface 112 through respective electrical conductors 114a, 114b and/or the like. Facemask electrodes 116 may be provided so as to receive EMG signals from muscles in a portion of the face, such as an upper portion of the face for example. In this implementation, facemask electrodes 116 are preferably located around and/or on the upper portion of the face, more preferably including but not limited to one or more of cheek, forehead and eye areas, most preferably on or around at least the cheek and forehead areas.

In some implementations, the set of surface EMG electrodes 113 can also include lower face electrodes 124a, 124b which can be operatively coupled to electrode interface 112 through respective electrical conductors 122a, 122b and/or the like. Lower face electrodes 124 can be positioned on and/or around the areas of the mouth, lower cheeks, chin, and/or the like of a user's face. In some implementations, lower face electrodes 124 can be similar to facemask electrodes 116, and/or can be included in a wearable device as described in greater detail below. In other implementations, the set of surface EMG electrodes 113 may not include lower face electrodes 124. In some implementations, the set of surface EMG electrodes 113 can also include a ground or reference electrode 120 that can be operatively coupled to the electrode interface 112, e.g., through an electrical conductor 118.

In some implementations, EMG signal processor 109 and EMG signal processing database 111 can be located in a separate apparatus or device from the remaining components shown in FIG. 1B. For example, the remaining components shown in FIG. 1B can be located in a wearable device (not shown), while EMG signal processor 109 and EMG signal processing database 111 can be located in a computational device and/or system that is operatively coupled to the wearable device (e.g., via a wired connection, a wireless Internet connection, a wireless Bluetooth connection, and/or the like).

Figure 2A:
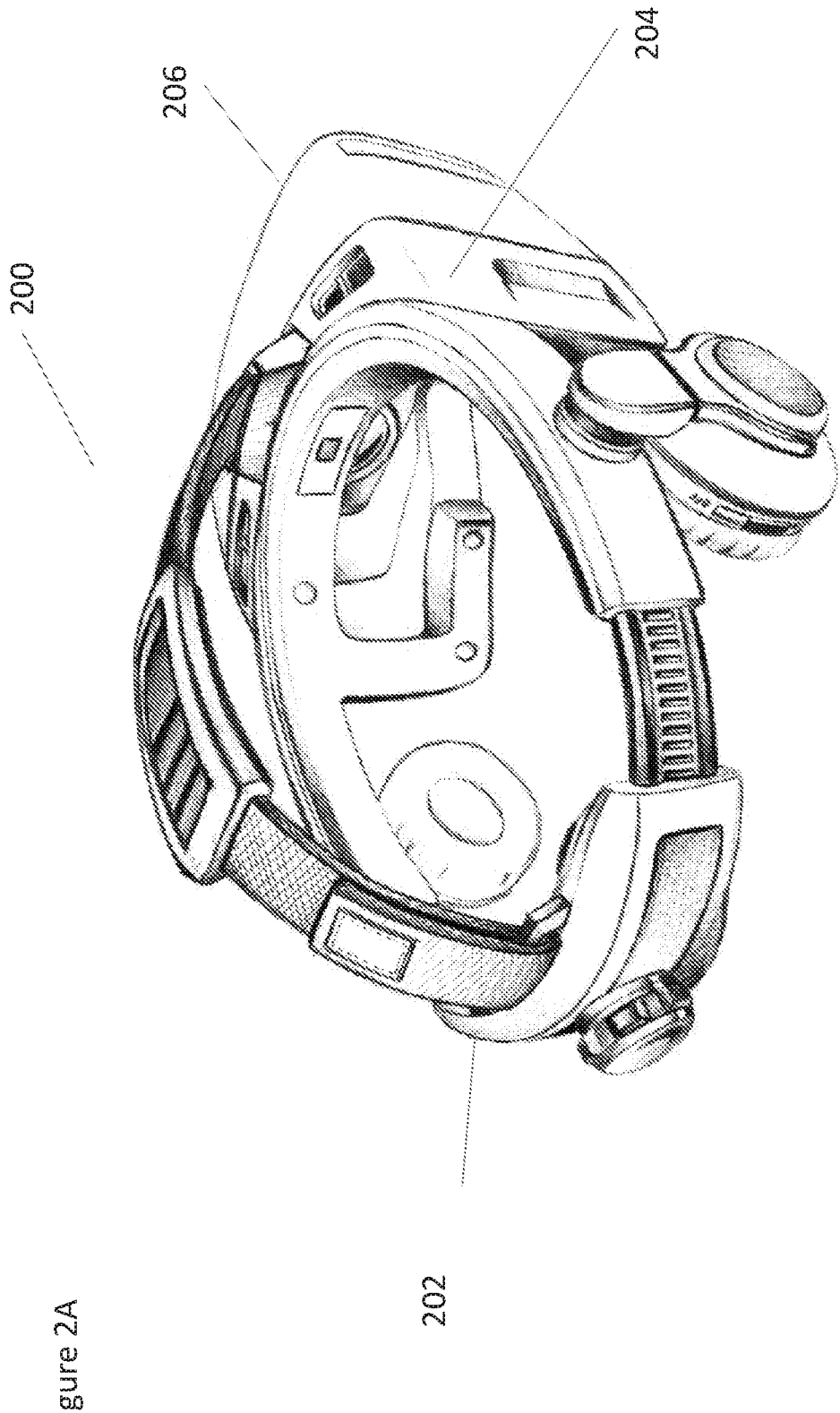
FIG. 2A shows a back view of a non-limiting example of a facemask apparatus according to some embodiments.
Figure 2B:
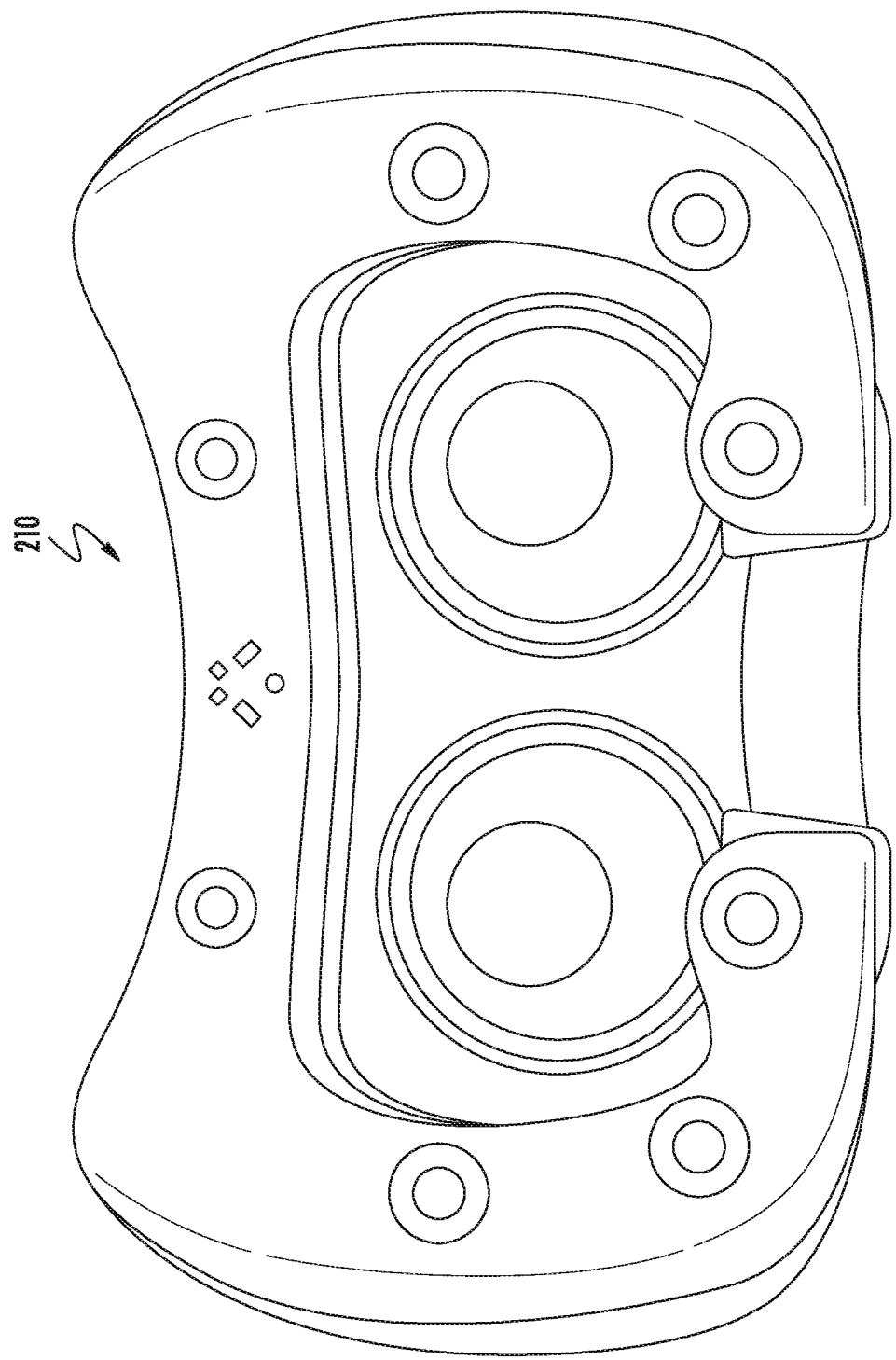
FIG. 2B shows a front view of a non-limiting example facemask apparatus according to some embodiments.

FIG. 2A shows a back view of an exemplary, non-limiting, illustrative facemask apparatus according to at least some embodiments. For example, in some implementations, a facemask apparatus 200 can include a mount 202 for mounting the facemask apparatus 200 on the head of a user (not shown). Mount 202 can, for example, feature straps and/or similar mechanisms for attaching the facemask apparatus 200 to the user's head. The facemask apparatus 200 can also include a facemask electrodes holder 204 that can hold the surface EMG electrodes 113 against the face of the user, as described above with respect to FIG. 1B. A facemask display 206 can display visuals or other information to the user. FIG. 2B shows a front view of an example, non-limiting, illustrative facemask apparatus according to at least some embodiments.

Figure 3:
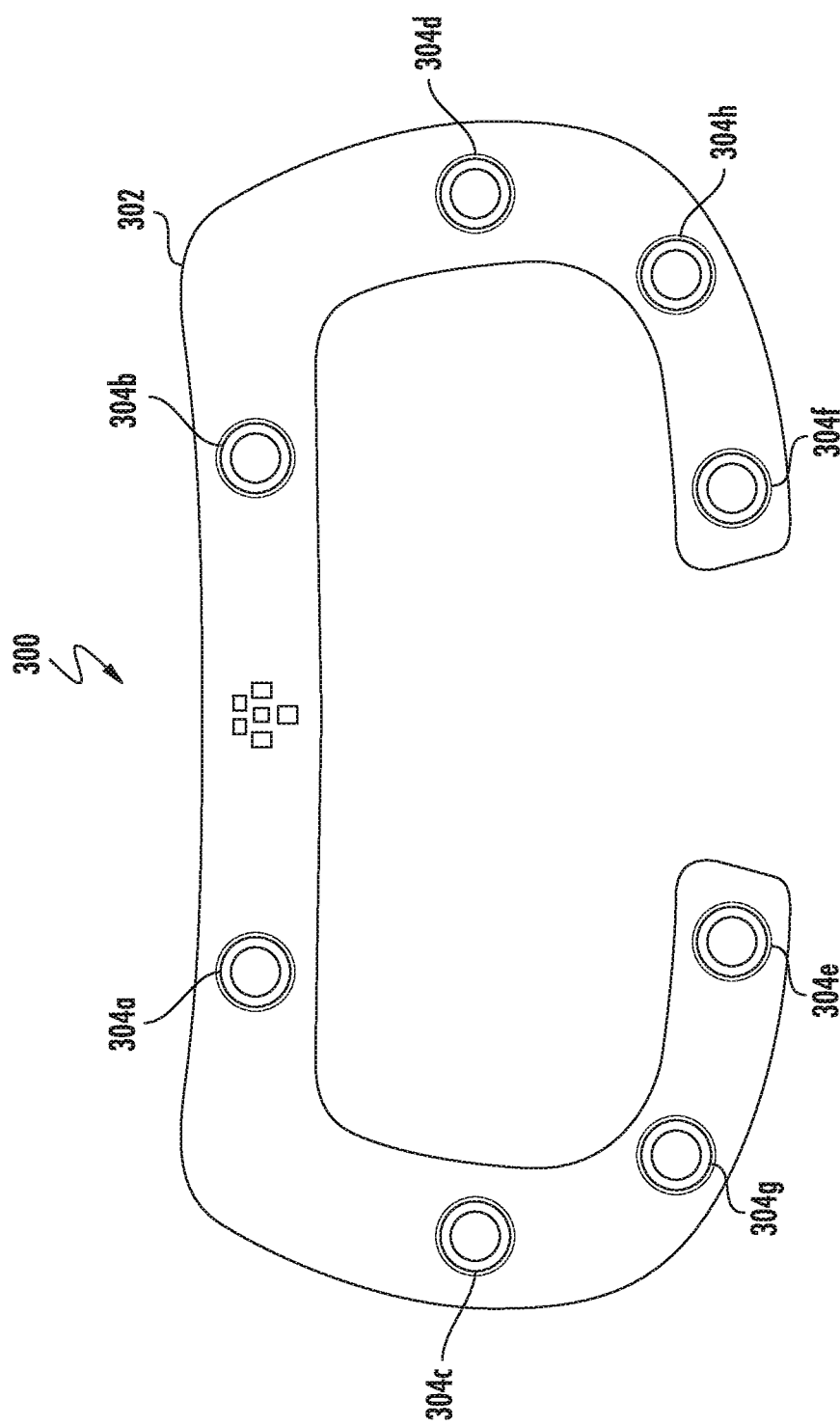
FIG. 3 shows a non-limiting example of a schematic diagram of electrode placement on an electrode plate of an electrode holder of a facemask apparatus according to some embodiments.

FIG. 3 shows an exemplary, non-limiting, illustrative schematic diagram of electrode placement on an electrode plate 300 of an electrode holder 204 of a facemask apparatus 200 according to at least some embodiments. An electrode plate 300, in some implementations, can include a plate mount 302 for mounting a plurality of surface EMG electrodes 113, shown in this non-limiting example as electrodes 304a to 304h. Each electrode 304 can, in some implementations, contact a different location on the face of the user. Preferably, at least electrode plate 300 comprises a flexible material, as the disposition of the electrodes 304 on a flexible material allows for a fixed or constant location (positioning) of the electrodes 304 on the user's face.

Figure 4:
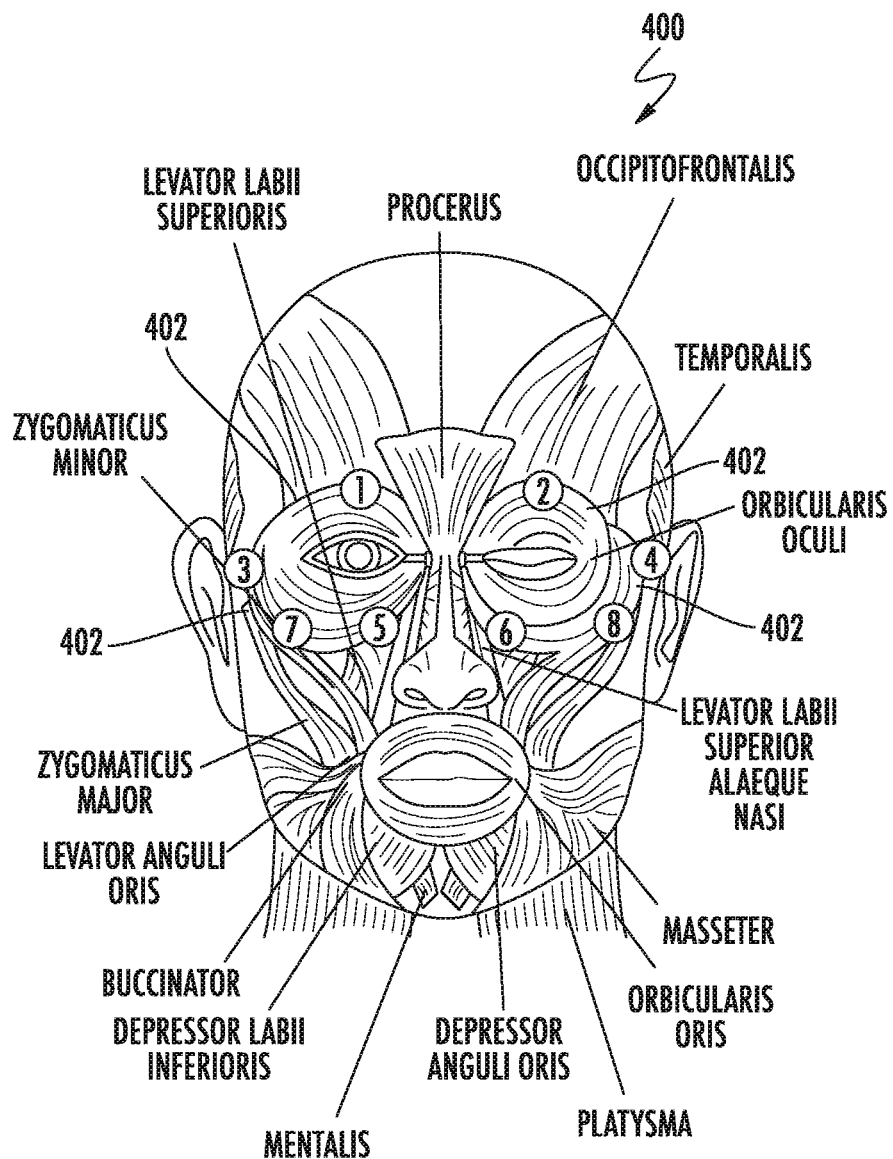
FIG. 4 shows a non-limiting example of a schematic diagram of electrode placement on at least some muscles of the face according to some embodiments.

FIG. 4 shows an exemplary, non-limiting, illustrative schematic diagram of electrode placement on at least some muscles of the face according to at least some embodiments. For example, in some implementations, a face 400 can include a number of face locations 402, numbered from 1 to 8, each of which can have a surface EMG electrodes 113 in physical contact with that face location, so as to detect EMG signals. At least one reference electrode REF can be located at another face location 402.

For this non-limiting example, 8 electrodes are shown in different locations. The number and/or location of the surface EMG electrodes 113 can be configured according to the electrode plate of an electrode holder of a facemask apparatus, according to at least some embodiments. Electrode 1 may correspond to electrode 304a of FIG. 3, electrode 2 may correspond to electrode 304b of FIG. 3 and so forth, through electrode 304h of FIG. 3, which can correspond to electrode 8 of FIG. 4.

Figure 5A:
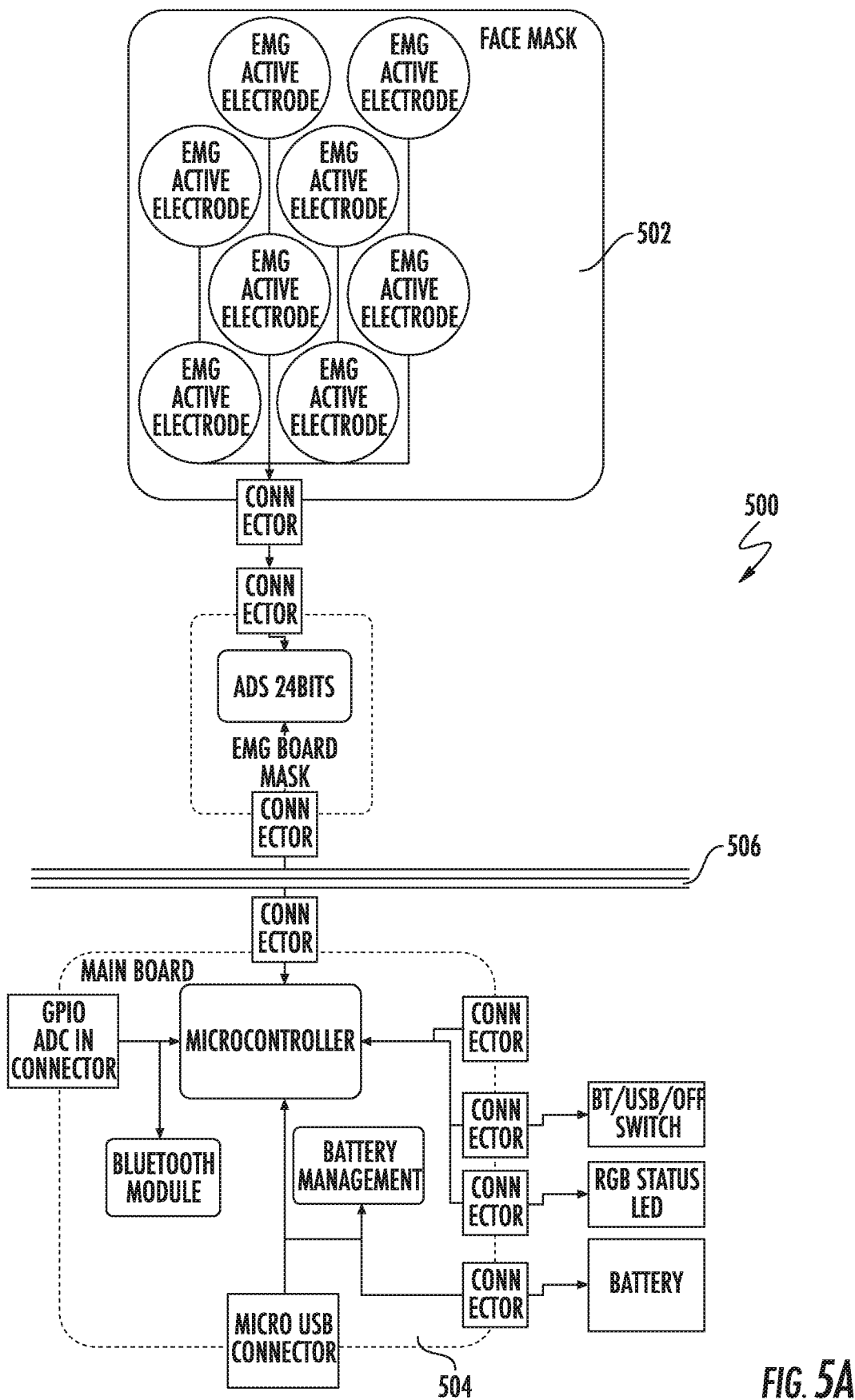
FIG. 5A shows a non-limiting example of a schematic electronic diagram of a facemask apparatus and system according to some embodiments.
Figure 5B:
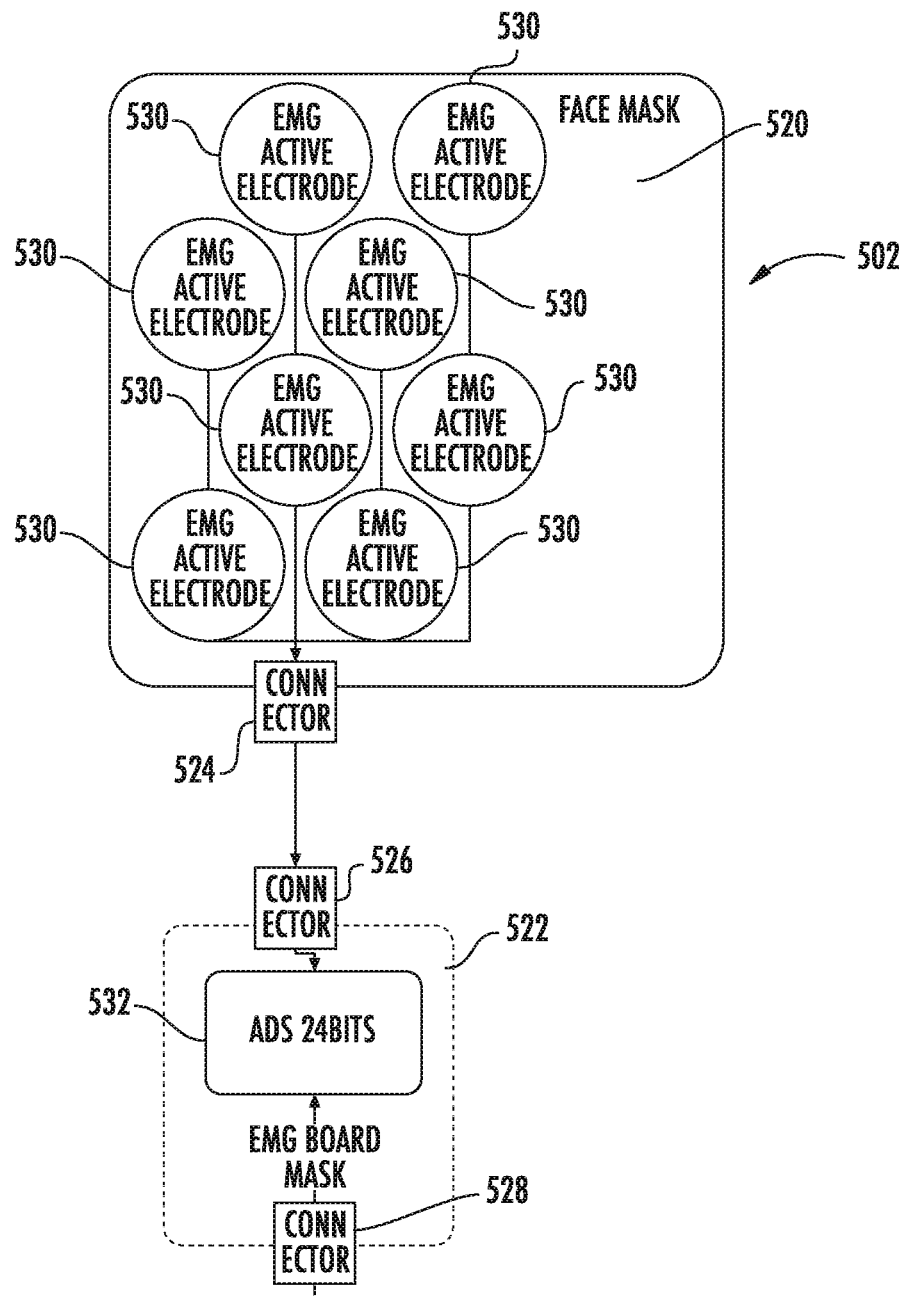
FIG. 5B shows a zoomed view of the electronic diagram of the facemask apparatus of FIG. 5A, according to some embodiments.
Figure 5C:
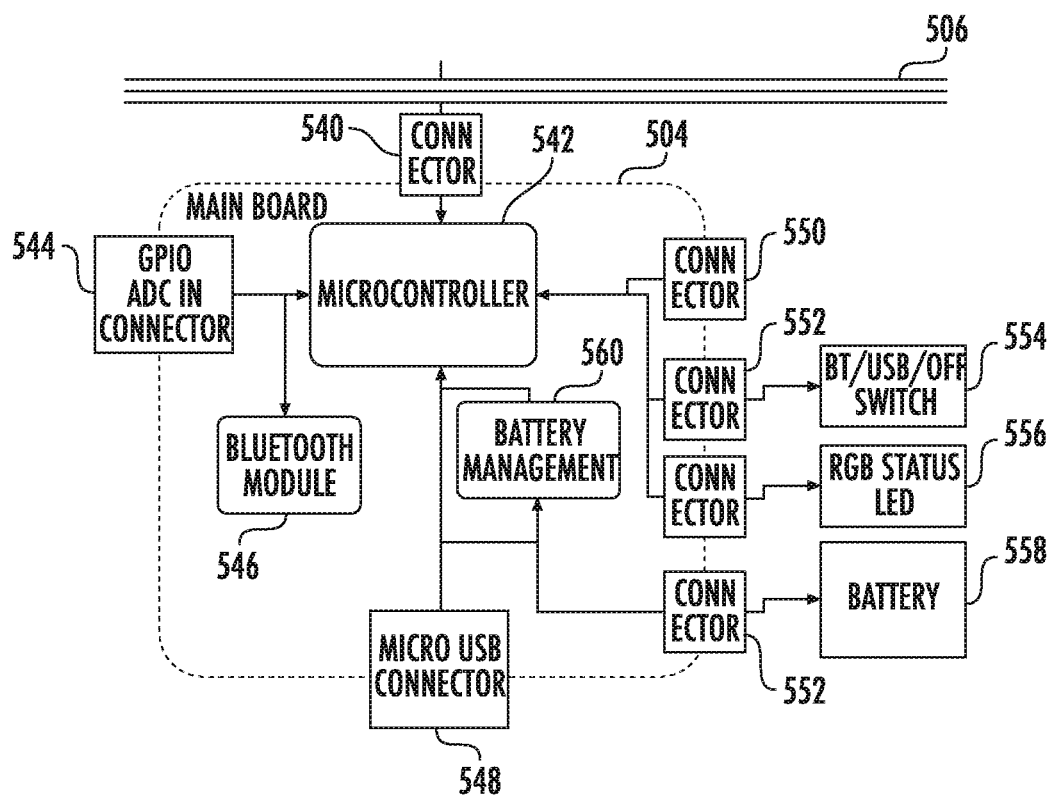
FIG. 5C shows a zoomed view of the electronic diagram of the main board shown in FIG. 5A, in according to some embodiments.

FIG. 5A shows an exemplary, non-limiting, illustrative schematic electronic diagram of a facemask apparatus and system according to at least some embodiments. FIG. 5B shows the electronic diagram of the facemask apparatus in a zoomed view, and FIG. 5C shows the electronic diagram of the main board in a zoomed view. Numbered components in FIG. 5A have the same numbers in FIGS. 5B and 5C; however, for the sake of clarity, only some of the components are shown numbered in FIG. 5A.

FIG. 5A shows an exemplary electronic diagram of a facemask system 500 that can include a facemask apparatus 502 coupled to a main board 504 through a bus 506. Bus 506 can be a SPI or Serial Peripheral Interface bus. The components and connections of FIGS. 5B and 5C will be described together for the sake of clarity, although some components only appear in one of FIGS. 5B and 5C.

Facemask apparatus 502, in some implementations, can include facemask circuitry 520, which can be operatively coupled to a local board 522. The facemask connector 524 can also be operatively coupled to a first local board connector 526. Local board 522 can be operatively coupled to bus 506 through a second local board connector 528. In some implementations, the facemask circuitry 520 can include a number of electrodes 530. Electrodes 530 can correspond to surface EMG electrodes 113 in FIGS. 1A and 1B. The output of electrodes 530 can, in some implementations, be delivered to local board 522, which can include an ADC, such as for example an ADS (analog to digital signal converter) 532 for converting the analog output of electrodes 530 to a digital signal. ADS 532 may be a 24 bit ADS.

In some implementations, the digital signal can then be transmitted from local board 522 through second local board connector 528, and then through bus 506 to main board 504. Local board 522 could also support connection of additional electrodes to measure ECG, EEG or other biological signals (not shown).

Main board 504, in some implementations, can include a first main board connector 540 for receiving the digital signal from bus 506. The digital signal can then be sent from the first main board connector 540 to a microcontroller 542. Microcontroller 542 can receive the digital EMG signals, process the digital EMG signals and/or initiate other components of the main board 504 to process the digital EMG signals, and/or can otherwise control the functions of main board 504. In some implementations, microcontroller 542 can collect recorded data, can synchronize and encapsulate data packets, and can communicate the recorded data to a remote computer (not shown) through some type of communication channel, e.g., via a USB, Bluetooth or wireless connection. The preferred amount of memory is at least enough for performing the amount of required processing, which in turn also depends on the speed of the communication bus and the amount of processing being performed by other components.

In some implementations, the main board 504 can also include a GPIO (general purpose input/output) ADC connector 544 operatively coupled to the microcontroller 542. The GPIO and ADC connector 544 can allow the extension of the device with external TTL (transistor-transistor logic signal) triggers for synchronization and the acquisition of external analog inputs for either data acquisition, or gain control on signals received, such as a potentiometer. In some implementations, the main board 504 can also include a Bluetooth module 546 that can communicate wirelessly with the host system. In some implementations, the Bluetooth module 546 can be operatively coupled to the host system through the UART port (not shown) of microcontroller 542. In some implementations, the main board 504 can also include a micro-USB connector 548 that can act as a main communication port for the main board 504, and which can be operatively coupled to the UART port of the microcontroller. The micro-USB connector 548 can facilitate communication between the main board 504 and the host computer. In some implementations, the micro-USB connector 548 can also be used to update firmware stored and/or implemented on the main board 504. In some implementations, the main board can also include a second main board connector 550 that can be operatively coupled to an additional bus of the microcontroller 542, so as to allow additional extension modules and different sensors to be connected to the microcontroller 542. Microcontroller 542 can then encapsulate and synchronize those external sensors with the EMG signal acquisition. Such extension modules can include, but are not limited to, heart beat sensors, temperature sensors, or galvanic skin response sensors.

In some implementations, multiple power connectors 552 of the main board 504 can provide power and/or power-related connections for the main board 504. A power switch 554 can be operatively coupled to the main board 504 through one of several power connectors 552. Power switch 554 can also, in some implementations, control a status light 556 that can be lit to indicate that the main board 504 is receiving power. A power source 558, such as a battery, can be operatively coupled to a power management component 560, e.g., via another power connector 552. In some implementations, the power management component 560 can communicate with microcontroller 542.

Figure 6:
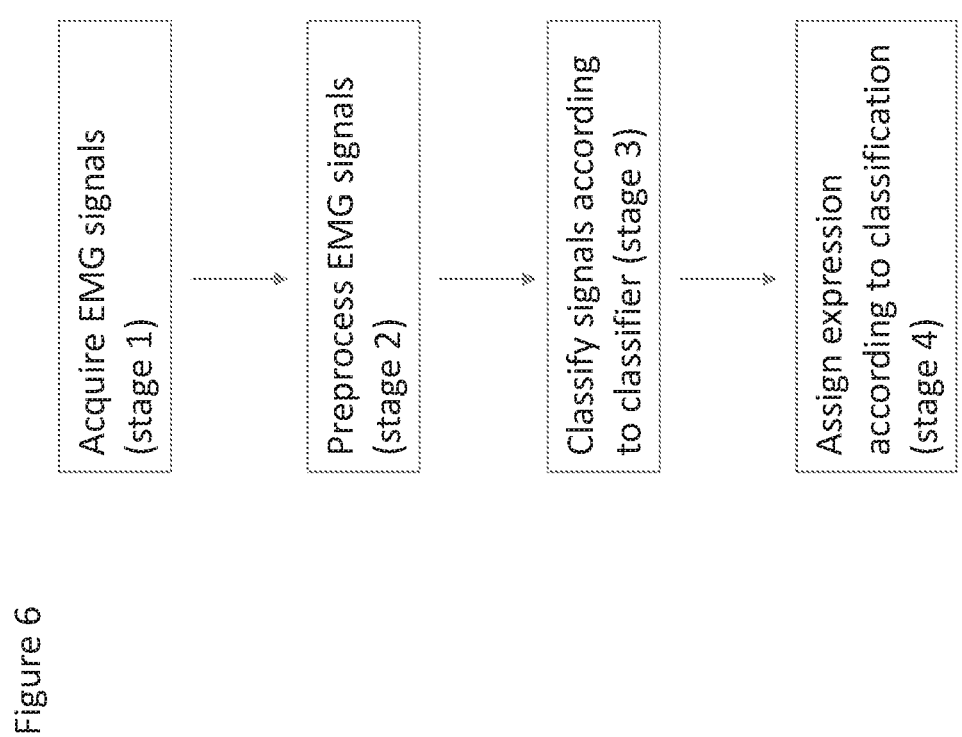
FIG. 6 shows a non-limiting example method for facial expression classification according to some embodiments.

FIG. 6 shows an exemplary, non-limiting, illustrative method for facial expression classification according to at least some embodiments. As an example, at 602, a plurality of EMG signals can be acquired. In some implementations, the EMG signals are obtained as described in FIGS. 1A-2, e.g., from electrodes receiving such signals from facial muscles of a user.

At 604, the EMG signals can, in some implementations, be preprocessed to reduce or remove noise from the EMG signals. Preprocessing may also include normalization and/or other types of preprocessing to increase the efficiency and/or efficacy of the classification process, as described in greater detail below in the discussion of FIG. 7A. As one example, when using unipolar electrodes, the preprocessing can include reducing common mode interference or noise. Depending upon the type of electrodes used and their implementation, other types of preprocessing may be used in place of, or in addition to, common mode interference removal.

At 606, the preprocessed EMG signals can be classified using the classifier 108. The classifier 108 can classify the preprocessed EMG signals using a number of different classification protocols as discussed above with respect to FIG. 1A.

Figure 8A:
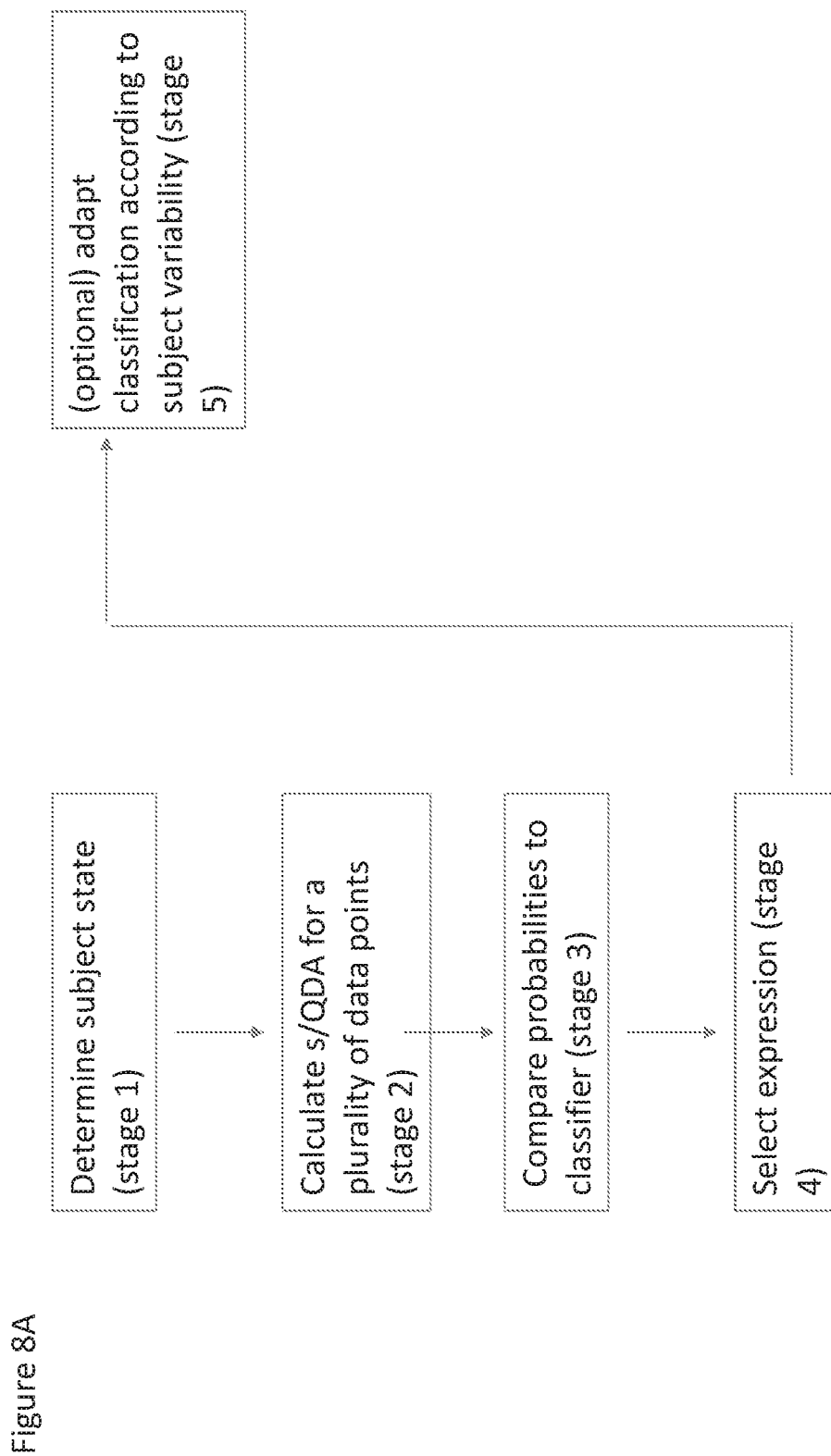
FIGS. 8A and 8B show different non-limiting examples of methods for facial expression classification according to at least some embodiments.
Figure 8B:
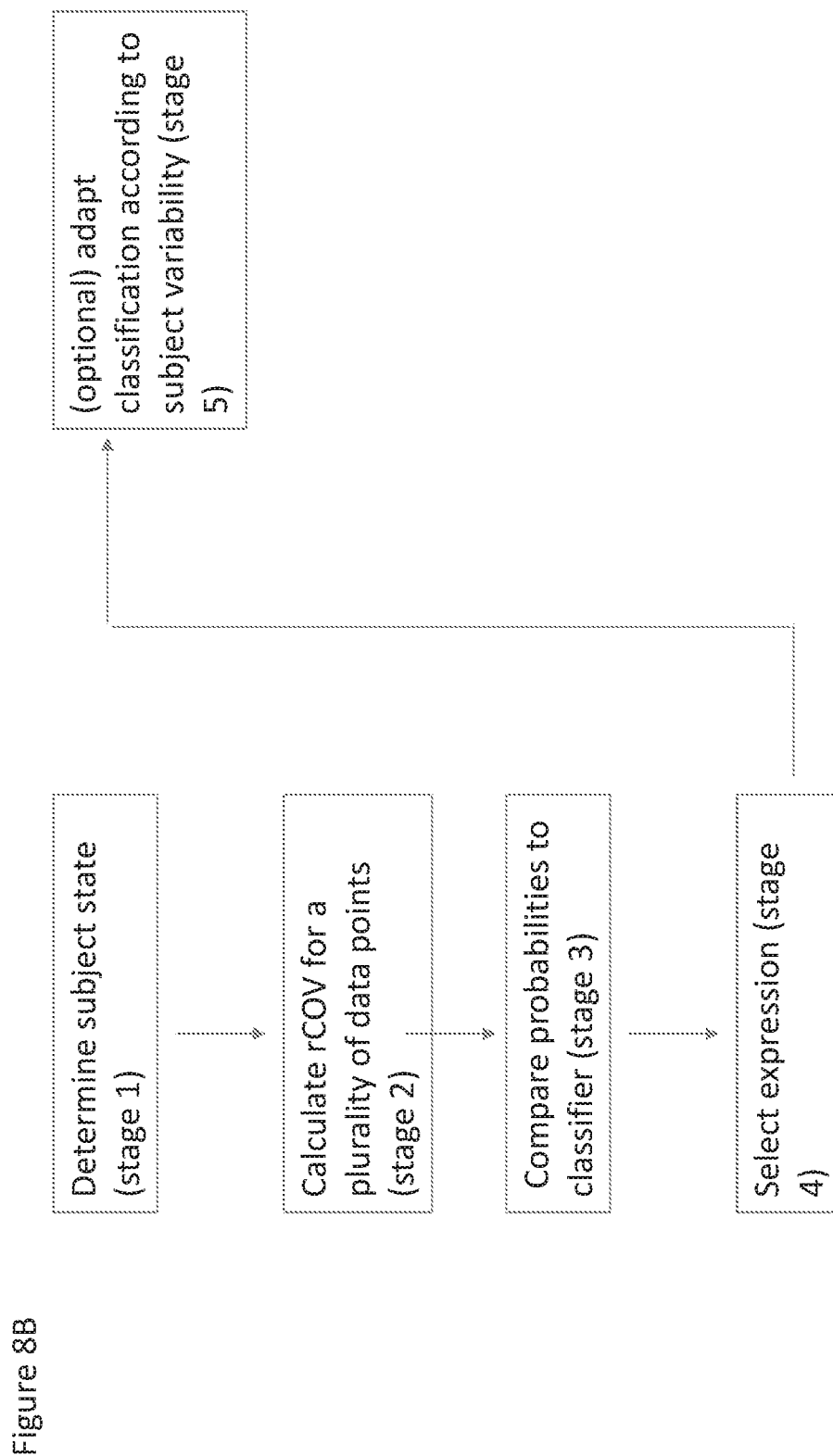

As described below in more detail, FIGS. 8A and 8B show non-limiting examples of classification methods which may be implemented. FIG. 8A shows an exemplary, non-limiting, illustrative method for classification according to QDA or sQDA; while FIG. 8B shows an exemplary, non-limiting, illustrative method for classification according to Riemannian geometry.

Figure 9A:
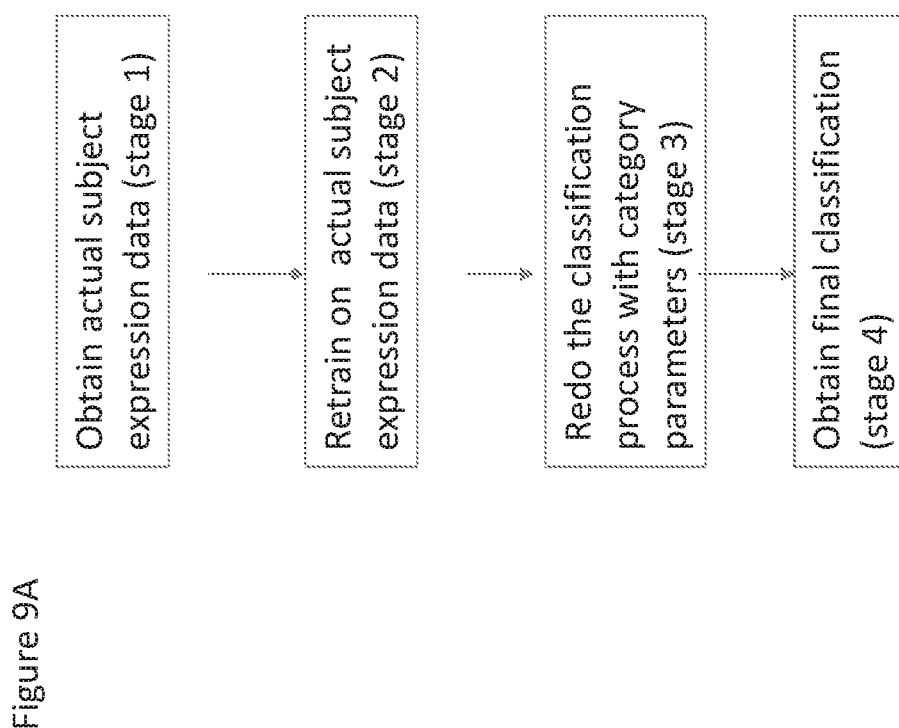
FIGS. 9A and 9B show non-limiting examples of facial expression classification adaptation according to at least some embodiments (such methods may also be applicable outside of adapting/training a classifier)
Figure 9B:
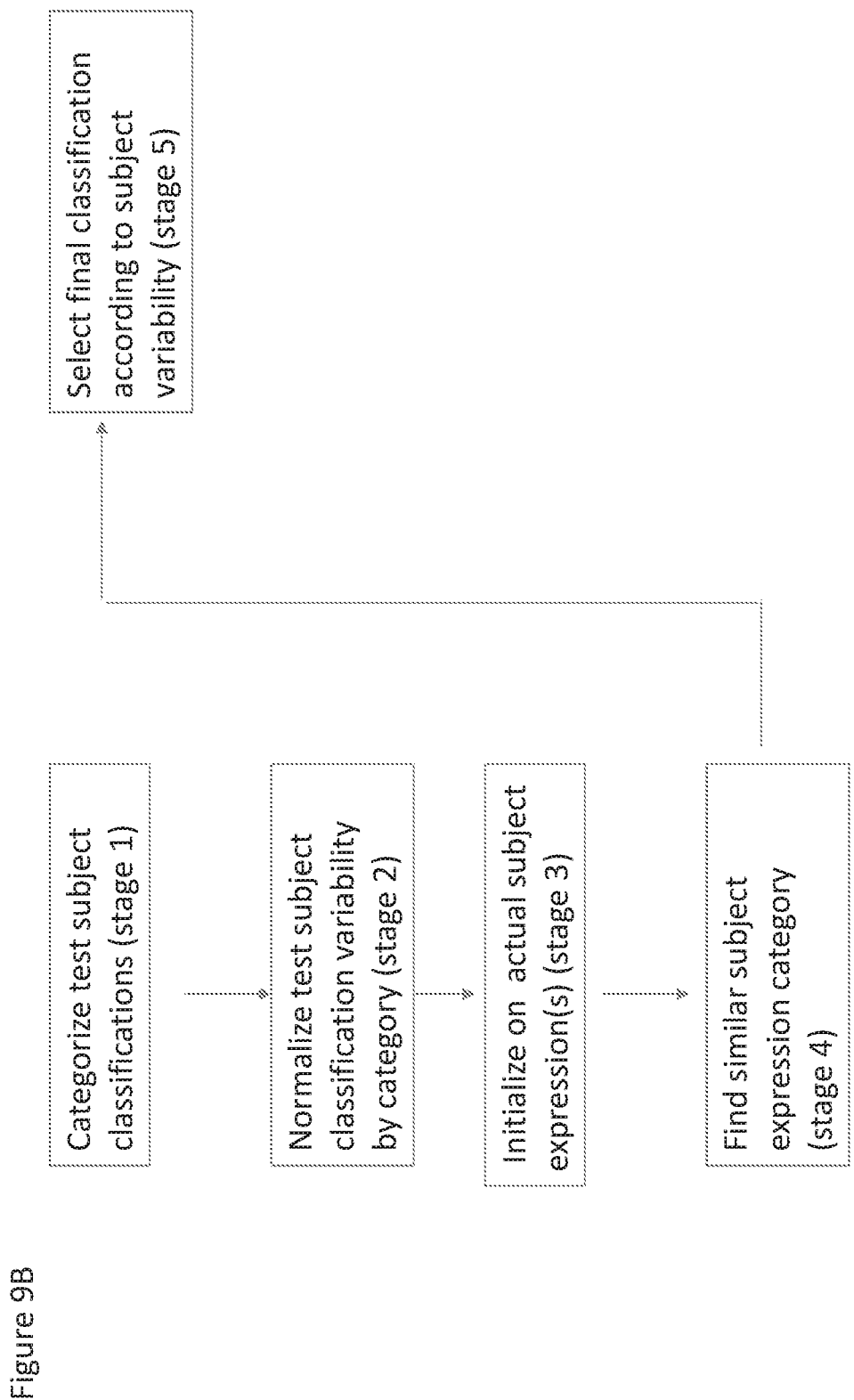

As described below in more detail, FIG. 9B shows an exemplary, non-limiting, illustrative method for facial expression classification adaptation which may be used for facial expression classification, whether as a stand-alone method or in combination with one or more other methods as described herein. The method shown may be used for facial expression classification according to categorization or pattern matching, against a data set of a plurality of known facial expressions and their associated EMG signal information.

Turning back to 606, the classifier 108, in some implementations, can classify the preprocessed EMG signals to identify facial expressions being made by the user, and/or to otherwise classify the detected underlying muscle activity as described in the discussion of FIG. 1A. At 608, the classifier 108 can, in some implementations, determine a facial expression of the user based on the classification made by the classifier 108.

Figure 7A:
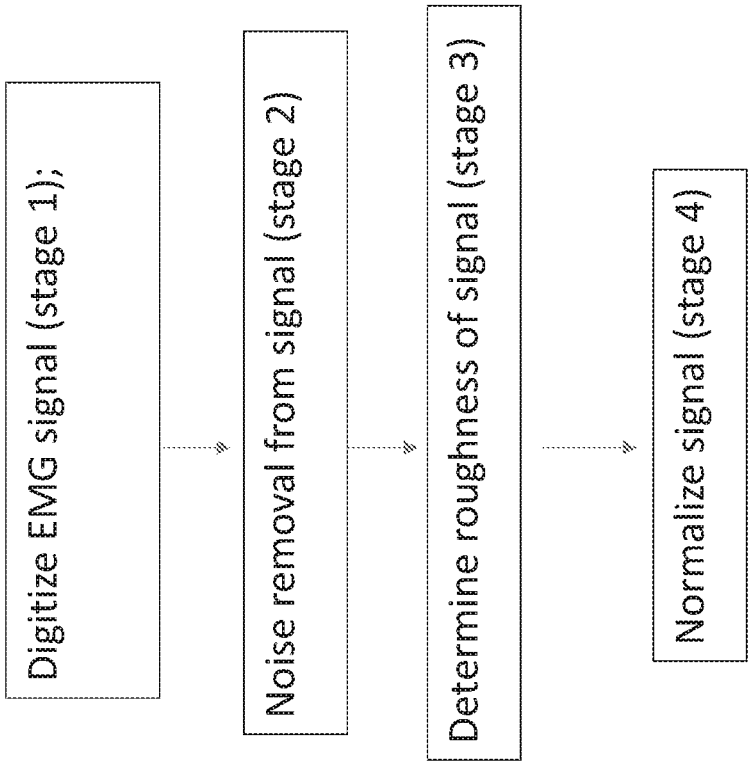
FIG. 7A shows a non-limiting example of a method for preprocessing of EMG signals according to some embodiments.
Figure 7B:
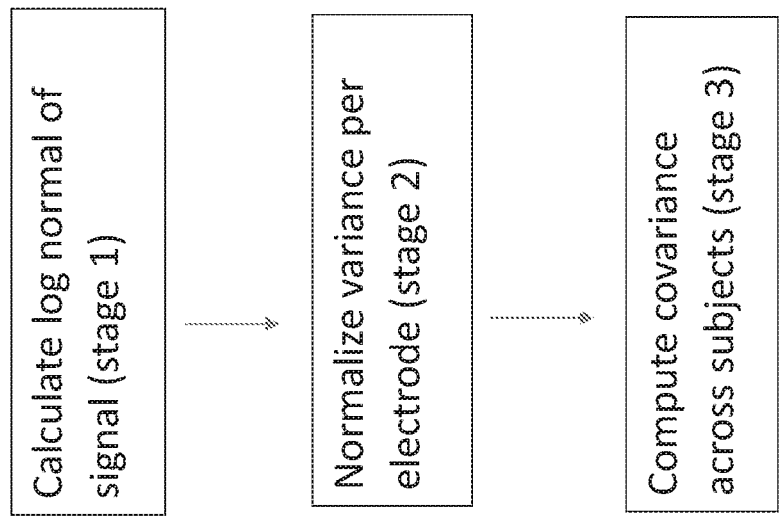
FIG. 7B shows a non-limiting example of a method for normalization of EMG signals according to some embodiments.
Figure 7C:
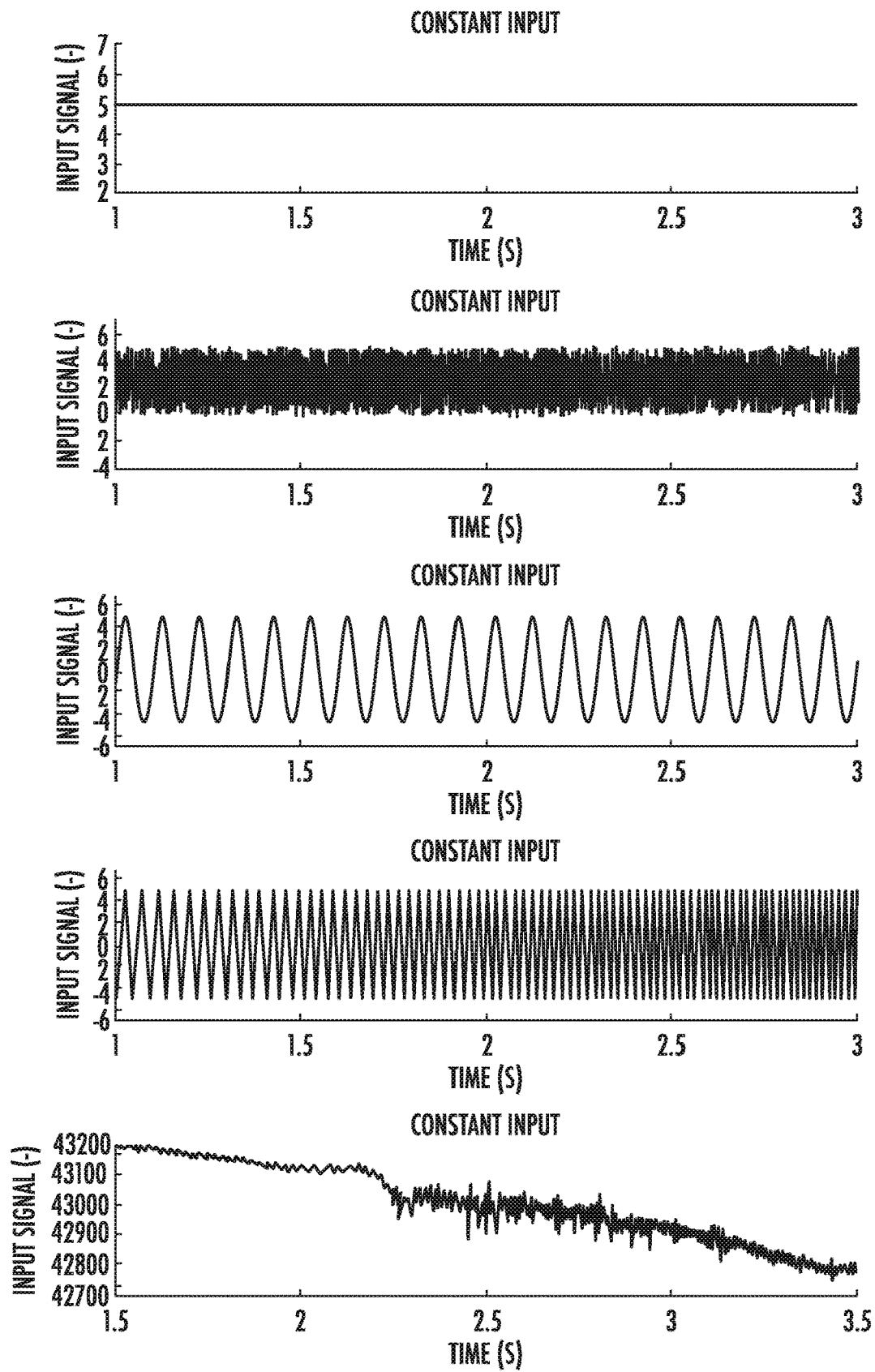
FIG. 7C shows results of roughness calculations for different examples of signal inputs, according to some embodiments.

With respect to FIGS. 7A-7C, the following variables may be used in embodiments described herein:

$x_i^{(raw)}$: vector of raw data recorded by electrodes 113, at a time i, of size (p×1), where p can be a dimension of the vector (e.g., where the dimension can correspond to a number of electrodes 113 attached to the user and/or collecting data from the user's muscles).

$x_i^{(rcm)}$: $x_i^{(raw)}$ where the common mode has been removed.

$x_i$: roughness computed on $x_i^{(rcm)}$ (e.g., to be used as features for classification).

K: number of classes to which classifier 108 can classify $x_i^{(raw)}$ $\mu_k$: sample mean vector for points belonging to class k.

$\Sigma_k$: sample covariance matrix for points belonging to class k.

FIG. 7A shows an exemplary, non-limiting, illustrative method for preprocessing of EMG signals according to at least some embodiments. As shown, at 702A the signal processing abstraction layer 104 (for example) can digitize analog EMG signal, to convert the analog signal received by the electrodes 113 to a digital signal. For example, at 702A, the classifier 108 can calculate the log normal of the signal. In some implementations, when the face of a user has a neutral expression, the roughness may follow a multivariate Gaussian distribution. In other implementations, when the face of a user is not neutral and is exhibiting a non-neutral expression, the roughness may not follow a multivariate Gaussian distribution, and may instead follow a multivariate log-normal distribution. Many known classification methods, however, are configured to process features that do follow a multivariate Gaussian distribution. Thus, to process EMG signals obtained from non-neutral user expressions, the classifier 108 can compute the log of the roughness before applying a classification algorithm:

$$x_i^{(log)} = \log(x_i)$$

At 704A, normalization of the variance of the signal for each electrode 113 may be performed; signal processing abstraction layer 104 can reduce and/or remove noise from the digital EMG signal. Noise removal, in some implementations, includes common mode removal. When multiple electrodes are used during an experiment, the recorded signal of all the electrodes can be aggregated into a single signal of interest, which may have additional noise or interference common to electrodes 113 (e.g., such as power line interference):

$$x_{i,e}^{(raw)} = x_{i,e}^{(rcm)} + \xi_i \qquad (1)$$

In the above equation, $\xi_i$ can be a noise signal that may contaminate the recorded EMG signals on all the electrodes. To clean the signal, a common mode removal method may be used, an example of which is defined as follows:

$$\xi_i = \frac{1}{p} \sum_{e=1}^{p} x_{i,e}^{(raw)} \qquad (2)$$

$$x_{i,e}^{(rcm)} = x_{i,e}^{(raw)} - \frac{1}{p} \sum_{e=1}^{p} x_{i,e}^{(raw)} \qquad (3)$$

At 706A, the covariance is calculated across electrodes, and in some implementations, across a plurality of users. For example, at 706A, the classifier 108 can analyze the cleaned signal to determine one or more features. For example, the classifier 108 can determine the roughness of the cleaned signal.

The roughness can be used to determine a feature $x_i$ that may be used to classify facial expressions. For example, the roughness of the cleaned EMG signal can indicate the amount of high frequency content in the clean signal $x_{i,e}^{(rcm)}$ and is defined as the filtered, second symmetric derivative of the cleaned EMG signal. For example, to filter the cleaned EMG signal, the classifier 108 can calculate a moving average of the EMG signal based on time windows of $\Delta T$. The roughness $r_{i,e}$ of the cleaned EMG signals from each electrode 113 can then be computed independently such that, for a given electrode e, the following function calculates the roughness of the EMG signals derived from that electrode:

$$\Delta x_{i,e} = (x_{i,e}^{(rcm)} - x_{i-1,e}^{(rcm)}) \qquad (4)$$

$$\Delta^2 x_{i,e} = x_{i-2,e}^{(rcm)} - 2x_{i-1,e}^{(rcm)} + x_{i,e}^{(rcm)} \qquad (5)$$

$$r_{i,e} = \frac{1}{\Delta T} \sum_{j=-\Delta T}^{0} (\Delta^2 x_{i+j,e})^2 \qquad (6)$$

Steps 704A and 706A can therefore process the EMG signals so as to be more efficiently classified using classifiers such as LDA and QDA methods, and their variants such as sQDA. The computation of the covariance 706A is especially important for training discriminant classifiers such as QDA. However, steps 704A and 706A are less critical for classifiers such as Riemannian geometry. The computation of the covariance at 706A can also be used for running classifiers based upon Riemannian geometry.

At 708A, the classifier 108 can also normalize the EMG signal. Normalization can be performed as described in greater detail below with regard to FIG. 7B, which shows a non-limiting, exemplary method for normalization of EMG signals according to at least some embodiments of the present disclosure. At 702B, the log normal of the signal is optionally calculated. The inventors have found, surprisingly, that when the face of a subject has a neutral expression, the roughness diverges less from a multivariate Gaussian distribution, than when the subject has a non-neutral expression. However, when the face of a subject is not neutral and is exhibiting a non-neutral expression, the roughness diverges even more from a multivariate Gaussian distribution. In fact, it is well described by a multivariate log-normal distribution. However many, if not all, classification methods (especially the most computationally efficient ones) expect the features to be analyzed to follow a multivariate Gaussian distribution.

To overcome this problem, one can simply compute the log of the roughness before applying any classification algorithms:

$$x_i^{(log)} = \log(x_i) \quad (7)$$

704B features the normalization of the variance of the signal for each electrode is calculated. At 706B, the covariance is calculated across electrodes, and in some implementations, across a plurality of users.

FIG. 7C shows example results of roughness calculations for different examples of signal inputs. In general, the roughness can be seen as a nonlinear transformation of the input signal that enhances the high-frequency contents. For example, in some implementations, roughness may be considered as the opposite of smoothness.

Since the roughness of an EMG signal can be a filter, the roughness can contain one free parameter that can be fixed a priori (e.g., such as a time window $\Delta T$ over which the roughness is computed). This free parameter (also referred to herein as a meta-parameter), in some implementations, can have a value of 100 milliseconds. In this manner, the meta-parameter can be used to improve the efficiency and accuracy of the classification of the EMG signal.

FIGS. 8A and 8B show different exemplary, non-limiting, illustrative methods for facial expression classification according to at least some embodiments, and the following variables may be used in embodiments described herein: $x_i$: data vector at time i, of size (p×1), where p is the dimension of the data vector (e.g., a number of features represented and/or potentially represented within the data vector).

K: number of classes (i.e. the number of expressions to classify)

μ: sample mean vector

Σ: sample covariance matrix

FIG. 8A shows an exemplary, non-limiting, illustrative method for facial expression classification according to a quadratic form of discriminant analysis, which can include QDA or sQDA. At 802A, the state of the user can be determined, in particular with regard to whether the face of the user has a neutral expression or a non-neutral expression. The data is therefore, in some implementations, analyzed to determine whether the face of the user is in a neutral expression state or a non-neutral expression state. Before facial expression determination begins, the user can be asked to maintain a deliberately neutral expression, which is then analyzed. Alternatively, the signal processing abstraction layer 104 can determine the presence of a neutral or non-neutral expression without this additional information, through a type of pre-training calibration.

The determination of a neutral or non-neutral expression can be performed based on a determination that the roughness of EMG signals from a neutral facial expression can follow a multivariate Gaussian distribution. Thus, by performing this process, the signal processing abstraction layer 104 can detect the presence or absence of an expression before the classification occurs.

Assume that in the absence of expression, the roughness r is distributed according to a multivariate Gaussian distribution (possibly after log transformation):

$$r \sim \mathcal{N}(\mu_0, \Sigma_0)$$

Neutral parameters can be estimated from the recordings using sample mean and sample covariance. Training to achieve these estimations is described with regard to FIG. 10 according to a non-limiting, example illustrative training method.

At each time-step, the signal processing abstraction layer 104 can compute the chi-squared distribution (i.e. the multivariate Z-score):

$$z_i = (r_i - \mu_0)^T \Sigma_0^{-1} (r_i - \mu_0)$$

If $z_i > z_{threshold}$, then the signal processing abstraction layer 104 can determine that the calculated roughness significantly differ from that which is expected if the user's facial muscles were in a neutral state (i.e., that the calculated roughness does not follow a neutral multivariate Gaussian distribution). This determination can inform the signal processing abstraction layer 104 that an expression was detected for the user, and can trigger the signal processing abstraction layer 104 to send the roughness value to the classifier 108, such that the classifier 108 can classify the data using one of the classifiers.

If $z_i \leq z_{threshold}$, then the signal processing abstraction layer 104 can determine that the calculated roughness follows a neutral multivariate Gaussian distribution, and can therefore determine that the user's expression is neutral.

In some implementations, the threshold $z_{threshold}$ can be set to a value given in a chi-squared table for p-degree of liberty and an $\alpha = 0.001$, and/or to a similar value. In some implementations, this process can improve the accuracy at which neutral states are detected, and can increase an efficiency of the system in classifying facial expressions and/or other information from the user.

At 804A, if the signal processing abstraction layer 104 determines that the user made a non-neutral facial expression, discriminant analysis can be performed on the data to classify the EMG signals from the electrodes 113. Such discriminant analysis may include LDA analysis, QDA analysis, variations such as sQDA, and/or the like.

In a non-limiting example, using a QDA analysis, the classifier can perform the following. In the linear and quadratic discriminant framework, data $x_k$ from a given class k is assumed to come from multivariate Gaussian distribution with mean $\mu_k$ and covariance $\Sigma_k$. Formally one can derive the QDA starting from probability theory.

Assume p(x|k) follows a multivariate Gaussian distribution:

$$p(x|k) = \frac{1}{(2\pi)^{\frac{p}{2}}|\Sigma_k|^{\frac{1}{2}}} \exp\left[-\frac{1}{2}(x-\mu_k)^T \Sigma_k^{-1}(x-\mu_k)\right] \quad (8)$$

with class prior distribution $\pi_k$ $$\sum_{k=1}^{K} \pi_k = 1 \quad (9)$$

and unconditional probability distribution:

$$p(x) = \sum_{k=1}^{K} \pi_k p(x|k) \quad (10)$$

Then applying Bayes rule, the posterior distribution is given by:

$$p(k|x) = \frac{\pi_k p(x|k)}{p(x)} \quad (11)$$

$$p(k|x) \propto \pi_k p(x|k) \quad (12)$$

Description of QDA

The goal of the QDA is to find the class k that maximizes the posterior distribution p(k|x) defined by Eq. 12 for a data point $x_i$.

$$\hat{k}_i = \mathrm{argmax}_k p(k|x_i) \quad (13)$$

In other words, for a data point $x_i$ QDA describes the most probable probability distribution p(k|x) from which the data point is obtained, under the assumption that the data are normally distributed.

Eq. 13 can be reformulated to explicitly show why this classifier may be referred to as a quadratic discriminant analysis, in terms of its log-posterior $\log(\pi_k p(x_i|k))$, also called log-likelihood.

Posterior:

The posterior Gaussian distribution is given by:

$$\pi_k p(x_i|k) = \pi_k (2\pi)^{-\frac{p}{2}} |\Sigma_k|^{-\frac{1}{2}} \exp\left[-\frac{1}{2}(x_i - \mu_k)^T \Sigma_k^{-1}(x_i - \mu_k)\right] \quad (14)$$

Log-Posterior:

Taking the log of the posterior does not change the location of its maximum (since the log-function is monotonic), so the Log-Posterior is:

$$\log(\pi_k p(x_i|k)) = \log\left(\pi_k (2\pi)^{-\frac{p}{2}} \left|\sum_k\right|^{-\frac{1}{2}} \exp\left[-\frac{1}{2}(x_i-\mu_k)^T \sum_k^{-1}(x_i-\mu_k)\right]\right) \quad (15)$$

$$\log(\pi_k p(x_i|k)) =$$

$$\log(\pi_k) - \frac{1}{2}\left(p\log(2\pi) + \log\left(\left|\sum_k\right|\right) + (x_i-\mu_k)^T \sum_k^{-1}(x_i-\mu_k)\right) \quad (16)$$

QDA Discriminant Function

Since the class k that maximizes Eq. 16 for a data point $x_i$ is of interest, it is possible to discard the terms that are not class-dependent (i.e., $\log(2\pi)$) and for readability multiply by $-2$, thereby producing the discriminant function given by:

$$d_k^{(qda)}(x_i) = (x_i - \mu_k)^T \Sigma_k^{-1}(x_i - \mu_k) + \log(|\Sigma_k|) - 2\log(\pi_k) \quad (17)$$

In Eq. 17, it is possible to see that the discriminant function of the QDA is quadratic in x, and to therefore define quadratic boundaries between classes. The classification problem stated in Eq. 13 can be rewritten as:

$$k = \mathrm{argmin}_k d_k^{(qda)}(x_i) \quad (18)$$

LDA

In the LDA method, there is an additional assumption on the class covariance of the data, such that all of the covariance matrices $\Sigma_k$ of each class are supposed to be equal, and classes only differ by their mean $\mu_k$:

$$\Sigma_k = \Sigma, \forall k \in \{1, \ldots, K\} \quad (19)$$

Replacing $\Sigma_k$ by $\Sigma$ and dropping all the terms that are not class-dependent in Eq. 17, the discriminant function of the LDA $d_k^{(lda)}(x_i)$ is obtained:

$$d_k^{(lda)}(x_i) = 2\mu_k^T \Sigma^{-1} \mu_k - 2\log(\pi_k) \quad (20)$$

QDA for a Sequence of Data Points

In the previous section, the standard QDA and LDA were derived from probability theory. In some implementations, QDA classifies data point by point; however, in other implementations, the classifier can classify a plurality of n data points at once. In other words, the classifier can determine from which probability distribution the sequence $\tilde{x}$ has been generated. It is a naive generalization of the QDA for time series. This generalization can enable determination of (i) if it performs better than the standard QDA on EMG signal data and (ii) how it compares to the Riemann classifier described with regard to FIG. 8B below.

Assuming that a plurality of N data points is received, characterized as:

$$\{x_i, \ldots, x_{i+N}\}$$

then according to Eq. 12 one can compute the probability of that sequence to have been generated by the class k, simply by taking the product of the probability of each data point:

$$p(k|\tilde{x}) = \prod_{i=1}^{N} p(k|x_i) \quad (21)$$

$$p(k|\tilde{x}) \propto \prod_{i=1}^{N} (\pi_k p(x_i|k)) \quad (22)$$

As before, to determine the location of the maximum value, it is possible to take the log of the posterior, or the log-likelihood of the time-series:

$$\log\left[\prod_{i=1}^{N}(\pi_k p(x_i|k))\right] = \sum_{i=1}^{N}[\log(\pi_k p(x_i|k))] \quad (23)$$

$$= \sum_{i=1}^{N}[\log(p(x_i|k)) + \log(\pi_k)] \quad (24)$$

$$= \sum_{i=1}^{N} \log(p(x_i|k)) + \sum_{i=1}^{N} \log(\pi_k) \quad (25)$$

-continued $$= \sum_{i=1}^{N} \log(p(x_i|k)) + N\log(\pi_k) \quad (26)$$

Plugging Eq. 8, the log-likelihood $L(x^{\sim}|k)$ of the data is given by:

$$L(\hat{x}|k) = N\log(\pi_k) - \frac{1}{2}\sum_{i=1}^{N}\left(p\log(2\pi) + \log\left(\left|\sum_k\right|\right) + \right.$$

$$\left. (x_i - \mu_k)^T \sum_k^{-1}(x_i - \mu_k)\right) \quad (27)$$

$$= N\log(\pi_k) - \frac{N_p}{2}\log(2\pi) - \frac{N_p}{2}\log\left(\left|\sum_k\right|\right) - \quad (28)$$

$$\frac{1}{2}\sum_{i=1}^{N}\left((x_i - \mu_k)^T \sum_k^{-1}(x_i - \mu_k)\right)$$

As for the standard QDA, dropping the terms that are not class-dependent and multiplying by −2 gives use the new discriminant function $$d_k^{(sQDA)}(\tilde{x})$$

of the sequential QDA (sQDA) as follows:

$$d_k^{(sQDA)}(\tilde{x}) = \sum_{i=1}^{N}\left[(x_i - \mu_k)^T \sum_k^{-1}(x_i - \mu_k)\right] + N\log\left(\left|\sum_k\right|\right) - 2N\log(\pi_k) \quad (29)$$

Finally, the decision boundaries between classes leads to the possibility of rewriting the classification problem stated in Eq. 13 as:

$$\hat{k} = \operatorname{argmin}_k d_k^{(sQDA)}(\tilde{x}) \quad (30)$$

Links Between QDA and Time-Series sQDA

In some implementations of the QDA, each data point can be classified according to Eq. 18. Then, to average out transient responses so as to provide a general classification (rather than generating a separate output at each time-step), a majority voting strategy may be used to define output labels every N-time-step.

In the majority voting framework, the output label
$\hat{\tilde{k}}$
can be defined as the one with the most occurrences during the N last time-step. Mathematically it can be defined as:

$$\hat{\tilde{k}}^{(qda)} = \operatorname{argmax}_{1 \le k \le K} \sum_{i=1}^{N}\left(f(\hat{k}_i, k)\right) \quad (31)$$

For Eq. 31, f is equal to one when the two arguments are the same and zero otherwise.

In the case of the sQDA, the output label
$\hat{\tilde{k}}$
can be computed according to Eq. 29. The two approaches can thus differ in the way they each handle the time-series. Specifically, in the case of the QDA, the time-series can be handled by a majority vote over the last N time samples, whereas for the sQDA, the time-series can be handled by cleanly aggregating probabilities overtime.

$$\hat{\tilde{k}}^{(qda)} = \operatorname{argmax}_{1 \le k \le K} \sum_{i=1}^{N}(\pi_k p(x_i|k)) \quad (32)$$

Comparison of the QDA and sQDA Classifiers

Figure 8C:
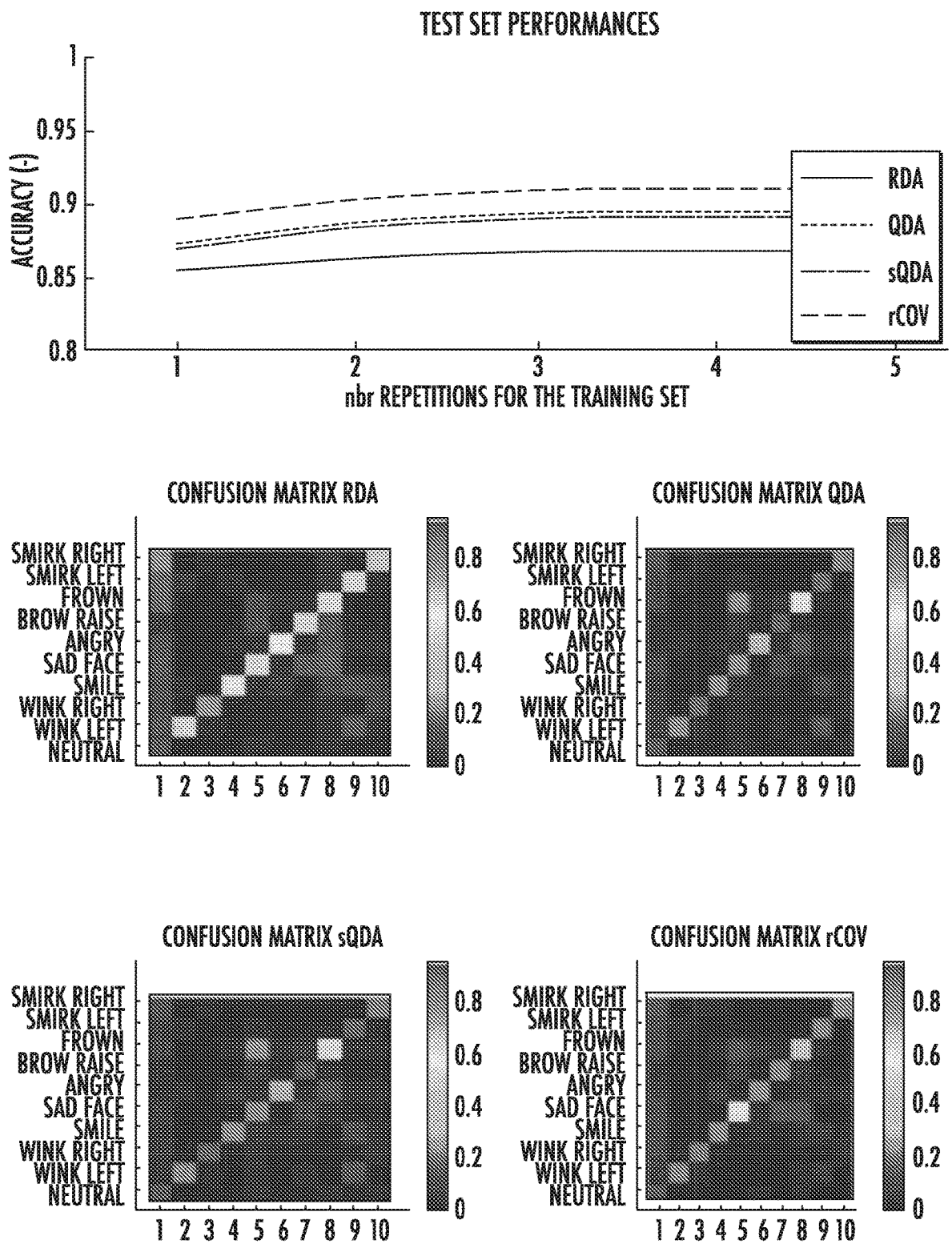
FIGS. 8C-8F show results of various analyses and comparative tests according to some embodiments.

FIG. 8C shows the accuracy obtained of a test of classification averaged on 4 different users. Each test set is composed of a maximum of 5 repetitions of a task where the user is asked to display the 10 selected expressions twice.

For example, FIG. 8C(A) shows accuracy on the test set as a function of the training set size in number of repetitions of the calibration protocol. FIG. 8C(B) shows confusion matrices of the four different models. FIG. 8C(C) shows accuracy as a function of the used classification model, computed on the training set, test set and on the test for the neutral model.

From FIG. 8C(C), one can observe that no model performs better on the training set than on the test set, indicating absence of over-fitting. Second, from FIG. 8C(A), one can observe that all of the models exhibit good performances with the minimal training set. Therefore, according to at least some embodiments, the calibration process may be reduced to a single repetition of the calibration protocol. An optional calibration process and application thereof is described with regard to FIG. 9A, although this process may also be performed before or after classification.

Third, the confusion matrices FIG. 8C(B) illustrate that the classifier 108 may use more complex processes to classify some expressions correctly, such as for example expressions that may appear as the same expression to the classifier, such as sad, frowning and angry expressions.

Finally, the models do not perform equivalently on the neutral state (data not shown). In particular, both the sQDA and the QDA methods encounter difficulties staying in the neutral state in between forced (directed) non-neutral expressions. To counterbalance this issue, determining the state of the subject's expression, as neutral or non-neutral, can be performed as described with regard to 802A.

Turning back to FIG. 8A, 806A, the probabilities obtained from the classification of the specific user's results can be considered to determine which expression the user is likely to have on their face. At 808A, the predicted expression of the user is selected. At 810, the classification can be adapted to account for inter-user variability, as described with regard to the example, illustrative non-limiting method for adaptation of classification according to variance between users shown in FIG. 9A.

FIG. 8B shows a non-limiting example of a method for classification according to Riemannian geometry. At 802B, in some implementations, can proceed as previously described 802A of FIG. 8A. At 804B, rCOV can be calculated for a plurality of data points, optionally according to the example method described below.

The Riemannian Framework

Riemann geometry takes advantage of the particular structure of covariance matrices to define distances that can be useful in classifying facial expressions. Mathematically, the Riemannian distance as a way to classify covariance matrices may be described as follows:

Covariance matrices have some special structure that can be seen as constraints in an optimization framework.

Covariance matrices are semi-positive definite matrices (SPD).

Since covariance can be SPD, the distance between two covariance matrices may not be measurable by Euclidean distance, since Euclidean distance may not take into account the special form of the covariance matrix.

To measure the distance between covariance matrices, one has to use the Riemannian distance $\delta_r$ given by:

$$\delta_r\left(\sum_1, \sum_2\right) = \left\|\log\left(\sum_1^{-\frac{1}{2}} \sum_2 \sum_1^{-\frac{1}{2}}\right)\right\|_F = \left(\sum_{c=1}^C \log^2(\lambda_c)\right)^{\frac{1}{2}} \quad (33)$$

where
$\|\ldots\|_F$
is the Froebenius norm and where
$\lambda_c, c=1, \ldots, C$
are the real eigenvalues of $$\sum_1^{-\frac{1}{2}} \sum_2 \sum_1^{-\frac{1}{2}}$$

then the mean covariance matrix $K_i$ over a set of I covariance matrices may not be computed as the Euclidean mean, but instead can be calculated as the covariance matrix that minimizes the sum squared Riemannian distance over the set:

$$\sum_k = G\left(\sum_1, \ldots, \sum_I\right) = \operatorname{argmin}_\Sigma = \sum_{i=1}^I \delta_r^2\left(\sum, \sum_i\right) \quad (34)$$

Note that the mean covariance $\Sigma_k$ computed on a set of I covariance matrices, each of them estimated using t milliseconds of data, may not be equivalent to the covariance estimated on the full data set of size $t_f$. In fact, the covariance estimated on the full data set may be more related to the Euclidean mean of the covariance set.

Calculating the Riemannian Classifier, rCOV

To implement the Riemannian calculations described above as a classifier, the classifier 108 can:

Select the size of the data used to estimate a covariance matrix.

For each class k, compute the set of covariance matrices of the data set.

The class covariance matrix $\Sigma_k$ is the Riemannian mean over the set of covariances estimated before.

A new data point, in fact a new sampled covariance matrix $\Sigma_i$, is assigned to the closest class:

$\hat{k}^{(i)} = \operatorname{argmin}_k \delta_r(\Sigma_k, \Sigma_i)$

Relationship Between sQDA and rCov Classifiers

First, the sQDA discriminant distance can be compared to the Riemannian distance. As explained before in the sQDA framework, the discriminant distance between a new data point $x_i$ and a reference class k is given by Eq. 29, and can be the sum of the negative log-likelihood. Conversely, in the Riemannian classifier, the classification can be based on the distance given by Eq. 33. To verify the existence of conceptual links between these different methods, and to be able to bridge the gap between sQDA and rCOV, FIG. 8F shows the discriminant distance as a function of the Riemann distance, computed on the same data set and split class by class. Even if these two distances correlate, there is no obvious relationship between them, because the estimated property obtained through sQDA is not necessarily directly equivalent to the Riemannian distance—yet in terms of practical application, the inventors have found that these two methods provide similar results. By using the Riemannian distance, the classifier 108 can use fewer parameters to train to estimate the user's facial expression.

FIG. 8F shows the sQDA discriminant distance between data points for a plurality of expressions and one reference class as a function of the Riemann distance. The graphs in the top row, from the left, show the following expressions: neutral, wink left, wink right. In the second row, from the left, graphs for the following expressions are shown: smile, sad face, angry face. The third row graphs show the following expressions from the left: brow raise and frown. The final graph at the bottom right shows the overall distance across expressions.

Comparison of QDA, sQDA and rCOV Classifiers

To see how each of the QDA, rCOV, and the sQDA methods perform, accuracy of each of these classifiers for different EMG data sets taken from electrodes in contact with the face are presented in Table 1.

TABLE 1

| Model | normal | | neutral | |
|---|---|---|---|---|
| | mean(accuracy) (%) | std(accuracy) (%) | mean(accuracy) (%) | std(accuracy) (%) |
| RDA | 86.23 | 5.92 | 86.97 | 6.32 |
| QDA | 84.12 | 6.55 | 89.38 | 5.93 |
| sQDA | 83.43 | 6.52 | 89.04 | 5.91 |
| rCOV | 89.47 | 6.10 | 91.17 | 5.11 |

Table 1 shows the classification accuracy of each model for 11 subjects (mean and standard deviation of performance across subjects). Note that for sQDA and rCOV, one label is computed using the last 100 ms of data, and featuring an optional 75% overlap (i.e. one output label every 25 ms).

When the previously described 802A model of distinguishing between neutral and non-neutral expressions is used, the stability in the neutral state increases for all the models, and overall performance increases (compare columns 2 and 4 in Table 1). However, different versions of this model show similar results across different classifier methods in FIGS. 8D and 8E, which show the predicted labels for the four different neutral models.

Figure 8D:
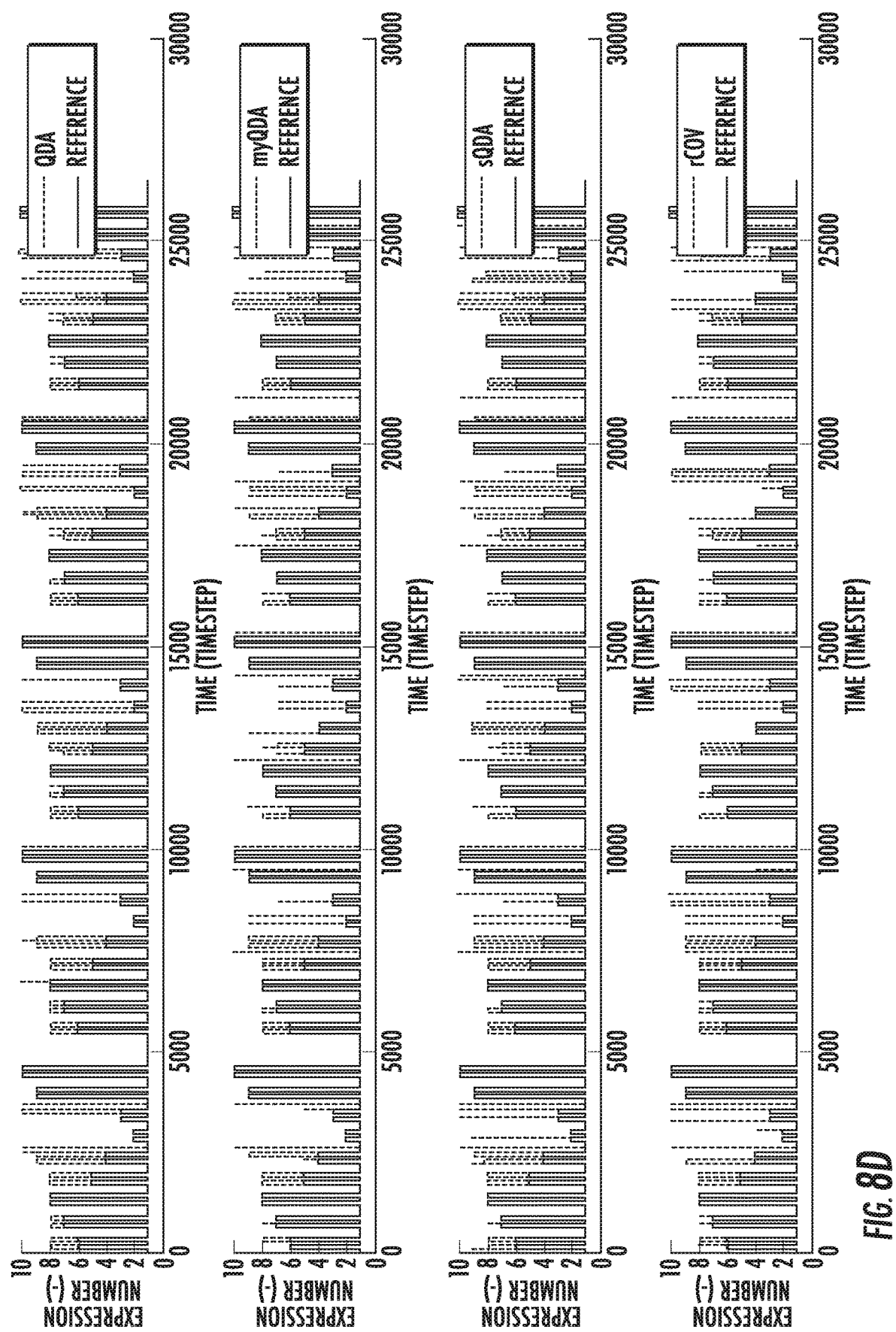

FIG. 8D shows the reference label and predicted label of the a) QDA, b) RDA, c) sQDA, and d) rCOV models. The RDA (regularized discriminant analysis) model can be a merger of the LDA and QDA methods, and can be used for example if there is insufficient data for an accurate QDA calculation. In the drawings, "myQDA" is the RDA model.

Figure 8E:
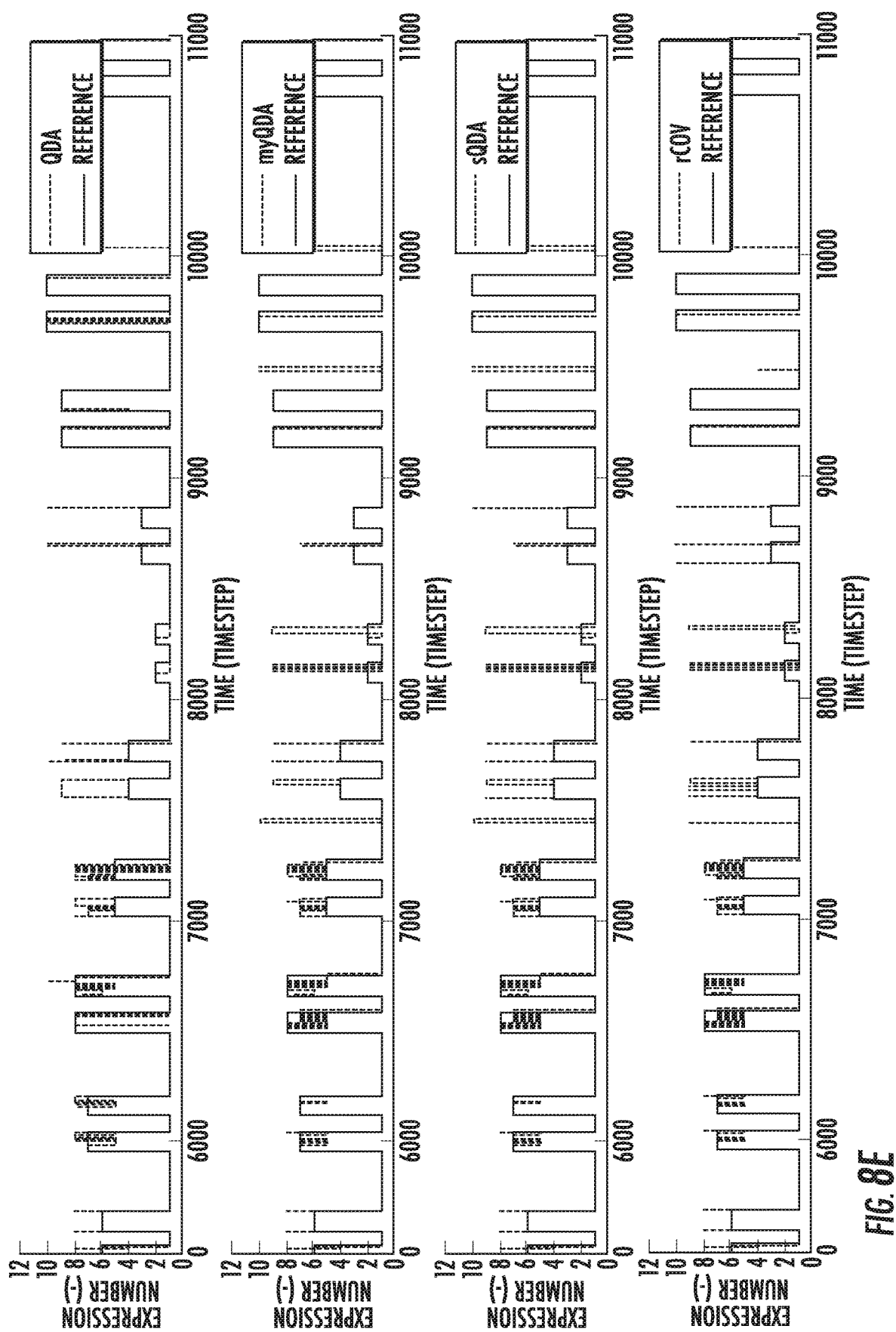
Figure 8F:
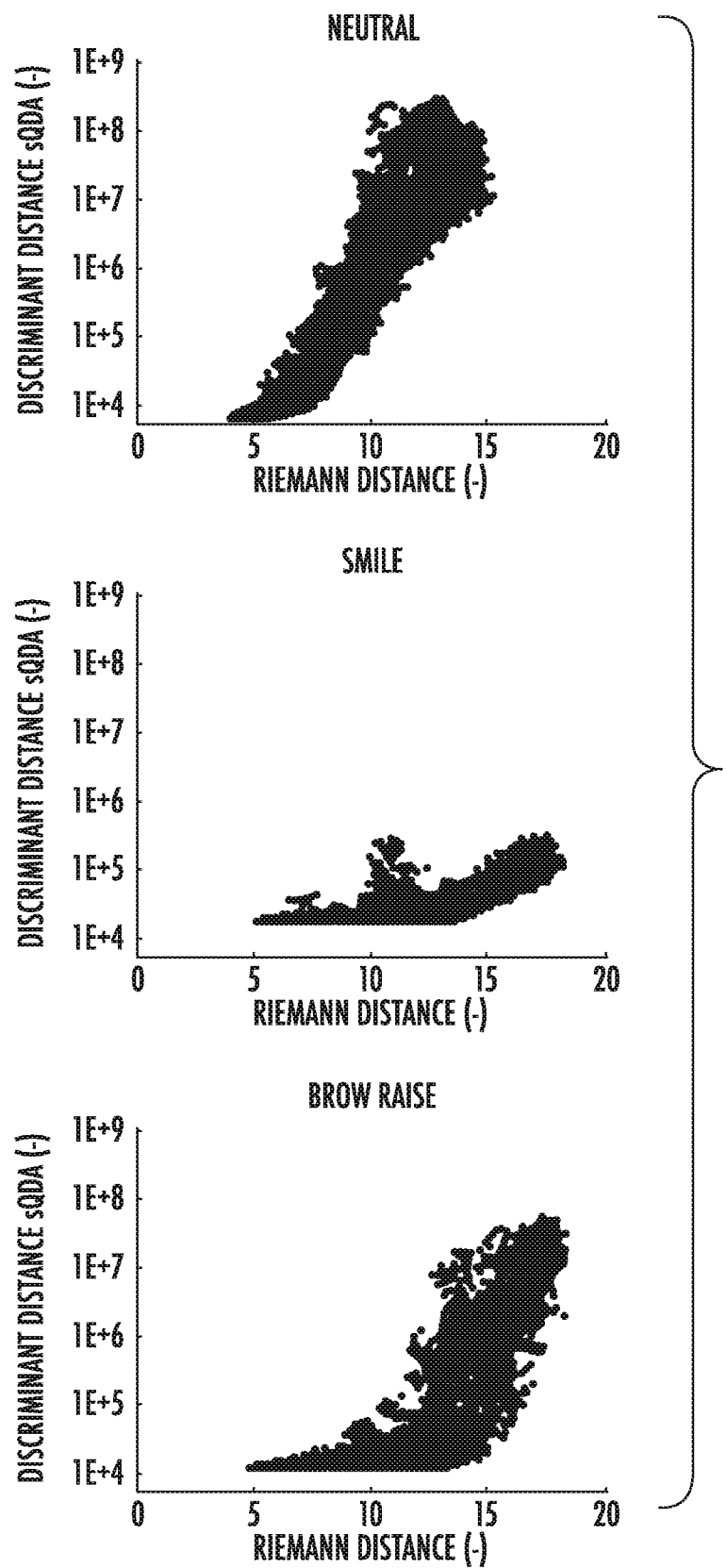

FIG. 8E shows a zoomed version of FIG. 8D.

Turning back to FIG. 8B, steps 806B, 808B and 810B are, in some implementations, performed as described with regard to FIG. 8A.

Turning now to FIGS. 9A and 9B, different example, non-limiting, illustrative methods for facial expression classification adaptation according to at least some embodiments of the present disclosure are shown.

FIG. 9A shows an example, illustrative non-limiting method for adaptation of classification according to variance between users. According to at least some embodiments, when adaptation is implemented, the beginning of classification can be the same. Adaptation in these embodiments can be employed at least once after classification of at least one expression of each user, at least as a check of accuracy and optionally to improve classification. Alternatively, or additionally, adaptation may be used before the start of classification before classification of at least one expression for each user.

In some implementations, adaptation can be used during training, with both neutral and non-neutral expressions. However, after training, the neutral expression (the neutral state) may be used for adaptation. For example, if the classifier employs QDA or a variant thereof, adaptation may reuse what was classified before as neutral, to retrain the parameters of the neutral classes. Next, the process may re-estimate the covariance and mean of neutral for adaptation, as this may deviate from the mean that was assumed by global classifier. In some implementations, only a non-neutral expression is used, such as a smile or an angry expression, for example. In that case, a similar process can be followed with one or more non-neutral expressions.

In the non-limiting example shown in FIG. 9A, expression data from the user is used for retraining and re-classification of obtained results. At 902A, such expression data is obtained with its associated classification for at least one expression, which can be the neutral expression for example. At 904A, the global classifier is retrained on the user expression data with its associated classification. At 906A, the classification process can be performed again with the global classifier. In some implementations, this process is adjusted according to category parameters, which can be obtained as described with regard to the non-limiting, example method shown in FIG. 9B. At 908A, a final classification can be obtained.

FIG. 9B shows a non-limiting example method for facial expression classification adaptation which may be used for facial expression classification, whether as a stand-alone method or in combination with one or more other methods as described herein. The method shown may be used for facial expression classification according to categorization or pattern matching, against a data set of a plurality of known facial expressions and their associated EMG signal information. This method, according to some embodiments, is based upon unexpected results indicating that users with at least one expression that shows a similar pattern of EMG signal information are likely to show such similar patterns for a plurality of expressions and even for all expressions.

At 902B, a plurality of test user classifications from a plurality of different users are categorized into various categories or "buckets." Each category, in some implementations, represents a pattern of a plurality of sets of EMG signals that correspond to a plurality of expressions. In some implementations, data is obtained from a sufficient number of users such that a sufficient number of categories are obtained to permit optional independent classification of a new user's facial expressions according to the categories.

At 904B, test user classification variability is, in some implementations, normalized for each category. In some implementations, such normalization is performed for a sufficient number of test users such that classification patterns can be compared according to covariance. The variability is, in some implementations, normalized for each set of EMG signals corresponding to each of the plurality of expressions. Therefore, when comparing EMG signals from a new user to each category, an appropriate category may be selected based upon comparison of EMG signals of at least one expression to the corresponding EMG signals for that expression in the category, in some implementations, according to a comparison of the covariance. In some implementations, the neutral expression may be used for this comparison, such that a new user may be asked to assume a neutral expression to determine which category that user's expressions are likely to fall into.

At 906B, the process of classification can be initialized on at least one actual user expression, displayed by the face of the user who is to have his or her facial expressions classified. As described above, in some implementations, the neutral expression may be used for this comparison, such that the actual user is asked to show the neutral expression on his or her face. The user may be asked to relax his or her face, for example, so as to achieve the neutral expression or state. In some implementations, a plurality of expressions may be used for such initialization, such as a plurality of non-neutral expressions, or a plurality of expressions including the neutral expression and at least one non-neutral expression.

If the process described with regard to this drawing is being used in conjunction with at least one other classification method, optionally for example such another classification method as described with regard to FIGS. 8A and 8B, then initialization may include performing one of those methods as previously described for classification. In such a situation, the process described with regard to this drawing may be considered as a form of adaptation or check on the results obtained from the other classification method.

At 908B, a similar user expression category is determined by comparison of the covariances for at least one expression, and a plurality of expressions, after normalization of the variances as previously described. The most similar user expression category is, in some implementations, selected. If the similarity does not at least meet a certain threshold, the process may stop as the user's data may be considered to be an outlier (not shown).

At 910B, the final user expression category is selected, also according to feedback from performing the process described in this drawing more than once (not shown) or alternatively also from feedback from another source, such as the previous performance of another classification method.

Figure 10:
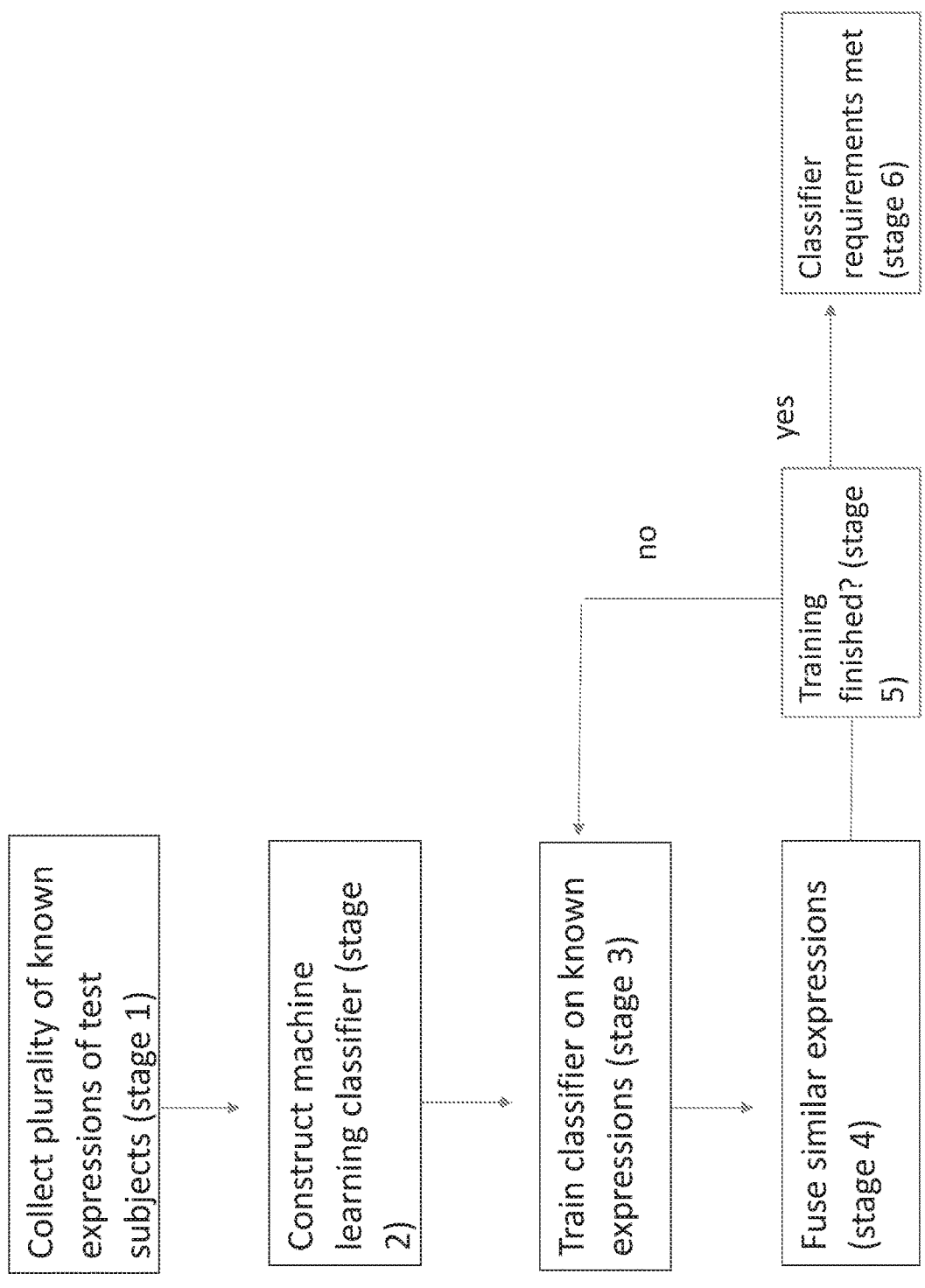
FIG. 10 shows a non-limiting example method for training a facial expression classifier according to some embodiments.

FIG. 10 shows a non-limiting example of a method for training a facial expression classifier according to at least some embodiments of the present disclosure. At 1002, the set of facial expressions for the training process is determined in advance, in some implementations, including a neutral expression.

Data collection may be performed as follows. A user is equipped with the previously described facemask to be worn such that the electrodes are in contact with a plurality of facial muscles. The user is asked to perform a set of K expression with precise timing. When is doing this task, the electrodes' activities are recorded as well as the triggers. The trigger clearly encodes the precise timing at which the user is asked to performed a given expression. The trigger is then used to segment data. At the end of the calibration protocol, the trigger time series trigi and the raw electrodes' activities $x_i^{(raw)}$ are ready to be used to calibrate the classifier.

At 1004, a machine learning classifier is constructed for training, for example, according to any suitable classification method described herein. At 1006, the classifier is trained. The obtained data is, in some implementations, prepared as described with regard to the preprocessing step as shown for example in FIG. 6, 604 and subsequent figures. The classification process is then performed as shown for example in FIG. 6, 606 and subsequent figures. The classification is matched to the known expressions so as to train the classifier. In some implementations, the determination of what constitutes a neutral expression is also determined. As previously described, before facial expression determination begins, the user is asked to maintain a deliberately neutral expression, which is then analyzed.

Therefore, first only the segment of the data is considered where the users were explicitly asked to stay in the neutral state $x_i$, $i \ni$ neutral. This subset of the data $X_{neutral}$ is well described by a multivariate Gaussian distribution $$X_{neutral} \sim \mathcal{N}(\vec{\mu}_{neutral}, \Sigma_{neutral}).$$

The mean vector $\vec{\mu}_{neutral}$ and the covariance matrix $\Sigma_{neutral}$ can be computed as the sample-mean and sample-covariance:

$$\vec{\mu}_{neutral} = \frac{1}{N_{neutral}} \sum_{i=1}^{N_{neutral}} \vec{x}_{i \in neutral} \tag{35}$$

$$\sum_{neutral} = \frac{1}{(N_{neutral} - 1)} \sum_{i=1}^{N_{neutral}} (\vec{x}_{i \in neutral} - \vec{\mu}_{neutral})(\vec{x}_{i \in neutral} - \vec{\mu}_{neutral})^T \tag{36}$$

Once the parameters have been estimated, it is possible to define a statistical test that tells if a data point $x_i$ is significantly different from this distribution, i.e. to detect when a non-neutral expression is performed by the face of the user.

When the roughness distribution statistically diverges from the neutral distribution, the signal processing abstraction layer 104 can determine that a non-neutral expression is being made by the face of the user. To estimate if the sampled roughness $x_i$ statistically diverges from the neutral state, the signal processing abstraction layer 104 can use the Pearson's chi-squared test given by:

$$z_i = (\vec{x}_i - \vec{\mu}_{neutral})^T \sum_{neutral}^{-1} (\vec{x}_i - \vec{\mu}_{neutral}) \tag{37}$$

$$\text{state} = \begin{cases} \text{neutral,} & \text{if } z_i \leq z_{th} \\ \text{expression,} & \text{otherwise} \end{cases}$$

For the above equation, note that the state description is shortened to "neutral" for a neutral expression and "expression" for a non-neutral expression, for the sake of brevity.

In the above equation, $z_{th}$ is at threshold value that defines how much the roughness should differ from the neutral expression before triggering detection of a non-neutral expression. The exact value of this threshold depends on the dimension of the features (i.e. the number of electrodes) and the significance of the deviation $\alpha$. As a non-limiting example, according to the $\chi^2$ table for 8 electrodes and a desired $\alpha$-value of 0.001, for example, $z_{th}$ is set to 26.13.

In practice but as an example only and without wishing to be limited by a single hypothesis, to limit the number of false positives and so to stabilize the neutral state, a value of $z_{th}$=50 has been found by the present inventors to give good results. Note that a $z_{th}$ of 50 corresponds to a probability $\alpha$-value of $\approx 1e^{-7}$, which is, in other words, a larger probability $p(x_i \neq \text{neutral}|z_i)$=0.99999995 of having an expression at this time step.

To adjust the threshold for the state detection, the standard $\chi^2$ table is used for 8 degrees of freedom in this example, corresponding to the 8 electrodes in this example non-limiting implementation. Alternatively given a probability threshold, one can use the following Octave/matlab code to set $Z_{th}$:
degreeOfFreedom=8;
dx=0.00001;
xx=0:dx:100;
y=chi2pdf(xx,degreeOfFreedom);
zTh=xx(find(cumsum(y*dx)>=pThreshold))(1);

In some implementations, at 1008, the plurality of facial expressions is reduced to a set which can be more easily distinguished. For example, a set of 25 expressions can be reduced to 5 expressions according to at least some embodiments of the present disclosure. The determination of which expressions to fuse may be performed by comparing their respective covariance matrices. If these matrices are more similar than a threshold similarity, then the expressions may be fused rather than being trained separately. In some implementations, the threshold similarity is set such that classification of a new user's expressions may be performed with retraining. Additionally, or alternatively, the threshold similarity may be set according to the application of the expression identification, for example for online social interactions. Therefore, expressions which are less required for such an application, such as a "squint" (in case of difficulty seeing), may be dropped as potentially being confused with other expressions.

Once the subset of data where non-neutral expression occurs is defined, as is the list of expressions to be classified, it is straightforward to extract the subset of data coming from a given expression. The trigger vector contains all theoretical labels. By combining these labels with the estimated state, one can extract what is called the ground-truth label $y_i$, which takes discrete values corresponding to each expressions.

$$y_i \in \{1, \ldots, K\} \tag{38}$$

where K is the total number of expressions that are to be classified.

At 1010, the results are compared between the classification and the actual expressions. If sufficient training has occurred, then the process moves to 1012. Otherwise, it returns to steps 1006 and 1008, which are optionally repeated as necessary until sufficient training has occurred.

At 1012, the training process ends and the final classifier is produced.

Figure 11A:
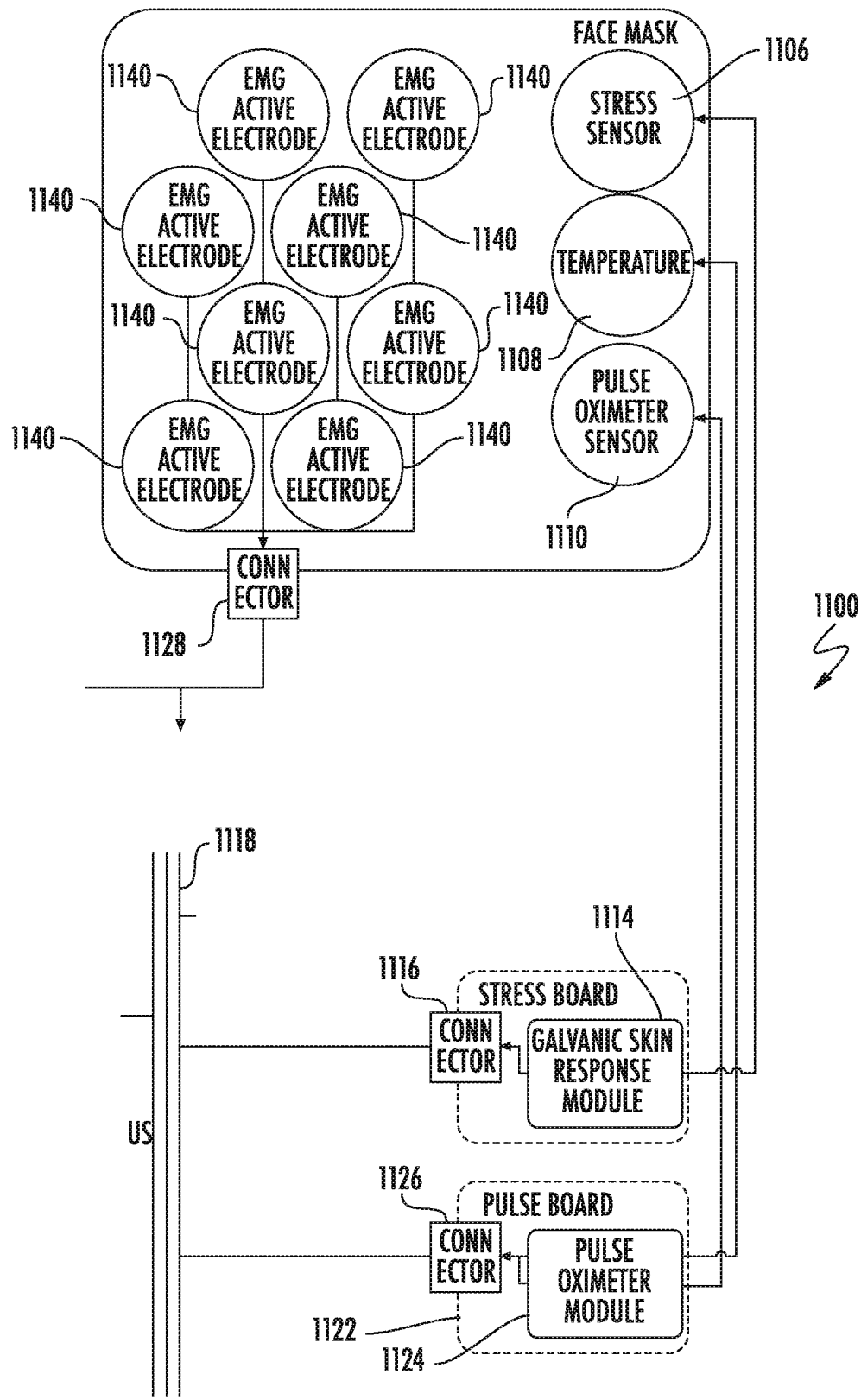
FIGS. 11A and 11B show non-limiting example schematic diagrams of a facemask apparatus and system according to some embodiments.
Figure 11B:
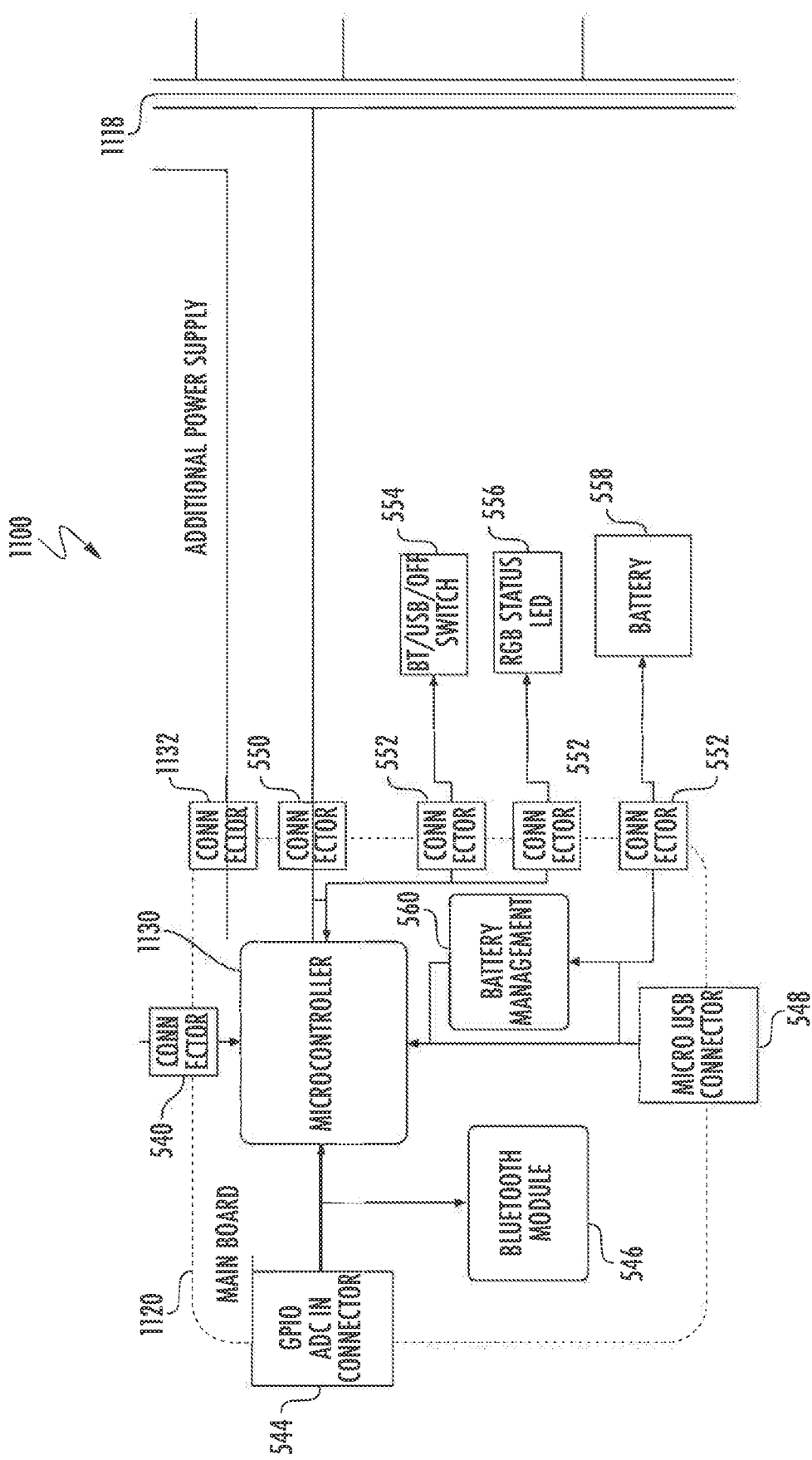

FIGS. 11A and 11B show an additional example, non-limiting, illustrative schematic electronic diagram of a facemask apparatus and system according to at least some embodiments of the present disclosure. The components of the facemask system are shown divided between FIGS. 11A and 11B, while the facemask apparatus is shown in FIG. 11A. The facemask apparatus and system as shown, in some implementations, feature additional components, in comparison to the facemask apparatus and system as shown in FIGS. 5A-5B.

Turning now to FIG. 11A, a facemask system 1100 includes a facemask apparatus 1102. Facemask apparatus 1102 includes a plurality of electrodes 1104, and can include one or more of a stress sensor 1106, a temperature sensor 1108 and a pulse oximeter sensor 1110 as shown. Electrodes 1104 can be implemented as described with regard to electrodes 530 as shown in FIG. 5B, for example. Stress sensor 1106 can include a galvanic skin monitor, to monitor sweat on the skin of the face which may be used as a proxy for stress. Temperature sensor 1108, in some implementations, measures the temperature of the skin of the face. Pulse oximeter sensor 1110 can be used to measure oxygen concentration in the blood of the skin of the face.

Stress sensor 1106 is, in some implementations, connected to a local stress board 1112, including a galvanic skin response module 1114 and a stress board connector 1116. The measurements from stress sensor 1106 are, in some implementations, processed into a measurement of galvanic skin response by galvanic skin response module 1114. Stress board connector 1116 in turn is in communication with a bus 1118. Bus 1118 is in communication with a main board 1120 (see FIG. 11B).

Temperature sensor 1108 and pulse oximeter sensor 1110 are, in some implementations, connected to a local pulse oximeter board 1122, which includes a pulse oximeter module 1124 and a pulse oximeter board connector 1126. Pulse oximeter module 1124, in some implementations, processes the measurements from pulse oximeter sensor 1110 into a measurement of blood oxygen level. Pulse oximeter module 1124 also, in some implementations, processes the measurements from temperature sensor 1108 into a measurement of skin temperature. Pulse oximeter board connector 1126 in turn is in communication with bus 1118. A facemask apparatus connector 1128 on facemask apparatus 1102 is coupled to a local board (not shown), which in turn is in communication with main board 1120 in a similar arrangement to that shown in FIGS. 5A-5C.

FIG. 11B shows another portion of system 1100, featuring main board 1120 and bus 1118. Main board 1120 has a number of components that are repeated from the main board shown in FIGS. 5A-5C; these components are numbered according to the numbering shown therein. Main board 1120, in some implementations, features a microcontroller 1130, which may be implemented similarly to microcontroller 542 of FIGS. 5A-5C but which now features logic and/or programming to be able to control and/or receive input from additional components. A connector 1132, in some implementations, connects to an additional power supply (not shown). Connector 550 connects to bus 1118.

Figure 12A:
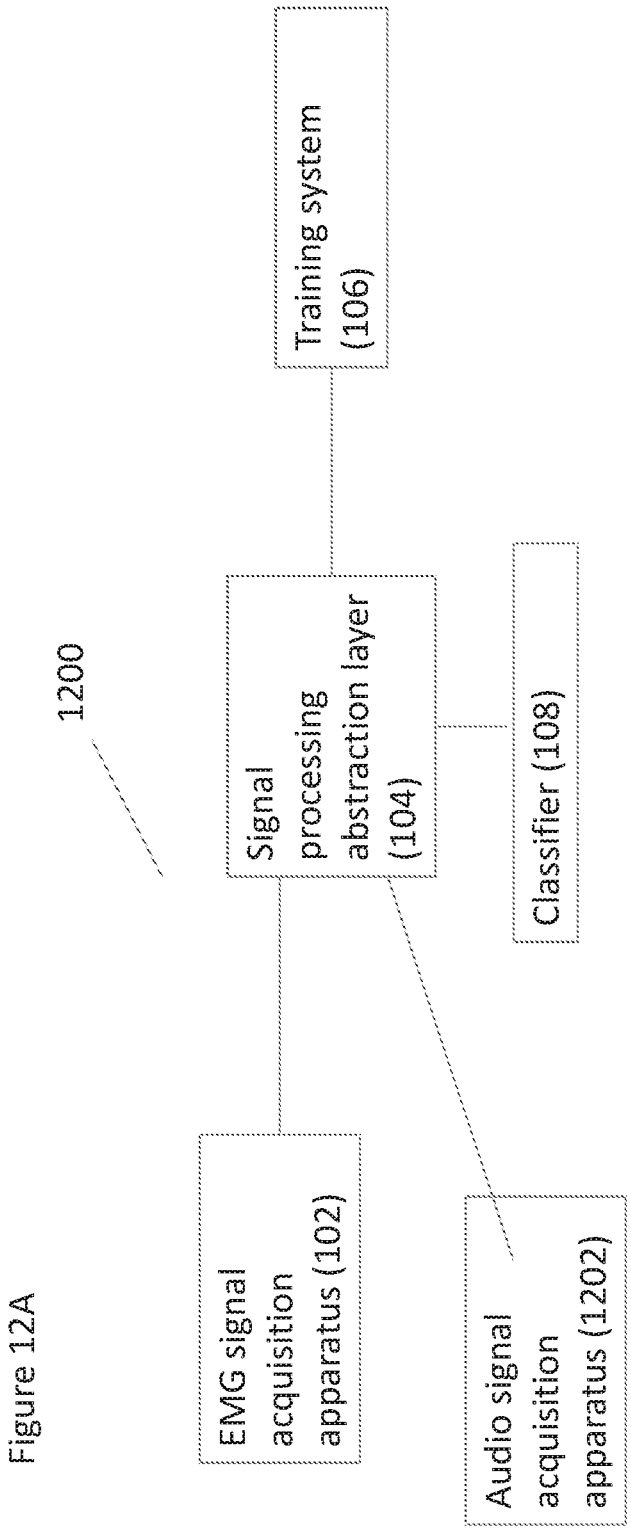
FIG. 12A shows another exemplary system overview according to at least some embodiments of the present invention.

FIG. 12A shows another exemplary system overview according to at least some embodiments of the present invention. As shown, a system 1200 features a number of components from FIG. 1A, having the same or similar function. In addition, system 1200 features an audio signal acquisition apparatus 1202, which may for example comprise a microphone. As described in greater detail below, system 1200 may optionally correct, or at least reduce the amount of, interference of speaking on facial expression classification. When the subject wearing EMG signal acquisition apparatus 102 is speaking, facial muscles are used or affected by such speech. Therefore, optionally the operation of classifier 108 is adjusted when speech is detected, for example according to audio signals from audio signal acquisition apparatus 1202.

Figure 12B:
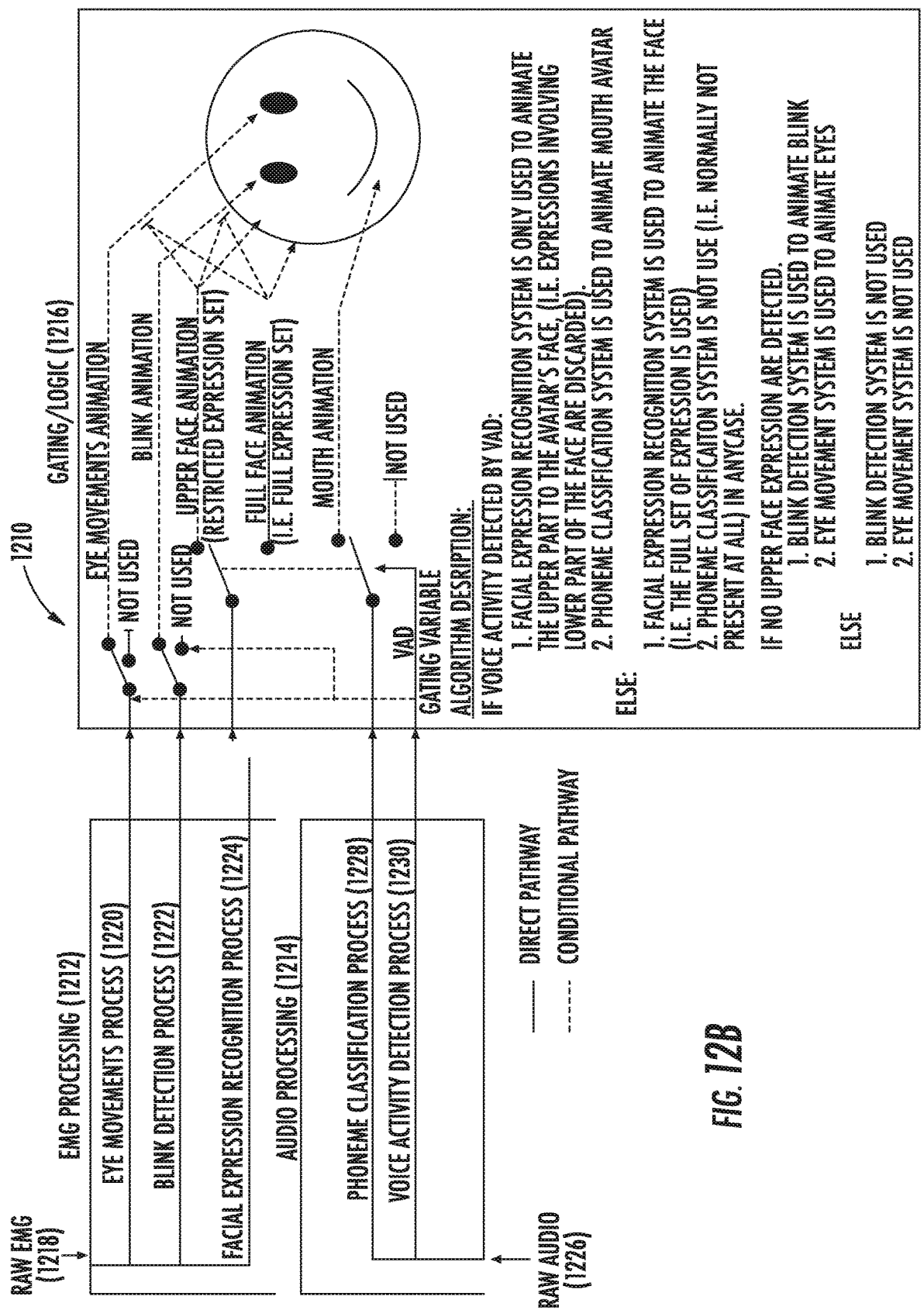
FIG. 12B shows an exemplary processing flow overview according to at least some embodiments of the present invention.

FIG. 12B shows an exemplary processing flow overview according to at least some embodiments of the present invention. As shown, a flow 1210 includes an EMG processing 1212, an audio processing 1214 and a gating/logic 1216.

EMG processing 1212 begins with input raw EMG data from a raw EMG 1218, such as for example from EMG signal acquisition apparatus 102 or any facemask implementation as described herein (not shown). Raw EMG 1218 may for example include 8 channels of data (one for each electrode), provided as 16 bits @2000 Hz. Next, EMG processing 1212 processes the raw EMG data to yield eye motion detection in an eye movements process 1220. In addition, EMG processing 1212 determines a blink detection process 1222, to detect blinking. EMG processing 1212 also performs a facial expression recognition process 1224, to detect the facial expression of the subject. All three processes are described in greater detail with regard to a non-limiting implementation in FIG. 13.

Optionally EMG processing 1212 also is able to extract cardiac related information, including without limitation heart rate, ECG signals and the like. This information can be extracted as described above with regard to eye movements process 1220 and blink detection process 1222.

Audio processing 1214 begins with input raw audio data from a raw audio 1226, for example from a microphone or any type of audio data collection device. Raw audio 1226 may for example include mono, 16 bits, @44100 Hz data.

Raw audio 1226 then feeds into a phoneme classification process 1228 and a voice activity detection process 1230. Both processes are described in greater detail with regard to a non-limiting implementation in FIG. 14.

Figure 15:
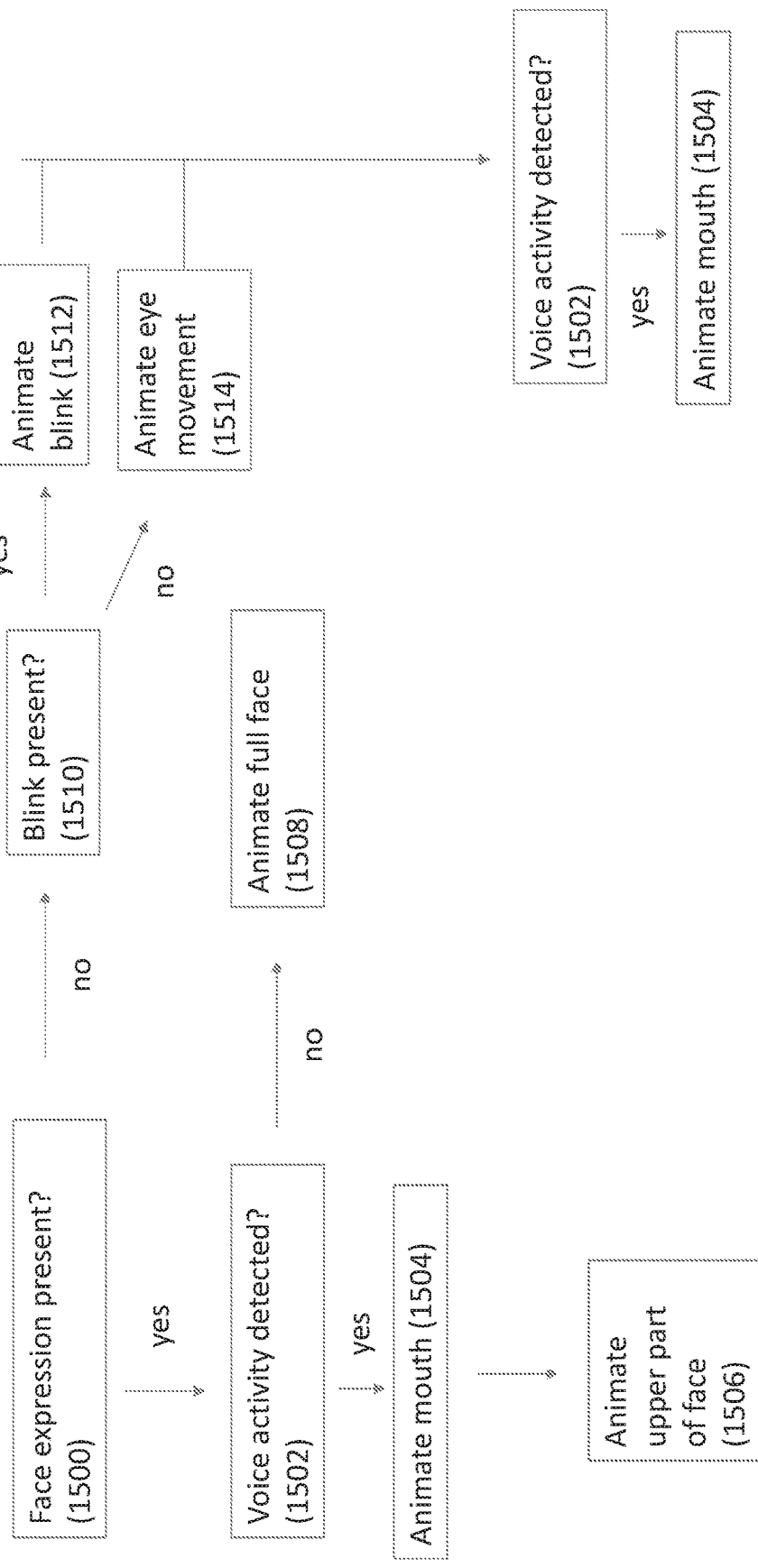
FIG. 15 describes an exemplary, non-limiting flow for the process of gating/logic 1216.

A non-limiting implementation of gating/logic 1216 is described with regard to FIG. 15. In the non-limiting example shown in FIG. 12B, the signals have been analyzed to determine that voice activity has been detected, which means that the mouth animation process is operating, to animate the mouth of the avatar (if present). Either eye movement or blink animation is provided for the eyes, or upper face animation is provided for the face; however, preferably full face animation is not provided.

Figure 13:
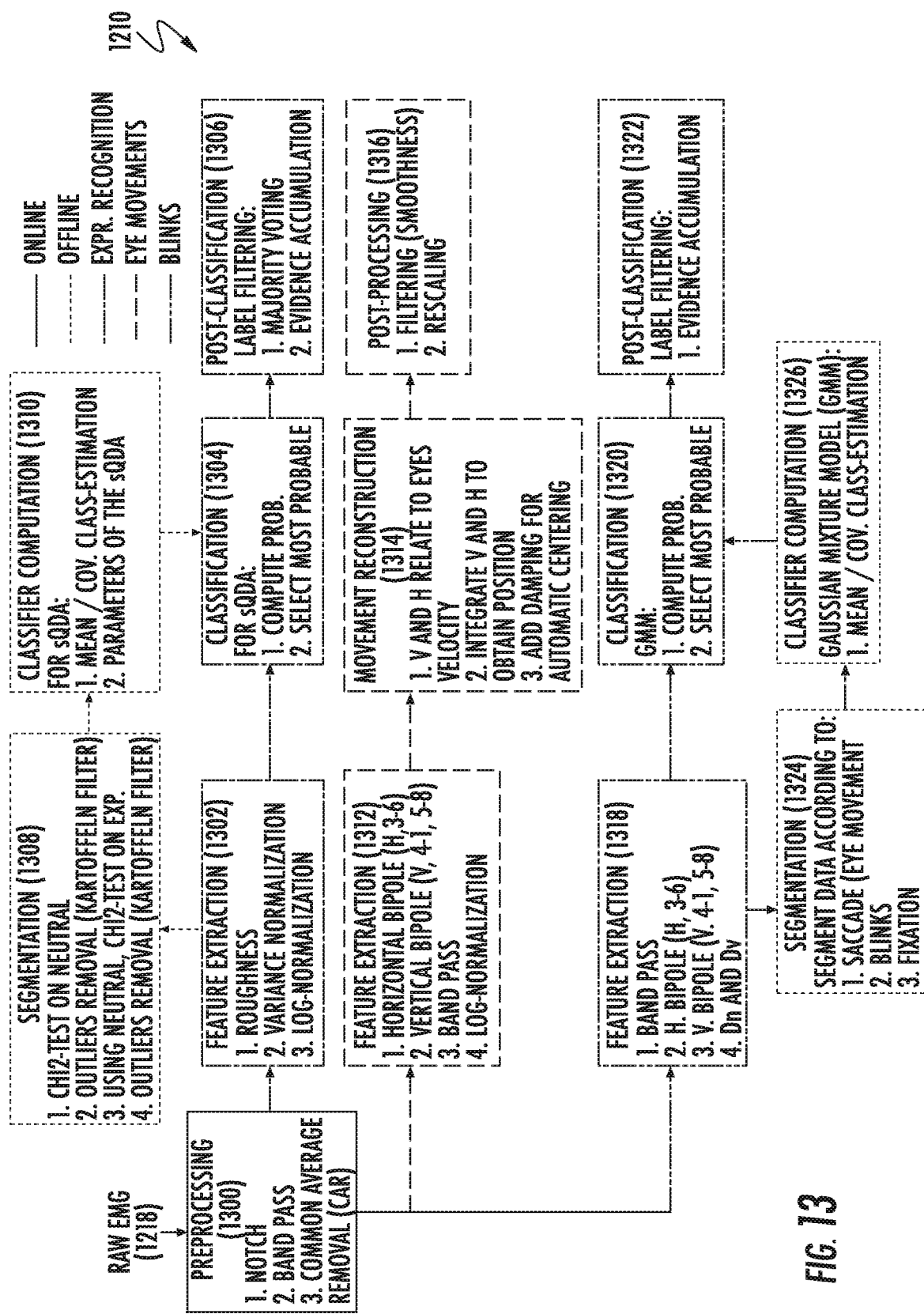
FIG. 13 shows a non-limiting implementation of EMG processing 1212.

FIG. 13 shows a non-limiting implementation of EMG processing 1212. Eye movements process 1220 is shown in blue, blink detection process 1222 is shown in green and facial expression recognition process 1224 is shown in red. An optional preprocessing 1300 is shown in black; preprocessing 1300 was not included in FIG. 12B for the sake of simplicity.

Raw EMG 1218 is received by EMG processing 1212 to begin the process. Preprocessing 1300 preferably preprocesses the data. Optionally, preprocessing 1300 may begin with a notch process to remove electrical power line interference or PLI (such as noise from power inlets and/or a power supply), such as for example 50 Hz or 60 Hz, plus its harmonics. This noise has well-defined characteristics that depend on location. Typically in the European Union, PLI appears in EMG recordings as strong 50 Hz signal in addition to a mixture of its harmonics, whereas in the US or Japan, it appears as a 60 Hz signal plus a mixture of its harmonics.

To remove PLI from the recordings, the signals are optionally filtered with two series of Butterworth notch filter of order 1 with different sets of cutoff frequencies to obtain the proper filtered signal. EMG data are optionally first filtered with a series of filter at 50 Hz and all its harmonics up to the Nyquist frequency, and then with a second series of filter with cutoff frequency at 60 Hz and all its harmonics up to the Nyquist frequency.

In theory, it would have been sufficient to only remove PLI related to the country in which recordings were made, however since the notch filter removes PLI and also all EMG information present in the notch frequency band from the data, it is safer for compatibility issues to always apply the two sets of filters.

Next a bandpass filter is optionally applied, to improve the signal to noise ratio (SNR). As described in greater detail below, the bandpass filter preferably comprises a low pass filter between 0.5 and 150 Hz. EMG data are noisy, can exhibit subject-to-subject variability, can exhibit device-to device variability and, at least in some cases, the informative frequency band is/are not known.

These properties affect the facemask performances in different ways. It is likely that not all of the frequencies carry useful information. It is highly probable that some frequency bands carry only noise. This noise can be problematic for analysis, for example by altering the performance of the facemask.

As an example, imagine a recording where each electrode is contaminated differently by 50 Hz noise, so that even after common average referencing (described in greater detail below), there is still noise in the recordings. This noise is environmental, so that one can assume that all data recorded in the same room will have the same noise content. Now if a global classifier is computed using these data, it will probably give good performances when tested in the same environment. However if tested it elsewhere, the classifier may not give a good performance.

To tackle this problem, one can simply filter the EMG data. However to do it efficiently, one has to define which frequency band contains useful information. As previously described, the facial expression classification algorithm uses a unique feature: the roughness. The roughness is defined as the filtered (with a moving average, exponential smoothing or any other low-pass filter) squared second derivative of the input. So it is a non-linear transform of the (preprocessed) EMG data, which means it is difficult to determine to which frequency the roughness is sensitive.

Various experiments were performed (not shown) to determine the frequency or frequency range to which roughness is sensitive. These experiments showed that while roughness has sensitivity in all the frequency bands, it is non-linearly more sensitive to higher frequencies than lower ones. Lower frequency bands contain more information for roughness. Roughness also enhances high-frequency content. Optionally, the sampling rate may create artifacts on the roughness. For example, high frequency content (>~900 Hz) was found to be represented in the 0-200 Hz domains.

After further testing (not shown), it was found that a bandpass filter improved the performance of the analysis, due to a good effect on roughness. The optimal cutoff frequency of the bandpass filter was found to be between 0.5 and 40 Hz. Optionally its high cutoff frequency is 150 Hz.

After the bandpass filter is applied, optionally CAR (common average referencing) is performed, as for the previously described common mode removal.

The preprocessed data then moves to the three processes of eye movements process 1220 (blue), blink detection process 1222 (green) and facial expression recognition process 1224 (red). Starting with facial expression recognition process 1224, the data first undergoes a feature extraction process 1302, as the start of the real time or "online" process. Feature extraction process 1302 includes determination of roughness as previously described, optionally followed by variance normalization and log normalization also as previously described. Next a classification process 1304 is performed to classify the facial expression, for example by using sQDA as previously described.

Next, a post-classification process 1306 is optionally performed, preferably to perform label filtering, for example according to majority voting, and/or evidence accumulation, also known as serial classification. The idea of majority voting consists in counting the occurrence of each class within a given time window and to return the most frequent label. Serial classification selects the label that has the highest joint probability over a given time window. That is, the output of the serial classification is the class for which the product of the posterior conditional probabilities (or sum of the log-posterior conditional probabilities) over a given time window is the highest. Testing demonstrated that both majority voting and serial classification effectively smoothed the output labels, producing a stable result (data not shown), and may optionally be applied whether singly or as a combination.

An offline training process is preferably performed before the real time classification process is performed, such that the results of the training process may inform the real time classification process. The offline training process preferably includes a segmentation 1308 and a classifier computation 1310.

Segmentation 1308 optionally includes the following steps:
1. Chi2-test on neutral
2. Outliers removal (Kartoffeln Filter)
3. Using neutral, chi2-test on the expression
4. Outliers removal (Kartoffeln Filter)

The Chi2-test on the neutral expression is performed to create a detector for the neutral expression. As previously described, separation of neutral and non-neutral expressions may optionally be performed to increase the performance accuracy of the classifier. Next the Kartoffeln Filter is applied to determine outliers. If an expression is determined to be non-neutral, as in step 3, then the segmentation window needs to be longer than the expression to capture it fully. Other statistical tests may optionally be used, to determine the difference between neutral and non-neutral expressions for segmentation. Outliers are then removed from this segmentation as well.

The Kartoffeln filter may optionally be performed as follows. Assume a P-dimensional variable x that follows a P-dimensional Gaussian distribution:

$$x \sim \mathcal{N}(\mu, \Sigma)$$

with $\mu$ its P-dimensional mean and $\Sigma$ its covariance matrix. For any P-dimensional data point $r_t$ at time step t, one can compute the probability that it comes from the aforementioned P-dimensional Gaussian distribution. To do so one can use the generalization of the standard z-score in P-dimension, called $\chi^2$-score given by:

This score represents the distance between the actual data point $r_t$ and the mean $\mu$ of the reference Normal distribution in unit of the covariance matrix $\Sigma$.

Using $z_t$, one can easily test the probability that a given point $r_t$ comes from a reference normal distribution parametrized by $\mu$ and $\Sigma$ simply by looking at a $\chi^2(\alpha, df)$ distribution table with the correct degree of freedom df and probability $\alpha$.

Thus by thresholding the time series z with a threshold $\chi^2(\alpha_{th}, df)$, it is possible to remove all data points that have probabilities lower than $\alpha_{th}$ to come from the reference Normal distribution.

The outlier filtering process (i.e. also known as the Kartoffeln filter) is simply an iterative application of the aforementioned thresholding method. Assume one has data points r where $r \in \mathbb{R}^{P \times T}$ with P=8 the dimension (i.e. the number of electrodes) and T the total number of data points in the data set.

1. Compute the sample mean:

$$\mu = \frac{1}{T}\sum_{t=1}^{T} r_t$$

2. Compute the sample covariance:

$$\sum = \frac{1}{T-1}\sum_{t=1}^{T}(r_t-\mu)(r_t-\mu)^T$$

3. Compute the $\chi^2$-score: $z_t=(r_t-\mu)^T\Sigma^{-1}(r_t-\mu)$
4. Remove all the $T_1$ data point with $z_t > \chi^2_{(\alpha_{th}, df)}$ from the data set, so that we now have the new data set $\hat{r} \in \mathbb{R}^{P \times (T-T_1)}$ which is a subset of r
5. Update data points distribution $T \leftarrow (T-T_1)$ and $r \leftarrow \hat{r}$
6. go back to point 1 until no more points are removed (i.e., $T_1=0$)

In theory and depending on the threshold value, this algorithm will iteratively remove points that do not come from its estimated underlying Gaussian distribution, until all the points in the data set are likely to come from the same P distribution. In other words, assuming Gaussianity, it removes outliers from a data set. This algorithm is empirically stable and efficiently removes outliers from a data set.

Classifier computation 1310 is used to train the classifier and construct its parameters as described herein.

Turning now to eye movements process 1220, a feature extraction 1312 is performed, optionally as described with regard to Toivanen et al ("A probabilistic real-time algorithm for detecting blinks, saccades, and fixations from EOG data", Journal of Eye Movement Research, 8(2):1,1-14). The process detects eye movements (EOG) from the EMG data, to automatically detect blink, saccade, and fixation events. A saccade is a rapid movement of the eye between fixation points. A fixation event is the fixation of the eye upon a fixation point.

This process optionally includes the following steps (for 1-3, the order is not restricted):
1. Horizontal Bipole (H, 304c-304d)
2. Vertical Bipole (V, 304a-304e; 304b-304f)
3. Band Pass
4. Log-Normalization
5. Feature extraction Horizontal bipole and vertical bipole are determined as they relate to the velocity of the eye movements. These signals are then optionally subjected to at least a low pass bandpass filter, but may optionally also be subject to a high pass bandpass filter. The signals are then optionally log normalized.

Feature extraction preferably at least includes determination of two features. A first feature, denoted as Dn, is the norm of the derivative of the filtered horizontal and vertical EOG signals:

$$D_n = \sqrt{\left(\frac{dH}{dt}\right)^2 + \left(\frac{dV}{dt}\right)^2}$$

where H and V denote the horizontal and vertical components of the EOG signal. This feature is useful in separating fixations from blinks and saccades.

The second feature, denoted as $D_v$, is used for separating blinks from saccades. With the positive electrode for the vertical EOG located above the eye (signal level increases when the eyelid closes), the feature is defined as:

$$D_v = \max - \min - |\max + \min|.$$

Both features may optionally be used for both eye movements process 1220 and blink detection process 1222, which may optionally be performed concurrently.

Next, turning back to eye movements process 1220, a movement reconstruction process 1314 is performed. As previously noted, the vertical and horizontal bipole signals relate to the eye movement velocity. Both bipole signals are integrated to determine the position of the eye. Optionally damping is added for automatic centering.

Next post-processing 1316 is performed, optionally featuring filtering for smoothness and rescaling. Rescaling may optionally be made to fit the points from −1 to 1.

Blink detection process 1222 begins with feature extraction 1318, which may optionally be performed as previously described for feature extraction 1312. Next, a classification 1320 is optionally be performed, for example by using a GMM (Gaussian mixture model) classifier. GMM classifiers are known in the art; for example, Lotte et al describe the use of a GMM for classifying EEG data ("A review of classification algorithms for EEG-based brain-computer interfaces", Journal of Neural Engineering 4(2)•July 2007). A post-classification process 1322 may optionally be performed for label filtering, for example according to evidence accumulation as previously described.

An offline training process is preferably performed before the real time classification process is performed, such that the results of the training process may inform the real time classification process. The offline training process preferably includes a segmentation 1324 and a classifier computation 1326.

Segmentation 1324 optionally includes segmenting the data into blinks, saccades and fixations, as previously described.

Classifier computation 1326 preferably includes training the GMM. The GMM classifier may optionally be trained with an expectation maximization (EM) algorithm (see for example Patrikar and Baker, "Improving accuracy of Gaussian mixture model classifiers with additional discriminative training", Neural Networks (IJCNN), 2016 International Joint Conference on). Optionally the GMM is trained to operate according to the mean and/or co-variance of the data.

Figure 14:
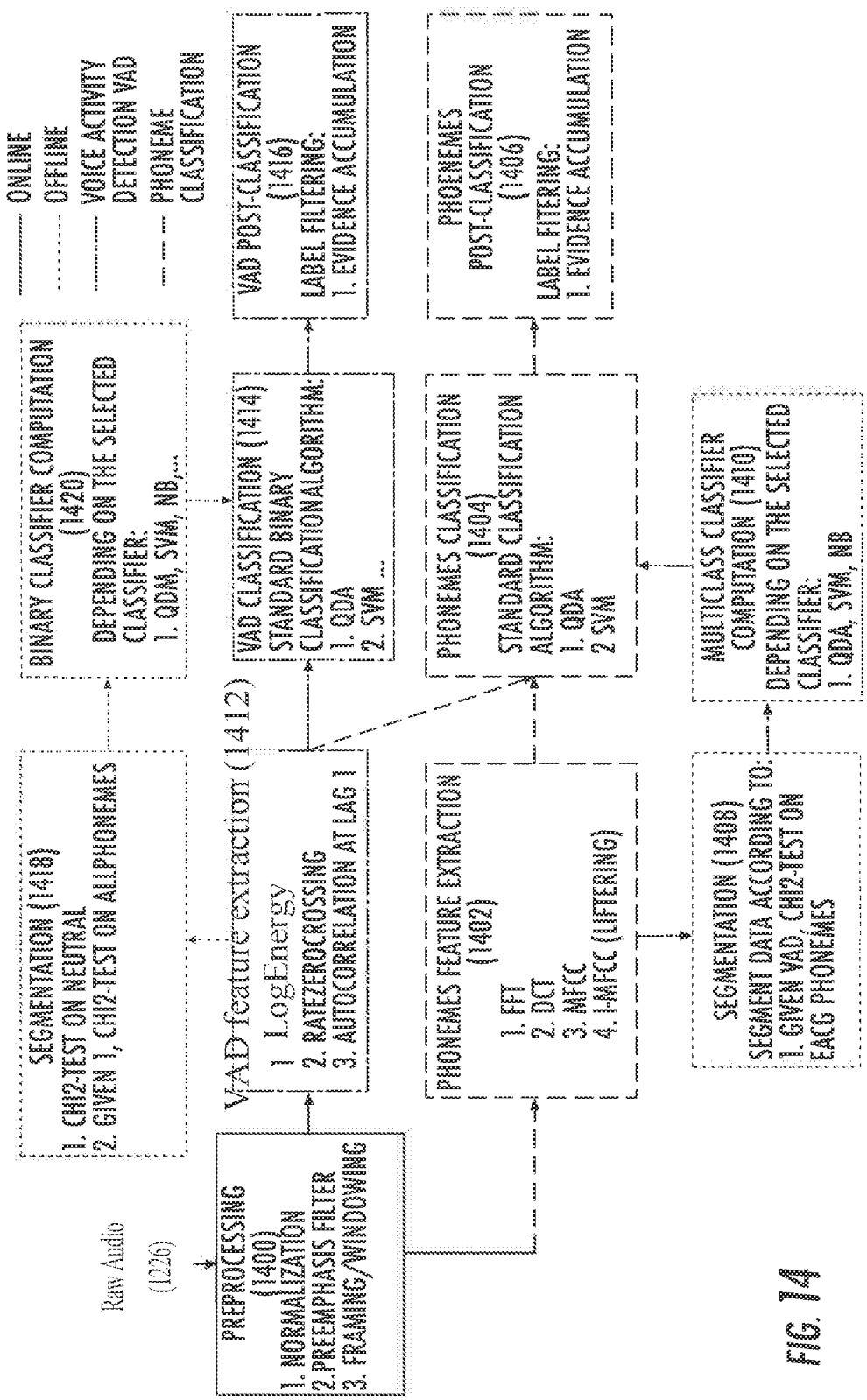
FIG. 14 shows a non-limiting, exemplary implementation of audio processing 1214.

FIG. 14 shows a non-limiting, exemplary implementation of audio processing 1214, shown as phoneme classification process 1228 (red) and voice activity detection process 1230 (green).

Raw audio 1226 feeds into a preprocessing process 1400, which optionally includes the following steps:
1. Optional normalization (audio sensor dependent, so that the audio data is within a certain range, preferably between −1 and 1)
2. PreEmphasis Filter
3. Framing/Windowing The pre-emphasis filter and windowing are optionally performed as described with regard to "COMPUTING MEL-FREQUENCY CEPSTRAL COEFFICIENTS ON THE POWER SPECTRUM" (Molau et al, Acoustics, Speech, and Signal Processing, 2001. Proceedings. (ICASSP '01). 2001 IEEE International Conference on). The filter involves differentiating the audio signal and may optionally be performed as described in Section 5.2 of "The HTK Book", by Young et al (Cambridge University Engineering Department, 2009). The differentiated signal is then cut into a number of overlapping segments for windowing, which may for example optionally be each 25 ms long and shifted by 10 ms. The windowing is preferably performed according to a Hamming window, as described in Section 5.2 of "The HTK Book".

Next, the preprocessed data is fed into phoneme classification process 1228, which begins with a phonemes feature extraction 1402. Phonemes feature extraction 1402 may optionally feature the following steps, which may optionally also be performed according to the above reference by Molau et al:
1. FFT
2. DCT
3. MFCC
4. l-MFCC (liftering).

The filtered and windowed signal is then analyzed by FFT (Fast Fourier Transform). The Molau et al reference describes additional steps between the FFT and the DCT (discrete cosine transformation), which may optionally be performed (although the step of VTN warping is preferably not performed). In any case the DCT is applied, followed by performance of the MFCC (Mel-frequency cepstral coefficients; also described in Sections 5.3, 5.4 and 5.6 of "The HTK Book").

Next liftering is performed as described in Section 5.3 of "The HTK Book".

The extracted phonemes are then fed into a phonemes classification 1404, which may optionally use any classifier as described herein, for example any facial expression classification method as described herein. Next a phonemes post-classification process 1406 is performed, which may optionally comprise any type of suitable label filtering, such as for example the previously described evidence accumulation process.

An offline training process is preferably performed before the real time classification process is performed, such that the results of the training process may inform the real time classification process. The offline training process preferably includes a segmentation 1408 and a classifier computation 1410. Segmentation 1408 preferably receives the results of voice activity detection process 1230 as a first input to determine whether phonemes can be classified. Given that voice activity is detected, segmentation 1408 then preferably performs a Chi2 test on the detected phonemes. Next, classifier computation 1410 preferably performs a multiclass computation which is determined according to the type of classifier selected.

Turning now to voice activity detection process 1230, raw audio 1226 is fed into a VAD (voice activity detection) feature extraction 1412. VAD feature extraction 1412 optionally performs the following steps:
1. LogEnergy
2. rateZeroCrossing
3. AutoCorrelation at lag 1

The LogEnergy step may optionally be performed as described in Section 5.8 of "The HTK Book".

The rateZeroCrossing step may optionally be performed as described in Section 4.2 of "A large set of audio features for sound description (similarity and classification) in the CUIDADO project", by G. Peeters, 2004, https://www.researchgate.net/publication/200688649_A_large_set_of_audio_features_for_sound_description_similarity_and_classification_in_the_CUIDADO_project). This step can help to distinguish between periodic sounds and noise.

The autocorrelation step may optionally be performed as described in Section 4.1 of "A large set of audio features for sound description (similarity and classification) in the CUIDADO project".

Optionally, time derivatives may also be obtained as part of the feature extraction process, for example as described in Section 5.9 of "The HTK Book".

The output of VAD feature extraction 1412 is preferably fed to both a VAD classification 1414 and the previously described phonemes classification 1414. In addition, segmentation 1408 preferably also has access to the output of VAD feature extraction 1412.

Turning now to VAD classification 1414, this process may optionally be performed according to any classifier as described herein, for example any facial expression classification method as described herein.

Next a VAD post-classification process 1416 is performed, which may optionally comprise any type of suitable label filtering, such as for example the previously described evidence accumulation process.

An offline training process is preferably performed before the real time classification process is performed, such that the results of the training process may inform the real time classification process. The offline training process preferably includes a segmentation 1418 and a classifier computation 1420. Segmentation 1418 preferably performs a Chi2 test on silence, which may optionally include background noise, which may for example be performed by asking the subject to be silent. Given that silence is not detected, segmentation 1418 next preferably performs a Chi2 test on the detected phonemes (performed when the subject has been asked to speak the phonemes).

Next, classifier computation 1420 preferably performs a binary computation (on voice activity/not voice activity) which is determined according to the type of classifier selected.

FIG. 15 describes an exemplary, non-limiting flow for the process of gating/logic 1216. As shown, at 1500, it is determined whether a face expression is present. The face expression may for example be determined according to the previously described facial expression recognition process (1224).

At 1502, it is determined whether voice activity is detected by VAD, for example according to the previously described voice activity detection process (1230). If so, then mouth animation (for animating the mouth of the avatar, if present) is preferably performed in 1504, for example as determined according to the previously described phoneme classification process (1228). The avatar animation features a predetermined set of phonemes, with each phoneme being animated, preferably including morphing between states represented by different phoneme animations. Optionally only a subset of phonemes is animated.

Next, an upper face expression is animated in stage 1506, for example as determined according to the previously described facial expression recognition process (1224). Once voice activity has been detected, preferably expressions involving the lower part of the face are discarded and are not considered.

Turning now back to 1502, if no voice activity is detected, then a full face expression is animated in 1508.

Turning back now to 1500, if no face expression is detected, then it is determined whether a blink is present in 1510. If so, then it is animated in 1512. The blink may optionally be determined according to the previously described blink detection process 1222.

If not, then eye movement is animated in 1514. The eye movement(s) may optionally be determined according to the previously described eye movements process 1220.

After either 1512 or 1514, the process returns to detection of voice activity in 1502, and animation of the mouth if voice activity is detected in 1504.

Figure 16:
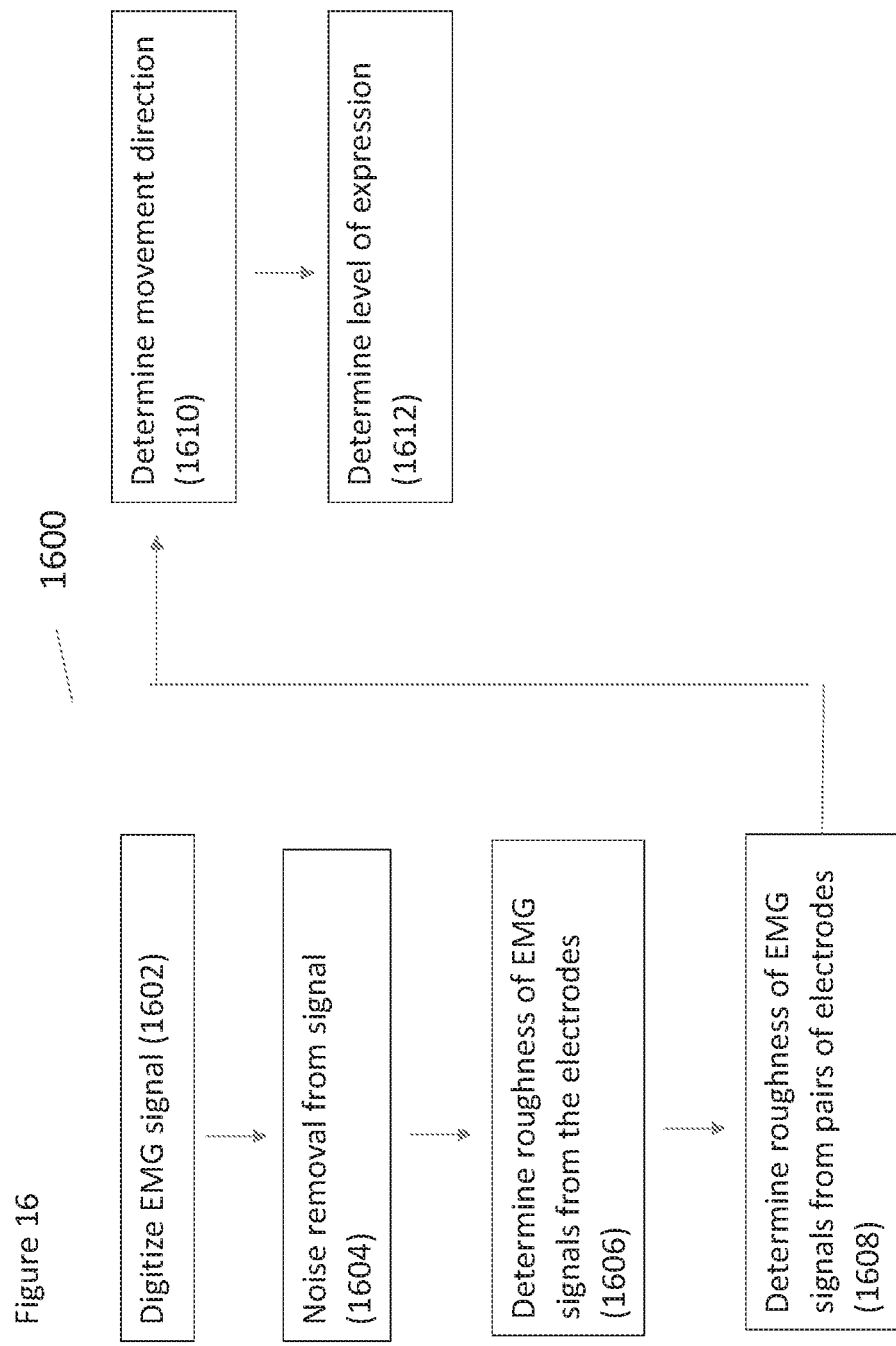
FIG. 16 shows an exemplary, non-limiting, illustrative method for determining features of EMG signals according to some embodiments.

FIG. 16 shows an exemplary, non-limiting, illustrative method for determining features of EMG signals according to some embodiments. As shown, in a method 1600, the method begins with digitizing the EMG signal in 1602, followed by noise removal from the signal in 1604. In stage 1606, the roughness of EMG signals from individual electrodes is determined, for example as previously described.

In stage 1608, the roughness of EMG signals from pairs of electrodes, or roughness of EMG-dipoles, is determined. Roughness of the EMG signal is an accurate descriptor of the muscular activity at a given location, i.e. the recording site, however facial expressions involve co-activation of different muscles. Part of this co-activation is encoded in the difference in electrical activity picked up by electrode pairs. Such dipoles capture information that specifically describes co-activation of electrode pairs. To capture this co-activation it is possible to extend the feature space by considering the roughness of the "EMG-dipoles". EMG-dipoles are defined as the differences in activity between any pairs of electrodes, $$x_{(i,j),t}^{(dipole)} = x_{(i),t} - x_{(j),t}$$

for electrodes i and j at time-step t, such that for N EMG signals, the dimensionality of the EMG-dipole is N (N−1). After having computed these EMG-dipoles, it is straightforward to compute their roughness as previously described for single electrode EMG signals. Since roughness computation takes the square of the double derivative of the input, a signal from electrode pair (i, j) gives a similar result to a signal from electrode pair (j, i), so that by removing redundant dimension in the roughness space, the full roughness dipole dimensionality is N(N−1)/2. The full feature space is given by concatenating the N-dimensional roughness $r_i^{(ma)}$ with the N(N−1)/2 dimensional roughness, leading to a $N^2/2$ dimensional feature space.

In stage 1610, a direction of movement may be determined. Motion direction carries relevant information about facial expressions, which may optionally be applied, for example to facial expression classification. EMG-dipole captures relative motion direction by computing differences between pairs of electrodes before taking the square of the signal. Optionally, information about motion direction (for example as extracted from dipole activity) may be embedded directly into the roughness calculation by changing its signs depending on the inferred direction of motion. Without wishing to be limited by a single hypothesis, this approach enables an increase of the information carried by the features without increasing the dimensionality of the feature space, which can be useful for example and without limitation when operating the method on devices with low computational power, such as smart-phones as a non-limiting example.

In stage 1612, a level of expression may be determined, for example according to the standard deviation of the roughness as previously described.

Roughness and the results of any of stages 1608, 1610 and 1612 are non-limiting examples of features, which may be calculated or "extracted" from the EMG signals (directly or indirectly) as described above.

Figure 17A:
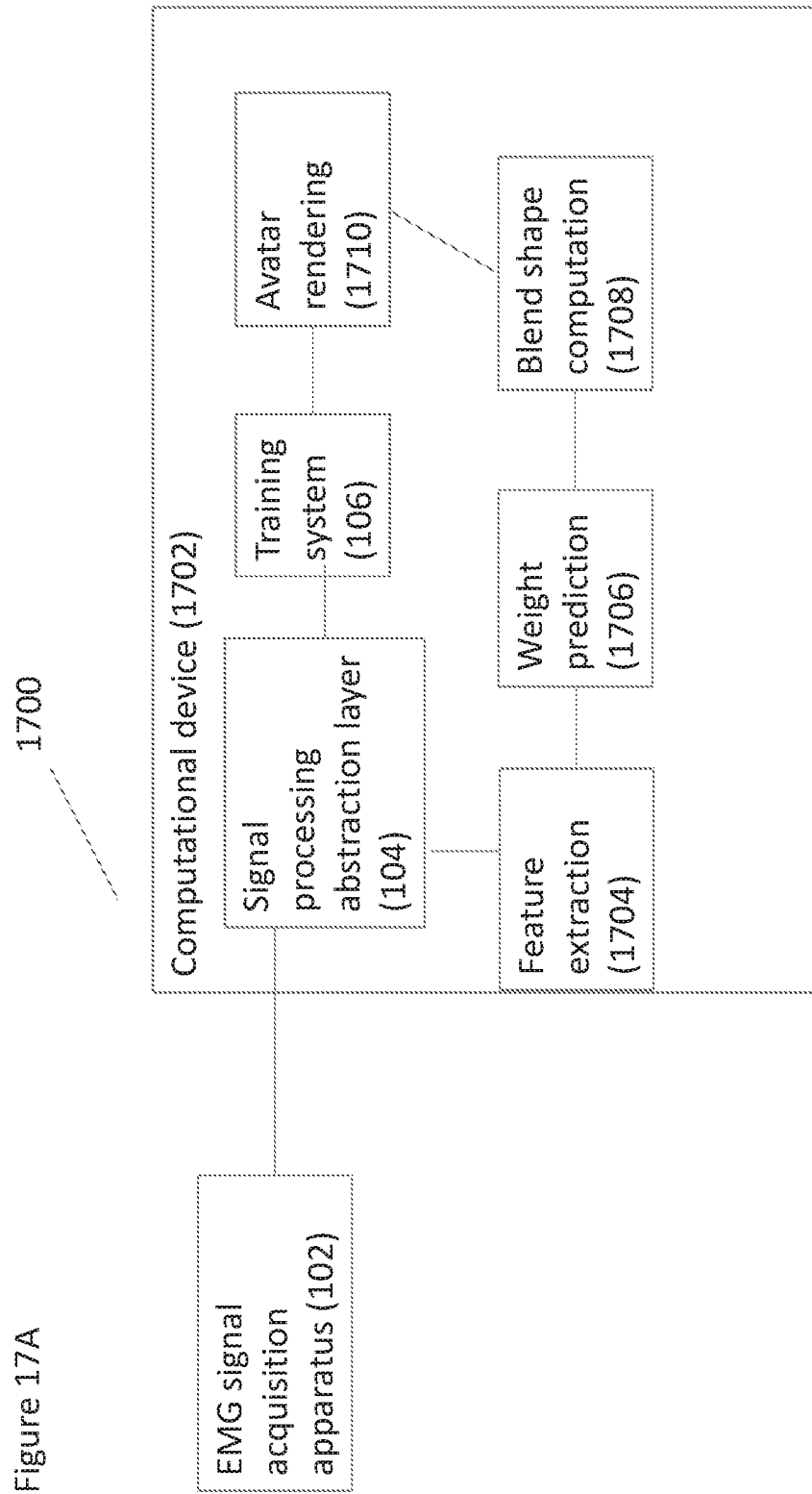
FIG. 17A shows an exemplary, non-limiting, illustrative system for facial expression tracking through morphing according to some embodiments.
Figure 17B:
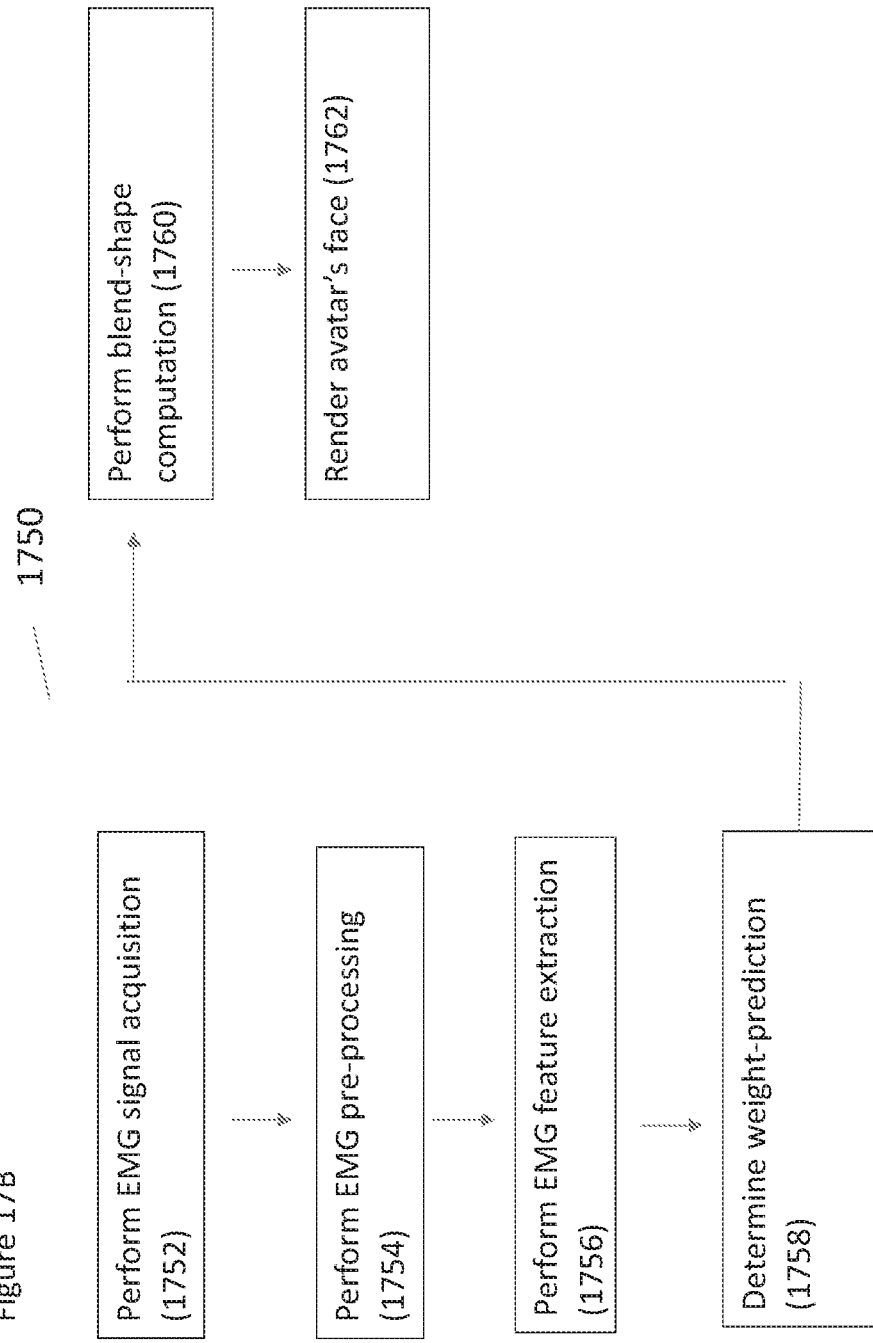
FIG. 17B shows an exemplary, non-limiting, illustrative method for facial expression tracking through morphing according to some embodiments.

FIG. 17A shows an exemplary, non-limiting, illustrative system for facial expression tracking through morphing according to some embodiments, while FIG. 17B shows an exemplary, non-limiting, illustrative method for facial expression tracking through morphing according to some embodiments.

Turning now to FIG. 17A, a system 1700 features a computational device 1702 in communication with EMG signal acquisition apparatus 102. EMG signal acquisition apparatus 102 may be implemented as previously described. Although computational device 1702 is shown as being separate from EMG signal acquisition apparatus 102, optionally they are combined, for example as previously described.

Computational device 1702 preferably operates signal processing abstraction layer 104 and training system 106, each of which may be implemented as previously described. Computational device 1702 also preferably operates a feature extraction module 1704, which may extract features of the signals. Non-limiting examples of such features include roughness, dipole-EMG, direction of movement and level of facial expression, which may be calculated as described herein. Features may then be passed to a weight prediction module 1706, for performing weight-prediction based on extracted features. Such a weight-prediction is optionally performed, for example to reduce the computational complexity and/or resources required for various applications of the results. A non-limiting example of such an application is animation, which may be performed by system 1700. Animations are typically displayed at 60 (or 90 Hz), which is one single frame every 16 ms (11 ms, respectively), whereas the predicted weights are computed at 2000 Hz (one weight-vector $\hat{w}_t$ every 0.5 ms). It is possible to take advantage of these differences in frequency by smoothing the predicted weight (using exponential smoothing filter, or moving average) without introducing a noticeable delay. This smoothing is important since it will manifest as a more natural display of facial expressions.

A blend shape computational module 1708 optionally blends the basic avatar with the results of the various facial expressions to create a more seamless avatar for animation applications. Avatar rendering is then optionally performed by an avatar rendering module 1710, which receives the blend-shape results from blend shape computational module 1708. Avatar rendering module 1710 is optionally in communication with training system 106 for further input on the rendering.

Optionally, a computational device 1702, whether part of the EMG apparatus or separate from it in a system configuration, comprises a hardware processor configured to perform a predefined set of basic operations in response to receiving a corresponding basic instruction selected from a predefined native instruction set of codes, as well as memory (not shown). Computational device 1702 comprises a first set of machine codes selected from the native instruction set for receiving EMG data, a second set of machine codes selected from the native instruction set for preprocessing EMG data to determine at least one feature of the EMG data and a third set of machine codes selected from the native instruction set for determining a facial expression and/or determining an animation model according to said at least one feature of the EMG data; wherein each of the first, second and third sets of machine code is stored in the memory.

Turning now to FIG. 17B, a method 1750 optionally features two blocks, a processing block, including stages 1752, 1754 and 1756; and an animation block, including stages 1758, 1760 and 1762.

In stage 1752, EMG signal measurement and acquisition is performed, for example as previously described. In stage 1754, EMG pre-processing is performed, for example as previously described. In stage 1756, EMG feature extraction is performed, for example as previously described.

Next, in stage 1758, weight prediction is determined according to the extracted features. Weight prediction is optionally performed to reduce computational complexity for certain applications, including animation, as previously described.

In stage 1760, blend-shape computation is performed according to a model, which is based upon the blend-shape. For example and without limitation, the model can be related to a muscular model or to a state-of-the-art facial model used in the graphical industry.

The avatar's face is fully described at each moment in time t by a set of values, which may for example be 34 values according to the apparatus described above, called the weight-vector $w_t$. This weight vector is used to blend the avatar's blend-shape to create the final displayed face. Thus to animate the avatar's face it is sufficient to find a model that links the feature space X to the weight w.

Various approaches may optionally be used to determine the model, ranging for example from the simplest multilinear regression to more advanced feed-forward neural network. In any case, finding a good model is always stated as a regression problem, where the loss function is simply taken as the mean squared error (mse) between the model predicted weight $\hat{\omega}$ and the target weight w.

In stage 1762, the avatar's face is rendered according to the computed blend-shapes.

Figure 18A:
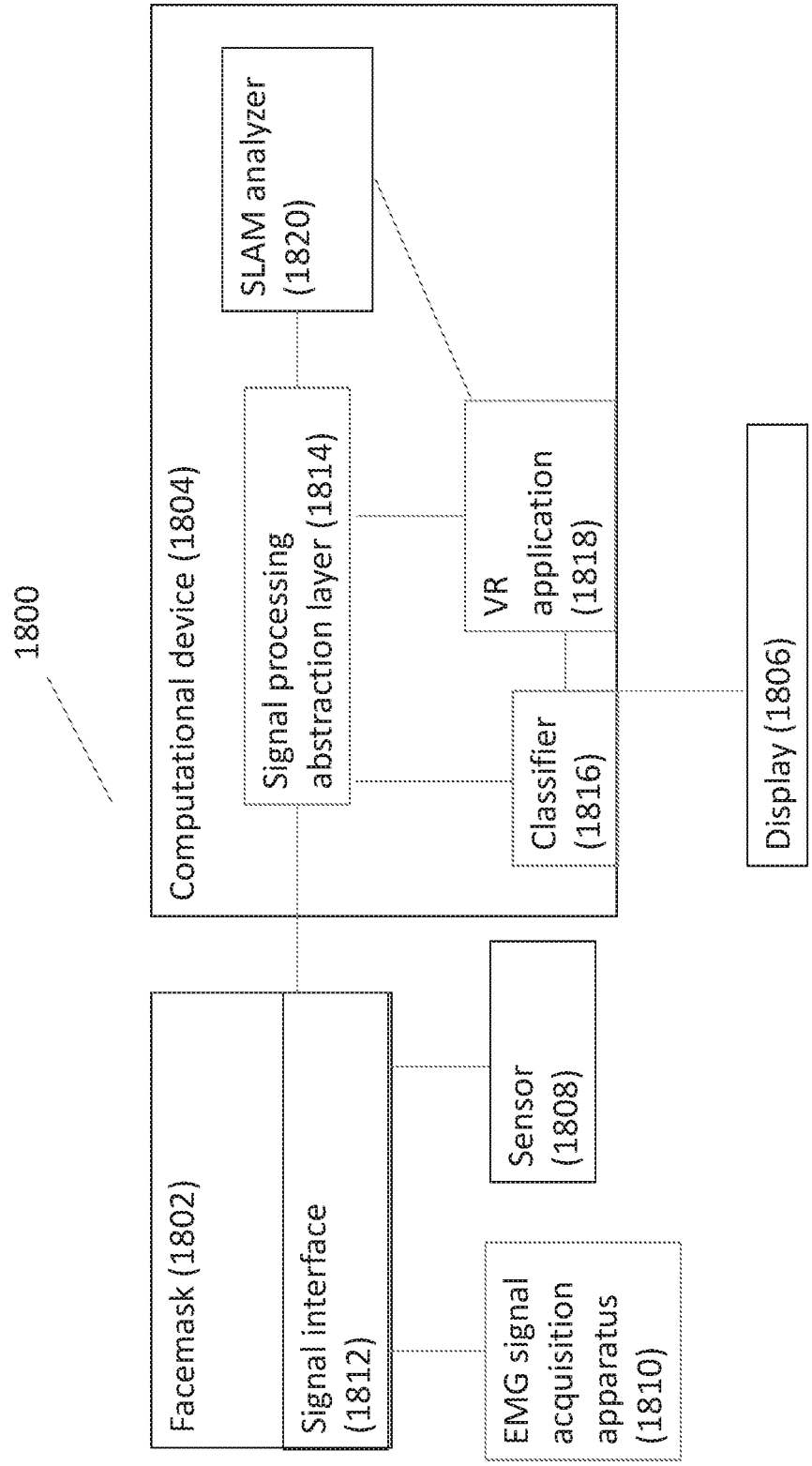
FIG. 18A shows a schematic of a non-limiting example of a wearable device according to at least some embodiments.

FIG. 18A shows a non-limiting example wearable device according to at least some embodiments of the present disclosure. As shown, wearable device 1800 features a facemask 1802, a computational device 1804, and a display 1806. Wearable device 1800 also optionally features a device for securing the wearable device 1800 to a user, such as a head mount for example (not shown).

In some embodiments, facemask 1802 includes a sensor 1808 and an EMG signal acquisition apparatus 1810, which provides EMG signals to the signal interface 1812. To this end, facemask 1802 is preferably secured to the user in such a position that EMG signal acquisition apparatus 1810 is in contact with at least a portion of the face of the user (not shown). Sensor 1808 may comprise a camera (not shown), which provides video data to a signal interface 1812 of facemask 1802.

Computational device 1804 includes computer instructions operational thereon and configured to process signals (e.g., which may be configured as: a software "module" operational on a processor, a signal processing abstraction layer 1814, or which may be a ASIC) for receiving EMG signals from signal interface 1812, and for optionally also receiving video data from signal interface 1812. The computer instructions may also be configured to classify facial expressions of the user according to received EMG signals, according to a classifier 1816, which can operate according to any of the embodiments described herein.

Computational device 1804 can then be configured so as to provide the classified facial expression, and optionally the video data, to a VR application 1818. VR application 1818 is configured to enable/operate a virtual reality environment for the user, including providing visual data to display 1806. Preferably, the visual data is altered by VR application 1818 according to the classification of the facial expression of the user and/or according to such a classification for a different user (e.g., in a multi-user interaction in a VR environment).

Wearable device further comprises a SLAM analyzer 1820, for performing simultaneous localization and mapping (SLAM). SLAM analyzer 1820 may be operated by computational device 1804 as shown. SLAM analyzer 1820 preferably receives signal information from sensor 1808 through signal processing abstraction layer 1814 or alternatively from another sensor (not shown).

SLAM analyzer 1820 is configured to operate a SLAM process so as to determine a location of wearable device 1800 within a computational device-generated map, as well as being configured to determine a map of the environment surrounding wearable device 1800. For example, the SLAM process can be used to translate movement of the user's head and/or body when wearing the wearable device (e.g., on the user's head or body). A wearable that is worn on the user's head can, for example, provide movement information with regard to turning the head from side to side, or up and down, and/or moving the body in a variety of different ways. Such movement information is needed for SLAM to be performed. In some implementations, because the preprocessed sensor data is abstracted from the specific sensors, the SLAM analyzer 1820, therefore, can be sensor-agnostic, and can perform various actions without knowledge of the particular sensors from which the sensor data was derived.

As a non-limiting example, if sensor 1808 is a camera (e.g., digital camera including a resolution, for example, of 640×480 and greater, at any frame rate including, for example 60 fps), then movement information may be determined by SLAM analyzer 1820 according to a plurality of images from the camera. For such an example, signal processing abstraction layer 1814 preprocesses the images before SLAM analyzer 1820 performed the analysis (which may include, for example, converting images to grayscale). Next a Gaussian pyramid may be computed for one or more images, which is also known as a MIPMAP (multum in parvo map), in which the pyramid starts with a full resolution image, and the image is operated on multiple times, such that each time, the image is half the size and half the resolution of the previous operation. SLAM analyzer 1820 may perform a wide variety of different variations on the SLAM process, including one or more of, but not limited to, PTAM (Parallel Tracking and Mapping), as described for example in "Parallel Tracking and Mapping on a Camera Phone" by Klein and Murray, 2009 (available from ieeexplore.ieee.org/document/5336495/); DSO (Direct Sparse Odometry), as described for example in "Direct Sparse Odometry" by Engel et al, 2016 (available from https://arxiv.org/abs/1607.02565); or any other suitable SLAM method, including those as described herein.

In some implementations, the wearable device 1800 can be operatively coupled to the one or more sensor(s) 1808 and the computational device 1804 (e.g., wired, wirelessly). The wearable device 1800 can be a device (such as an augmented reality (AR) and/or virtual reality (VR) headset, and/or the like) configured to receive sensor data, so as to track a user's movement when the user is wearing the wearable device 1800. The wearable device 1800 can be configured to send sensor data from the one or more sensors 1808 to the computational device 1804, such that the computational device 1804 can process the sensor data to identify and/or contextualize the detected user movement.

In some implementations, the one or more sensors 1808 can be included in wearable device 1800 and/or separate from wearable device 1800. A sensor 1808 can be one of a camera (as indicated above), an accelerometer, a gyroscope, a magnometer, a barometric pressure sensor, a GPS (global positioning system) sensor, a microphone or other audio sensor, a proximity sensor, a temperature sensor, a UV (ultraviolet light) sensor, an IMU (inertial measurement unit), and/or other sensors. If implemented as a camera, sensor 1808 can be one of an RGB, color, grayscale or infrared camera, a charged coupled device (CCD), a CMOS sensor, a depth sensor, and/or the like. If implemented as an IMU, sensor 1808 can be an accelerometer, a gyroscope, a magnetometer, and/or the like. When multiple sensors 1808 are operatively coupled to and/or included in the wearable device 1800, the sensors 1808 can include one or more of the aforementioned types of sensors.

The methods described below can be enabled/operated by a suitable computational device (and optionally, according to one of the embodiments of such a device as described in the present disclosure). Furthermore, the below described methods may feature an apparatus for acquiring facial expression information, including but not limited to any of the facemask implementations described in the present disclosure.

Figure 18B:
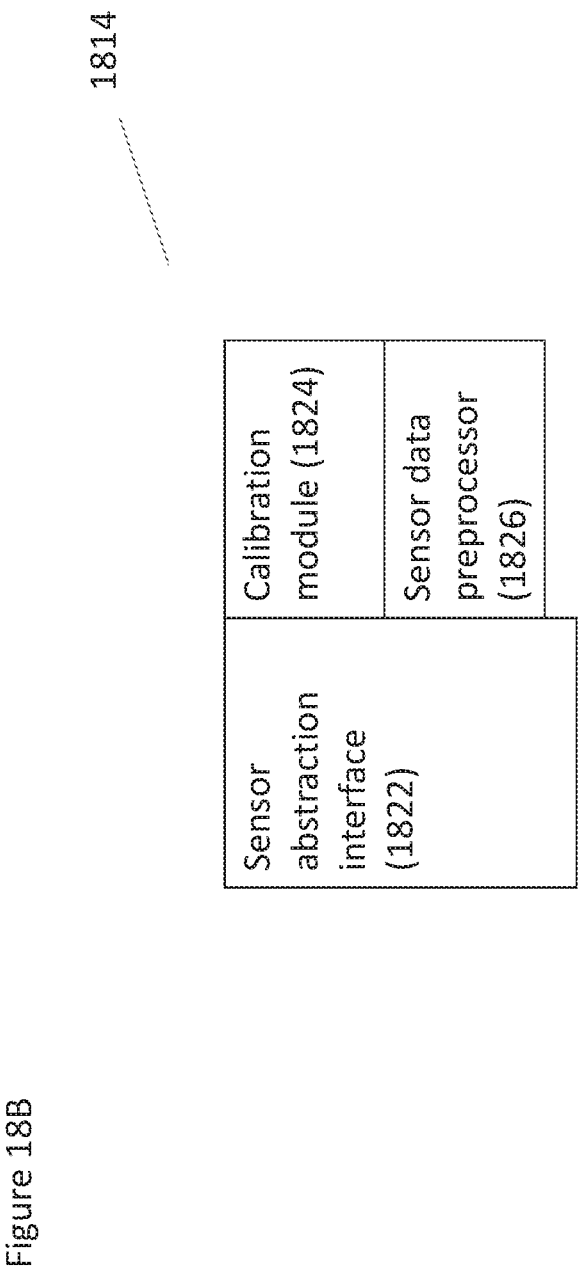
FIG. 18B shows a schematic of a non-limiting example of sensor preprocessor according to at least some embodiments.

FIG. 18B shows a non-limiting, example, illustrative schematic signal processing abstraction layer 1814 according to at least some embodiments. As shown, signal processing abstraction layer 1814 can include a sensor abstraction interface 1822, a calibration processor 1824 and a sensor data preprocessor 1826. Sensor abstraction interface 1822 can abstract the incoming sensor data (for example, abstract incoming sensor data from a plurality of different sensor types), such that signal processing abstraction layer 1814 preprocesses sensor-agnostic sensor data.

In some implementations, calibration processor 1824 can be configured to calibrate the sensor input, such that the input from individual sensors and/or from different types of sensors can be calibrated. As an example of the latter, if a sensor's sensor type is known and has been analyzed in advance, calibration processor 1824 can be configure to provide the sensor abstraction interface 1822 with information about device type calibration (for example), so that the sensor abstraction interface 1822 can abstract the data correctly and in a calibrated manner. For example, the calibration processor 1824 can be configured to include information for calibrating known makes and models of cameras, and/or the like. Calibration processor 1824 can also be configured to perform a calibration process to calibrate each individual sensor separately, e.g., at the start of a session (upon a new use, turning on the system, and the like) using that sensor. The user (not shown), for example, can take one or more actions as part of the calibration process, including but not limited to displaying printed material on which a pattern is present. The calibration processor 1824 can receive the input from the sensor(s) as part of an individual sensor calibration, such that calibration processor 1824 can use this input data to calibrate the sensor input for each individual sensor. The calibration processor 1824 can then send the calibrated data from sensor abstraction interface 1822 to sensor data preprocessor 1826, which can be configured to perform data preprocessing on the calibrated data, including but not limited to reducing and/or eliminating noise in the calibrated data, normalizing incoming signals, and/or the like. The signal processing abstraction layer 1814 can then send the preprocessed sensor data to a SLAM analyzer (not shown).

Figure 18C:
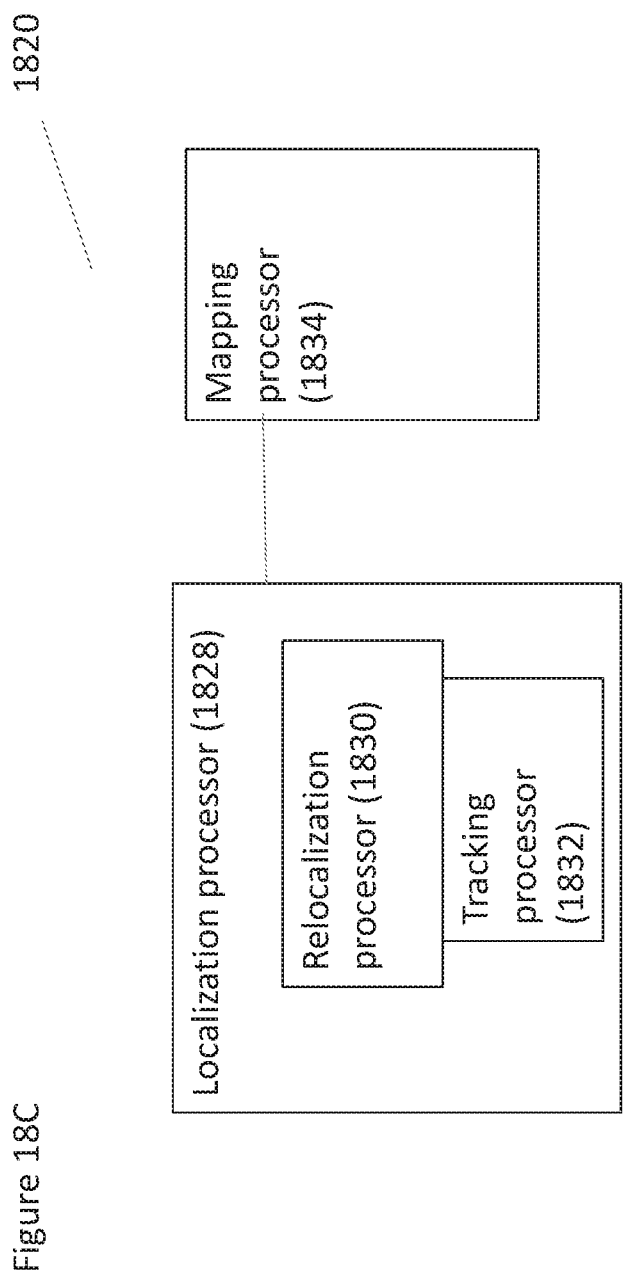
FIG. 18C shows a schematic of a non-limiting example of a SLAM analyzer according to at least some embodiments.

FIG. 18C shows a non-limiting, example, illustrative schematic SLAM analyzer 1820, according to at least some embodiments. In some implementations, the SLAM analyzer 1820 can include a localization processor 1828 and a mapping processor 1834. The localization processor 1828 of the SLAM analyzer 1820 can be operatively coupled to the mapping processor 1834 and/or vice-versa. In some implementations, the mapping processor 1834 can be configured to create and update a map of an environment surrounding the wearable device (not shown). Mapping processor 1834, for example, can be configured to determine the geometry and/or appearance of the environment, e.g., based on analyzing the preprocessed sensor data received from the signal processing abstraction layer 1814. Mapping processor 1834 can also be configured to generate a map of the environment based on the analysis of the preprocessed data. In some implementations, the mapping processor 1834 can be configured to send the map to the localization processor 1828 to determine a location of the wearable device within the generated map.

In some implementations, the localization processor 1828 can include a relocalization processor 1830 and a tracking processor 1832. Relocalization processor 1830, in some implementations, can be invoked when the current location of the wearable device 1800—and more specifically, of the one or more sensors 1808 associated with the wearable device 1800—cannot be determined according to one or more criteria. For example, in some implementations, relocalization processor 1830 can be invoked when the current location cannot be determined by processing the last known location with one or more adjustments. Such a situation may arise, for example, if SLAM analyzer 1820 is inactive for a period of time and the wearable device 1800 moves during this period of time. Such a situation may also arise if tracking processor 1832 cannot track the location of wearable device on the map generated by mapping processor 1834.

In some implementations, tracking processor 1832 can determine the current location of the wearable device 1800 according to the last known location of the device on the map and input information from one or more sensor(s), so as to track the movement of the wearable device 1800. Tracking processor 1832 can use algorithms such as a Kalman filter, or an extended Kalman filter, to account for the probabilistic uncertainty in the sensor data. In some implementations, the tracking processor 1832 can track the wearable device 1800 so as to reduce jitter, e.g., by keeping a constant and consistent error through the mapping process, rather than estimating the error at each step of the process. For example, the tracking processor 1832 can, in some implementations, use the same or a substantially similar error value when tracking a wearable device 1800. For example, if the tracking processor 1832 is analyzing sensor data from a camera, the tracking processor 1832 can track the wearable device 1800 across frames, to add stability to tracking processor 1832's determination of the wearable device 1800's current location. The problem of jitter can also be addressed through analysis of keyframes, as described for example in "Stable Real-Time 3D Tracking using Online and Offline Information", by Vacchetti et al, available from http://icwww.epfl.ch/~lepetit/papers/vacchetti_pami04.pdf. However, the method described in this paper relies upon manually acquiring keyframes, while for the optional method described herein, the keyframes are created dynamically as needed, as described in greater detail below (as described in the discussion of FIGS. 19-21). In some implementations, the tracking processor 1832 can also use Kalman filtering to address jitter, can implement Kalman filtering in addition to, or in replacement of, the methods described herein.

In some implementations, the output of localization processor 1828 can be sent to mapping processor 1834, and the output of mapping processor 1834 can be sent to the localization processor 1828, so that the determination by each of the location of the wearable device 1800 and the map of the surrounding environment can inform the determination of the other.

Figure 18D:
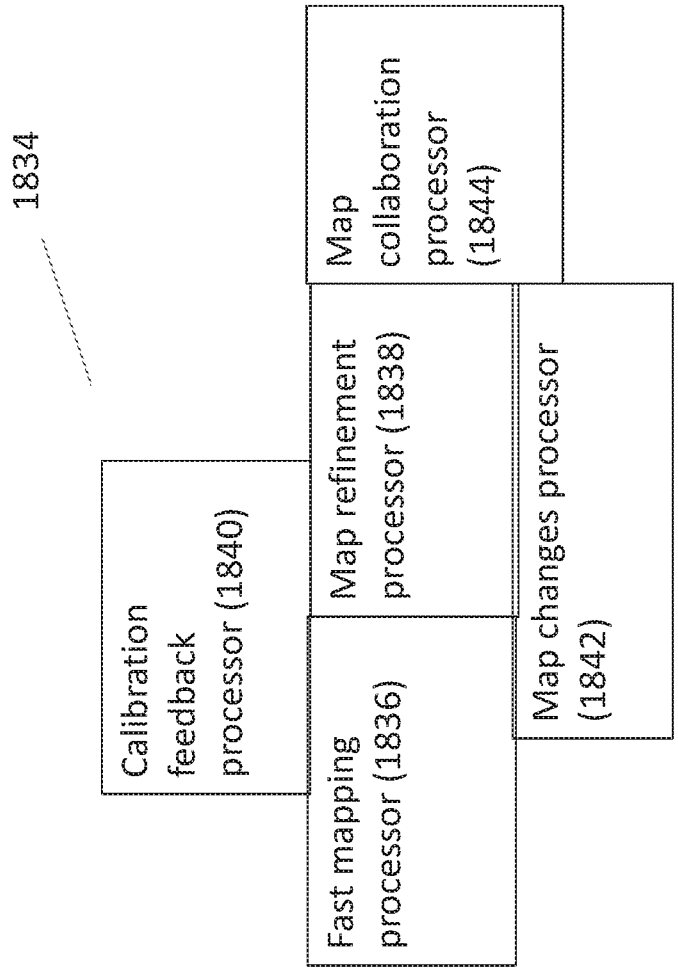
FIG. 18D shows a schematic of a non-limiting example of a mapping module according to at least some embodiments.

FIG. 18D shows a non-limiting, example, illustrative schematic mapping processor according to at least some embodiments. For example, in some implementations, mapping processor 1834 can include a fast mapping processor 1836, a map refinement processor 1838, a calibration feedback processor 1840, a map changes processor 1842 and a map collaboration processor 1844. Each of fast mapping processor 1836 and map refinement processor 1838 can be in direct communication with each of calibration feedback processor 1840 and map changes processor 1842 separately. In some implementations, map collaboration processor 1844 may be in direct communication with map refinement processor 1838.

In some implementations, fast mapping processor 1836 can be configured to define a map rapidly and in a coarse-grained or rough manner, using the preprocessed sensor data. Map refinement processor 1838 can be configured to refine this rough map to create a more defined map. Map refinement processor 1838 can be configured to correct for drift. Drift can occur as the calculated map gradually begins to differ from the true map, due to measurement and sensor errors for example. For example, such drift can cause a circle to not appear to be closed, even if movement of the sensor should have led to its closure. Map refinement processor 1838 can be configured to correct for drift, by making certain that the map is accurate; and/or can be configured to spread the error evenly throughout the map, so that drift does not become apparent. In some implementations, each of fast mapping processor 1836 and map refinement processor 1838 is operated as a separate thread on a computational device (not shown). For such an implementation, localization processor 1828 can be configured to operate as yet another thread on such a device.

Map refinement processor 1838 performs mathematical minimization of the points on the map, including with regard to the position of all cameras and all three dimensional points. For example, and without limitation, if the sensor data comprises image data, then map refinement processor 1838 may re-extract important features of the image data around locations that are defined as being important, for example because they are information-rich. Such information-rich locations may be defined according to landmarks on the map, as described in greater detail below. Other information-rich locations may be defined according to their use in the previous coarse-grained mapping by fast mapping processor 1836.

The combination of the implementations of FIGS. 18C and 18D can be implemented on three separate threads as follows. The tracking thread can optionally and preferably operate with the fastest processing speed, followed by the fast mapping thread; while the map refinement thread can operate at a relatively slower processing speed. For example, tracking can be operated at a process speed that is at least five times faster than the process speed of fast mapping, while the map refinement thread can be operated at a process speed that is at least 50% slower than the speed of fast mapping. The following processing speeds can be implemented as a non-limiting example: tracking being operated in a tracking thread at 60 Hz, fast mapping thread at 10 Hz, and the map refinement thread being operated once every 3 seconds.

Calibration feedback processor 1840 can be operated in conjunction with input from one or both of fast mapping processor 1836 and map refinement processor 1838. For example, the output from map refinement processor 1838 can be used to determine one or more calibration parameters for one or more sensors, and/or to adjust such one or more calibration parameters. For the former case, if the sensor was a camera, then output from map refinement processor 1838 can be used to determine one or more camera calibration parameters, even if no previous calibration was known or performed. Such output can be used to solve for lens distortion and focal length, because the output from map refinement processor 1838 can be configured to indicate where calibration issues related to the camera were occurring, as part of solving the problem of minimization by determining a difference between the map before refinement and the map after refinement.

Map changes processor 1842 can also be operated in conjunction with input from one or both of fast mapping processor 1836 and map refinement processor 1838, to determine what change(s) have occurred in the map as a result of a change in position of the wearable device. Map changes processor 1842 can also receive output from fast mapping processor 1836, to determine any coarse-grained changes in position. Map changes processor 1842 can also (additionally or alternatively) receive output from map refinement processor 1838, to determine more precise changes in the map. Such changes can include removal of a previous validated landmark, or the addition of a new validated landmark; as well as changes in the relative location of previously validated landmarks. By "validated landmark" it is meant a landmark whose location has been correctly determined and confirmed, for example by being found at the same location for more than one mapping cycle. Such changes can be explicitly used to increase the speed and/or accuracy of further localization and/or mapping activities, and/or can be fed to an outside application that relies upon SLAM in order to increase the speed and/or efficacy of operation of the outside application. By "outside application" it is meant any application that is not operative for performing SLAM.

As a non-limiting example of feeding this information to the outside application, such information can be used by the application, for example to warn the user that one of the following has occurred: a particular object has been moved; a particular object has disappeared from its last known location; or a new specific object has appeared. Such warning can be determined according to the available information from the last time the scene was mapped.

Map changes processor 1842 can have a higher level understanding for determining that a set of coordinated or connected landmarks moved or disappeared, for example to determine a larger overall change in the environment being mapped. Again, such information may be explicitly used to increase the speed and/or accuracy of further localization and/or mapping activities, and/or can be fed to an outside application that relies upon SLAM in order to increase the speed and/or efficacy of operation of the outside application.

Map collaboration processor 1844 can receive input from map refinement processor 1838 in order for a plurality of SLAM analyzers in conjunction with a plurality of wearable devices to create a combined, collaborative map. For example, a plurality of users, wearing a plurality of wearable devices implementing such a map collaboration processor 1844, can receive the benefit of pooled mapping information over a larger area. As a non-limiting example only, such a larger area can include an urban area, including at least outdoor areas, and also including public indoor spaces. Such a collaborative process can increase the speed and efficiency with which such a map is built, and can also increase the accuracy of the map, by receiving input from a plurality of different sensors from different wearable devices. While map collaboration processor 1844 can also receive and implement map information from fast mapping processor 1836, for greater accuracy, data from map refinement processor 1838 is used.

Figure 18E:
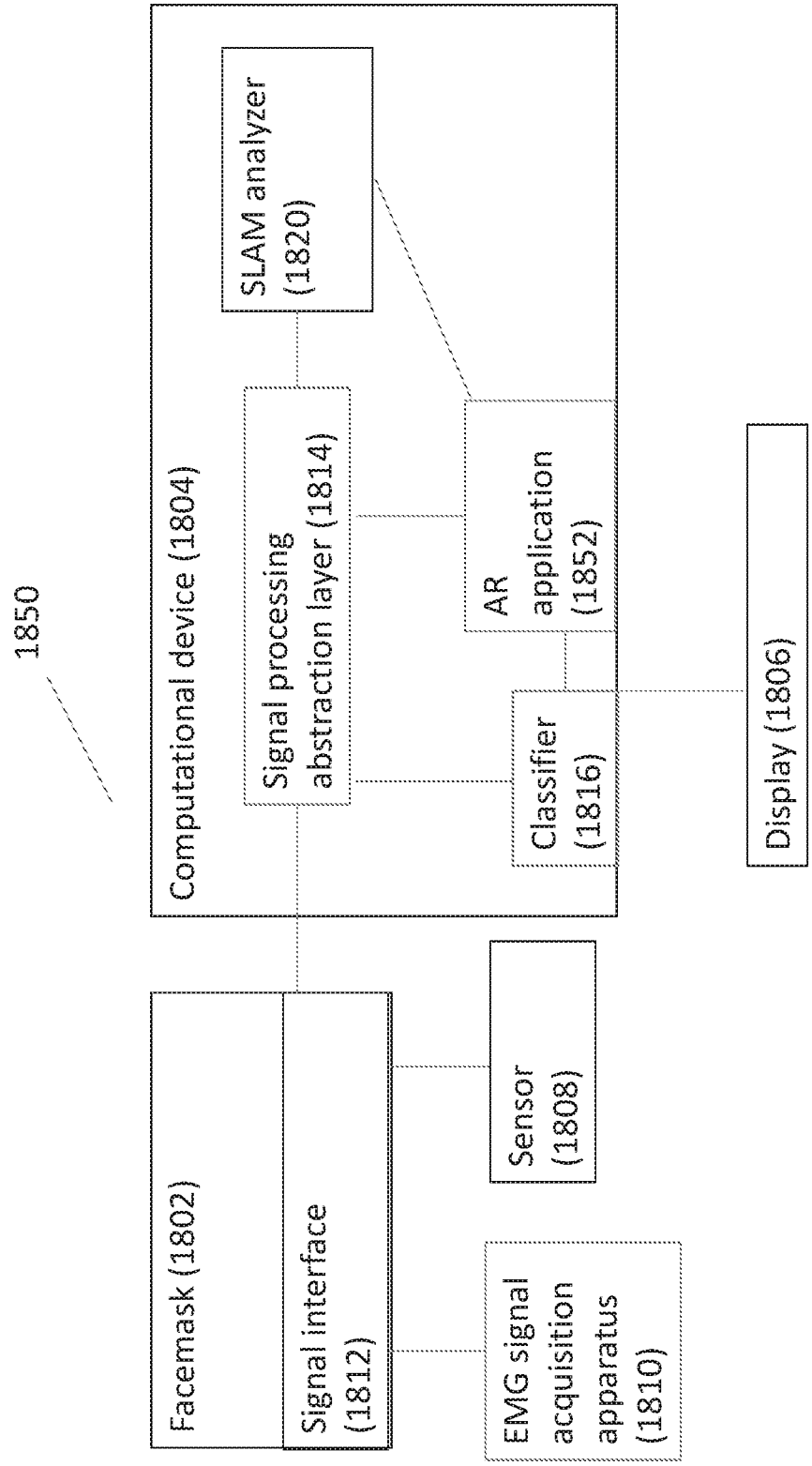
FIG. 18E shows a schematic of another non-limiting example of a wearable device according to at least some embodiments.

FIG. 18E shows a schematic of another non-limiting example of a wearable device according to at least some embodiments. Components which have the same or similar function to those in FIG. 18A have the same numbering. A system 1850 now features an AR (augmented reality) application 1852, instead of a VR application.

In some embodiments, computational device 1804 provides the facial expression, according to the classification, and optionally also the video data, to AR application 1852. AR application 1852 is configured to enable/operate an augmented reality environment for the user, including, for example, providing visual data for display by display 1806. Preferably, the visual data is altered by AR application 1852 according to the classification of the facial expression of the user and/or according to such a classification for a different user, for example in a multi-user interaction in an AR environment.

Figure 19:
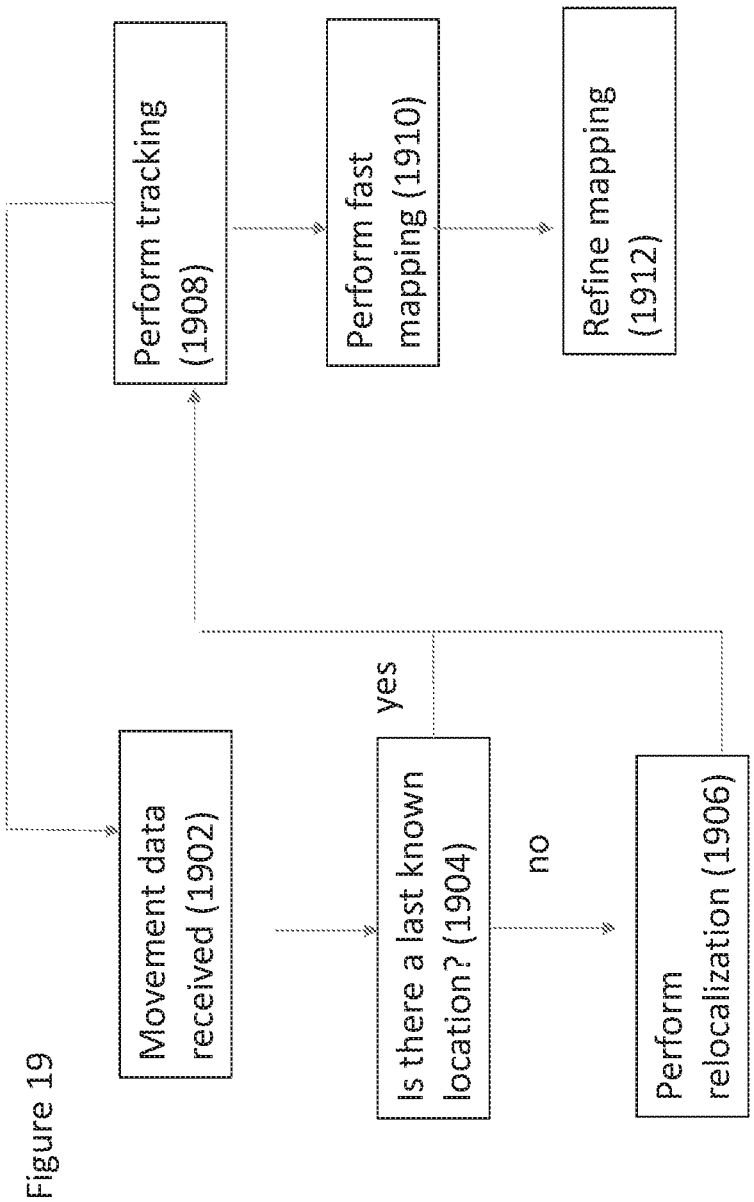
FIG. 19 shows a non-limiting example method for performing SLAM according to at least some embodiments.

FIG. 19 shows a non-limiting example method for performing SLAM according to at least some embodiments of the present disclosure. As shown, a user moves 1902 (e.g., his or her head and/or other body part/body) wearing the wearable device, such that sensor data is received from one or more sensors at 1904. The sensor data received is related to such movement. For this non-limiting example, the wearable device is assumed to be a headset of some type that is worn on the head of the user. The headset is assumed to contain one or more sensors, such as a camera for example.

At 1904, it is determined whether there is a last known location of the wearable device according to previous sensor data. If not, then relocalization is preferably performed at 1906 according to any method described herein, in which the location of the wearable device is determined again from sensor data. For example, if the sensor is a camera, such that the sensor data is a stream of images, relocalization can be used to determine the location of the wearable device from the stream of images, optionally without using the last known location of the wearable device as an input. Relocalization in this non-limiting example is optionally performed according to the RANSAC algorithm, described for example in "Random sample consensus: a paradigm for model fitting with applications to image analysis and automated cartography" by Fischler and Bolles (available from http://dl.acm.org/citation.cfm?id=358692). For this algorithm, as described in greater detail below, the images are decomposed to a plurality of features. The features are considered in groups of some predetermined number, to determine which features are accurate. The RANSAC algorithm is robust in this example because no predetermined location information is required.

In 1908, once the general location of the wearable device is known, then tracking is performed. Tracking is used to ascertain the current location of the wearable device from general location information, such as the last known location of the wearable device in relation to the map, and the sensor data. For example, if the sensor data is a stream of images, then tracking is optionally used to determine the relative change in location of the wearable device on the map from the analyzed stream of images, relative to the last known location on the map. Tracking in this non-limiting example can be performed according to non-linear minimization with a robust estimator, in which case the last known location on the map can be used for the estimator. Alternatively, tracking can be performed according to the RANSAC algorithm or a combination of the RANSAC algorithm and non-linear minimization with a robust estimator.

After tracking is completed for the current set of sensor data, the process preferably returns at 1902 for the next set of sensor data, as well as continuing at 1910. Preferably, as described herein, the tracking loop part of the process (repetition of 1902-1908) operates at 60 Hz (but other frequencies are within the scope of the present disclosure).

At 1910, coarse grained, fast mapping is preferably performed as previously described. If the sensor data is a stream of images, then preferably selected images (or "keyframes") are determined as part of the mapping process. During the mapping process each frame (the current frame or an older one) can be kept as a keyframe. Not all frames are kept as keyframes, as this slows down the process. Instead, a new keyframe is preferably selected from frames showing a poorly mapped or unmapped part of the environment. One way to determine that a keyframe shows a poorly mapped or unmapped part of the environment is when many new features appear (features for which correspondences do not exist in the map). Another way is to compute geometrically the path of the camera. When the camera moves so that the view field partially leaves the known map, preferably a new keyframe is selected.

Optionally and preferably, 1908 and 1910 are performed together, in parallel, or at least receive each other's output as each step is performed. The impact of mapping and tracking on each other is important for the "simultaneous" aspect of SLAM to occur.

At 1912, the map may be refined, to increase the precision of the mapping process, which may be performed according to bundle adjustment, in which the coordinates of a group or "bundle" of three dimensional points is simultaneously refined and optimized according to one or more criteria (see for example the approaches described in B. Triggs; P. McLauchlan; R. Hartley; A. Fitzgibbon (1999). "Bundle Adjustment—A Modern Synthesis". ICCV '99: Proceedings of the International Workshop on Vision Algorithms. Springer-Verlag. pp. 298-372). Such a refined map is preferably passed back to the relocalization, tracking and fast mapping processes.

Figure 20:
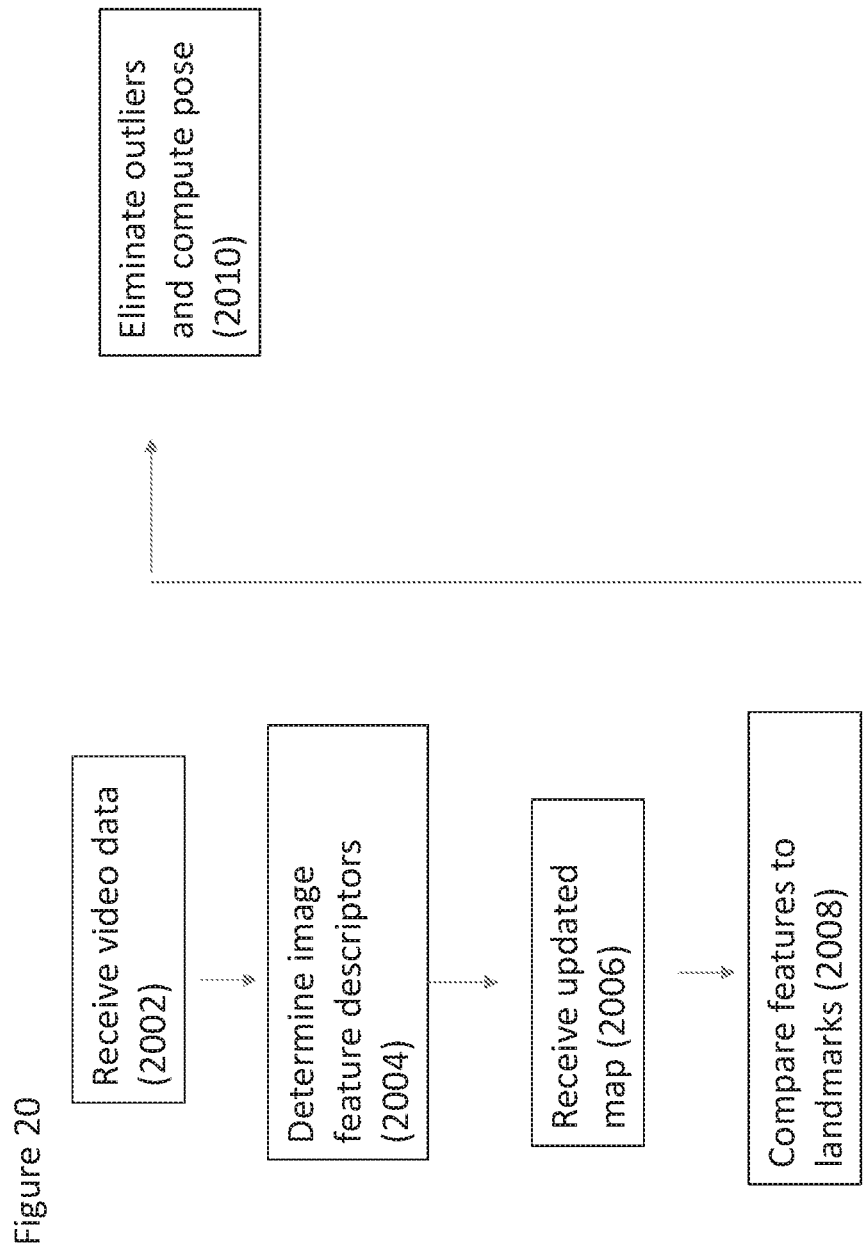
FIG. 20 shows a non-limiting example method for performing localization according to at least some embodiments.

FIG. 20 shows a non-limiting example of a method for performing localization according to at least some embodiments of the present disclosure. It is worth noting that the method shown in FIG. 20 may be performed for initial localization, when SLAM is first performed, and/or for relocalization. While, the method may be performed for tracking (as described herein), such may be too computationally expensive and/or slow, depending upon the computational device being used. For example, the method shown in FIG. 5, in some embodiments, may operate too slow or require computational resources which are not presently available on current smartphones.

Figure 21:
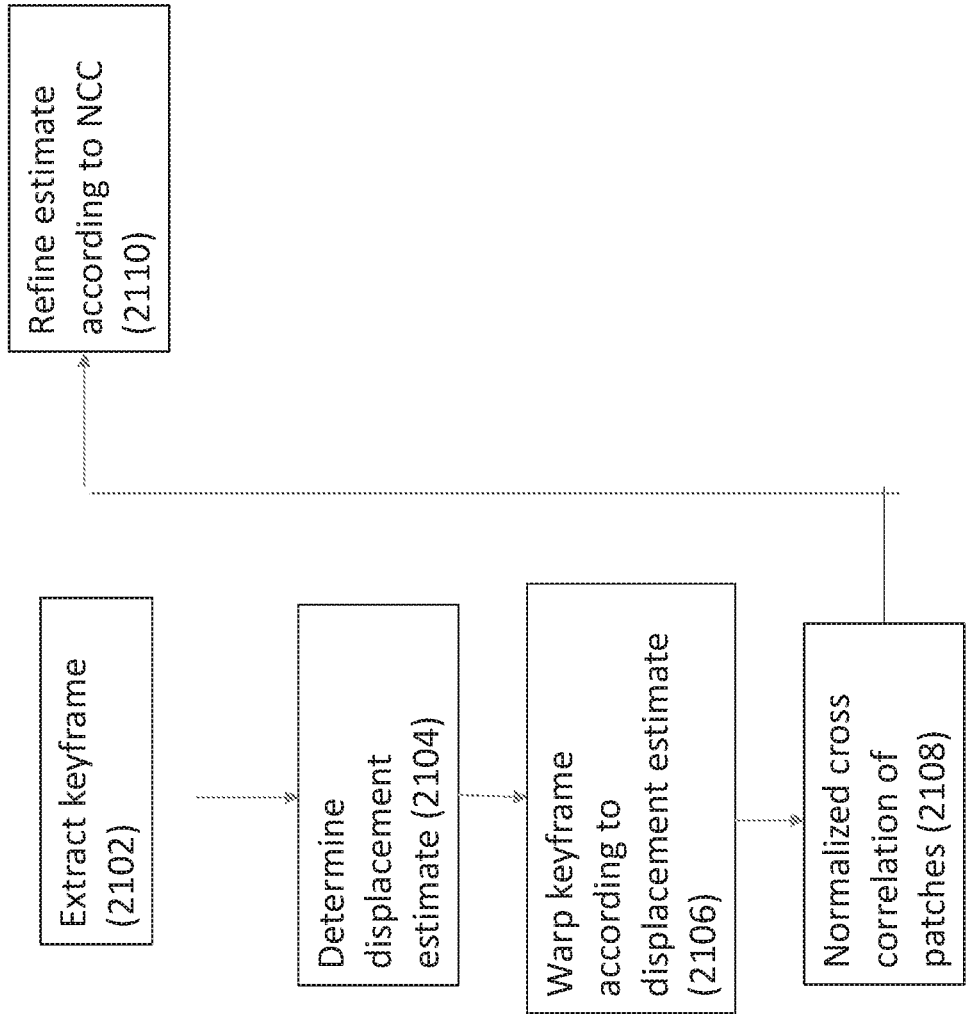
FIG. 21 shows another non-limiting example of a method for performing localization according to at least some embodiments.
Figure 22:
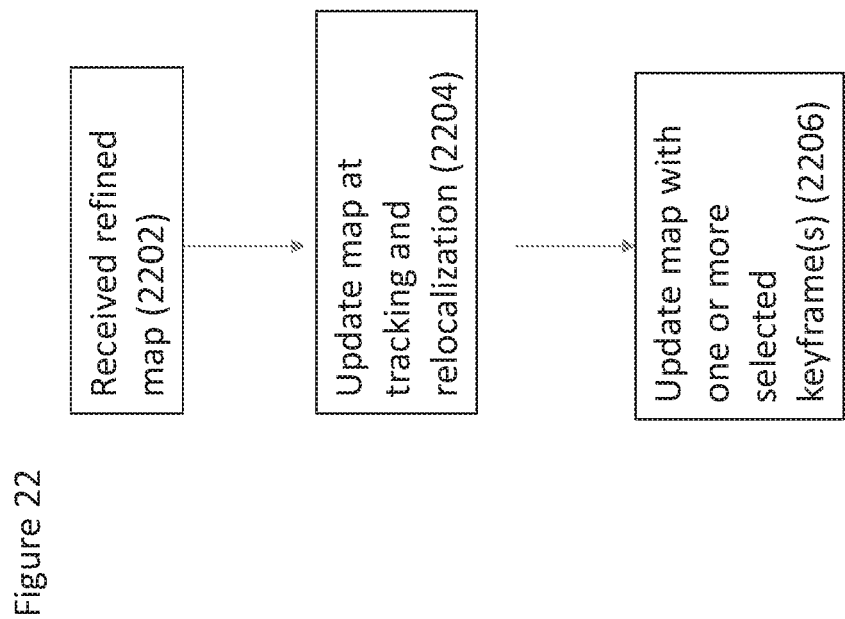
FIG. 22 shows a non-limiting example of a method for updating system maps according to map refinement, according to at least some embodiments of the present disclosure.

With respect to FIGS. 20-22, and for the purpose of illustration only (without intending to be limiting), the SLAM method is assumed to be performed on sensor data which includes a plurality of images from a camera. Accordingly, at 2002, a plurality of images, such as a plurality of video frames, is obtained, which can be preprocessed (as described herein), such that the video data is suitable for further analysis. At 2004, one or more image feature descriptors are determined for each feature point in each frame. A feature point may be determined according to information provided by that feature, such that an information-rich portion of the image can be determined to be a feature. Determination of whether a portion of the image is information-rich can be determined according to the dissimilarity of that portion of the image from the remainder of the image. For example, and without limitation, a coin on an otherwise empty white surface would be considered to be the information-rich part of the image. Other non-limiting examples of information-rich portions of an image include boundaries between otherwise homogenous objects. As used herein, the term "feature point" can relate to any type of image feature, including a point, an edge and so forth.

As part of this process, a plurality of feature points in the frames are searched. Optionally, such searching is performed using the FAST analytical algorithm, as described for example in "Faster and better: a machine learning approach to corner detection", by Rosten et al, 2008 (available from https://arxiv.org/pdf/0810.2434). The FAST algorithm optionally uses the newly selected keyframe(s) to compare the feature points in that keyframe to the other, optionally neighboring, keyframes, by triangulation for example.

For each feature point, a descriptor, which is a numerical representation of the appearance of the surrounding portion of the image around the feature point, may be calculated, with an expectation that two different views of the same feature point will lead to two similar descriptors. In some embodiments, the descriptor can be calculated according to the ORB standard algorithm, for example as described in "ORB: an efficient alternative to SIFT or SURF" (available from http://www.willowgarage.com/sites/default/files/orb_final.pdf); and in "ORB-SLAM2: an Open-Source SLAM System for Monocular, Stereo and RGB-D Cameras" by Mur-Artal and Tardos, 2016 (available from https://arxiv.org/abs/1610.06475).

Next, an updated map is received at 2006, which features a plurality of landmarks (which as previously described, are preferably validated landmarks). At 2008, the descriptors of at least some features in at least some frames are compared to the landmarks of the map. The landmarks of the map are preferably determined according to keyframes, which can be selected as previously described. To avoid requiring comparison of all features to all landmarks, descriptors and/or images may be sorted, for example, according to a hash function, into groupings representing similarity, such that only those descriptors and/or images that are likely to be similar (according to the hash function) are compared.

In such embodiments, each feature point may include a descriptor, which is a 32-byte string (for example). Given the map contains a plurality of landmarks, comparing each descriptor to all landmarks, as noted above, requires a great deal of computational processing and resources. Accordingly, a vocabulary tree may be used to group descriptors according to similarity: similar descriptors may be assigned the same label or visual word. Accordingly, for each keyframe in the map, all labels associated with that key frame may be considered (each label being related to a feature point on that map). For each label or visual map, in some embodiments, a list of key frames containing that label may be made. Then, for a new frame, the visual word may be computed. Next, a list of keyframes in which similar visual words appear is reviewed, with the subject keyframes being a set of candidates for matching to one and/or another. The vocabulary tree therefore enables more efficient assignment of the visual words, which, in turn, enables sets of candidate keyframes for matching to be more efficiently selected. These candidates may then be used more precisely to relocalize. Non-limiting examples of implementations of such a method are described in "Bags of Binary Words for Fast Place Recognition in Image Sequences" (by Gilvez-López and Tardós, IEEE Transactions on Robotics, 2012, available from http://ieeexplore.ieee.org/document/6202705/) and "Scalable Recognition with a Vocabulary Tree" (by Stewenius and Nister, 2006, available from http://dl.acm.org/citation.cfm?id=1153548). One of skill in the art will appreciate that this method may also be used for tracking, for example, a specific object, or alternatively, for tracking generally as described herein.

At 2010, outlier correspondences may be eliminated, for example, according to statistical likelihood of the features and the landmarks being correlated, and a pose (position and orientation) is calculated, preferably simultaneously. Optionally, a method such as RANSAC may be implemented to eliminate such outliers and to determine a current pose, with such methods performing both functions simultaneously. The pose of the sensor reporting the data may be calculated according to the correspondences between the features on the map and the landmarks that were located with the sensor data. RANSAC can be implemented according to OpenCV, which is an open source computer vision library (available at http://docs.opencv.org/master/d9/d0c/group_calib3d.html#gsc.tab=0).

FIG. 21 shows another non-limiting example method for performing localization according to at least some embodiments of the present disclosure. The method shown, according to some embodiments, is computationally faster and less expensive than the method of FIG. 20. Furthermore, the method of FIG. 21 is computationally suitable for operation on current smartphones. Optionally, the method described herein may be used for tracking, where the previous known location of the sensor providing the sensor data is sufficiently well known to enable a displacement estimate to be calculated, as described in greater detail below.

At 2102, a keyframe is selected from a set of keyframes in the map (optionally, a plurality of keyframes is selected). The selection of the keyframe can be performed either around FAST feature points (as determined by the previously described FAST algorithm) or around reprojection locations of map landmarks with respect to the features on the keyframe(s). This provides a relative location of the features in the keyframe(s) with their appearance according to the pixel data. For example, a set of landmarks that are expected to be seen in each keyframe is used to determine the features to be examined.

At 2104, a displacement estimate on the map may be determined, which is an estimate of the current location of the sensor providing the sensor data, which (as in earlier examples) may be a camera providing a plurality of images, according to the previous known position. For example, assumptions can be made of either no motion, or, of constant velocity (estimate; assuming a constant rate of motion). In another example, performed with an IMU, sensor data may be provided in terms of rotation (and optionally, other factors), which can be used to determine a displacement estimate.

At 2106, one or more patches of the keyframe(s) is warped according to the displacement estimate around each feature of the keyframe(s). Accordingly, the number of features may have a greater effect on computational resources than the number of keyframes, as the number of patches ultimately determines the resources required. According to some embodiments, the displacement estimate includes an estimation of translocation distance and also of rotation, such that the keyframe(s) is adjusted accordingly.

At 2108, the NCC (normalized cross-correlation) of the warped keyframes is preferably performed. The displacement estimate may then be adjusted according to the output of the NCC process at 2110. Such an adjusted estimate may yield a location, or alternatively, may result in the need to perform relocalization, depending upon the reliability of the adjusted displacement estimate. The NCC output may also be used to determine reliability of the adjusted estimate.

FIG. 22 shows a non-limiting example method for updating system maps according to map refinement, according to at least some embodiments. At 2202, the refined map is received, which can be refined according to bundle adjustment as previously described. At 2204, the refined map is used to update the map at the relocalization and tracking processors, and therefore forms the new base map for the fast mapping process. At 2206, the map is then updated by one or more selected keyframe(s) for example by the fast mapping process.

Figure 23:
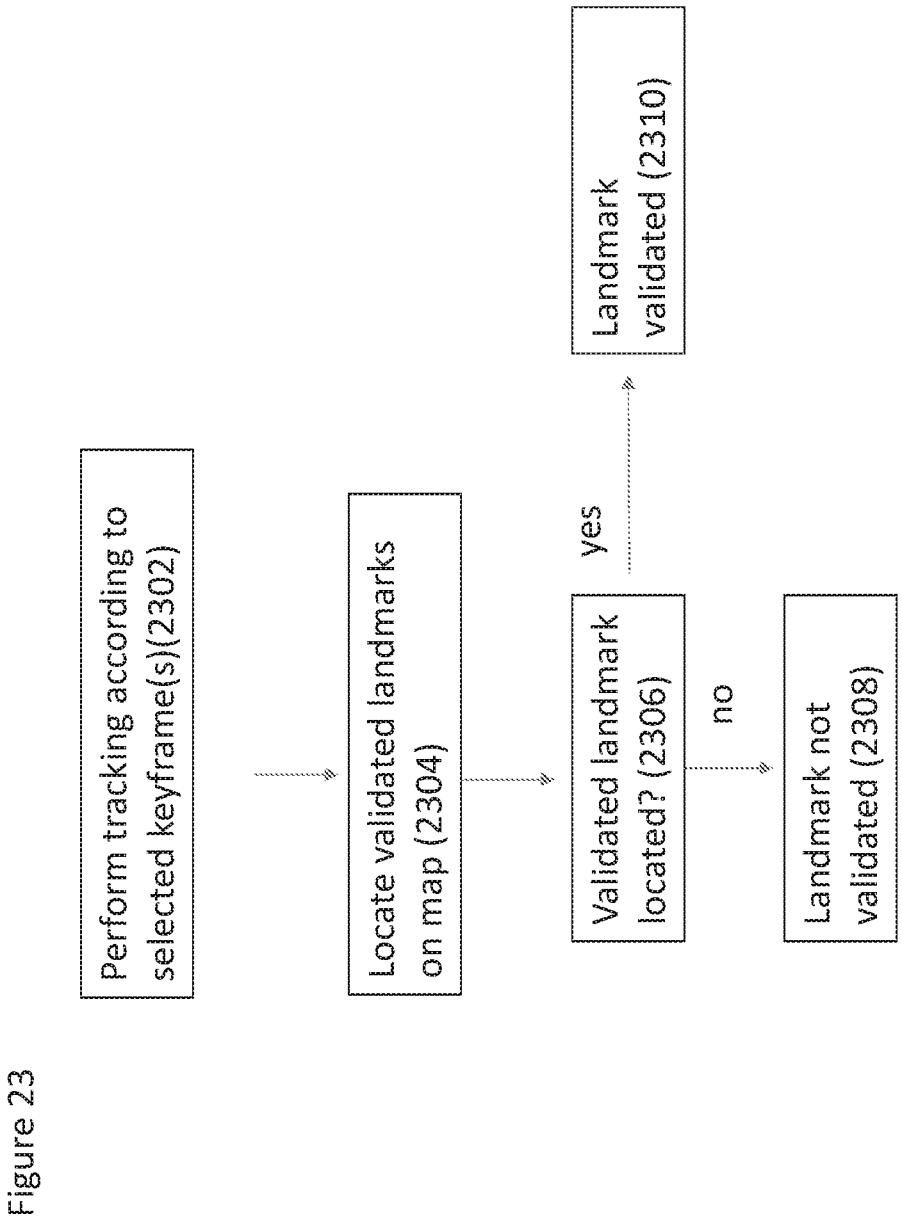
FIG. 23 shows a non-limiting example of a method for validating landmarks according to at least some embodiments of the present disclosure.

FIG. 23 shows a non-limiting, example, illustrative method for validating landmarks according to at least some embodiments. For example, at 2302, a selected keyframe is applied to the currently available map in order to perform tracking. At 2304, one or more validated landmarks are located on the map according to the applied keyframe. At 2306, it is determined whether a validated landmark can be located on the map after application of the keyframe. At 2310, if the landmark cannot be located, then it is no longer validated. In some implementations, failing to locate a validated landmark once may not cause the landmark to be in validated; rather, the landmark may be invalidated when a statistical threshold is exceeded, indicating that the validated landmark was failed to be located according to a sufficient number and/or percentage of times. According to this threshold, the validated landmark may no longer be considered to be validated. At 2308, if the landmark is located, then the landmark is considered to be a validated landmark.

Figure 24:
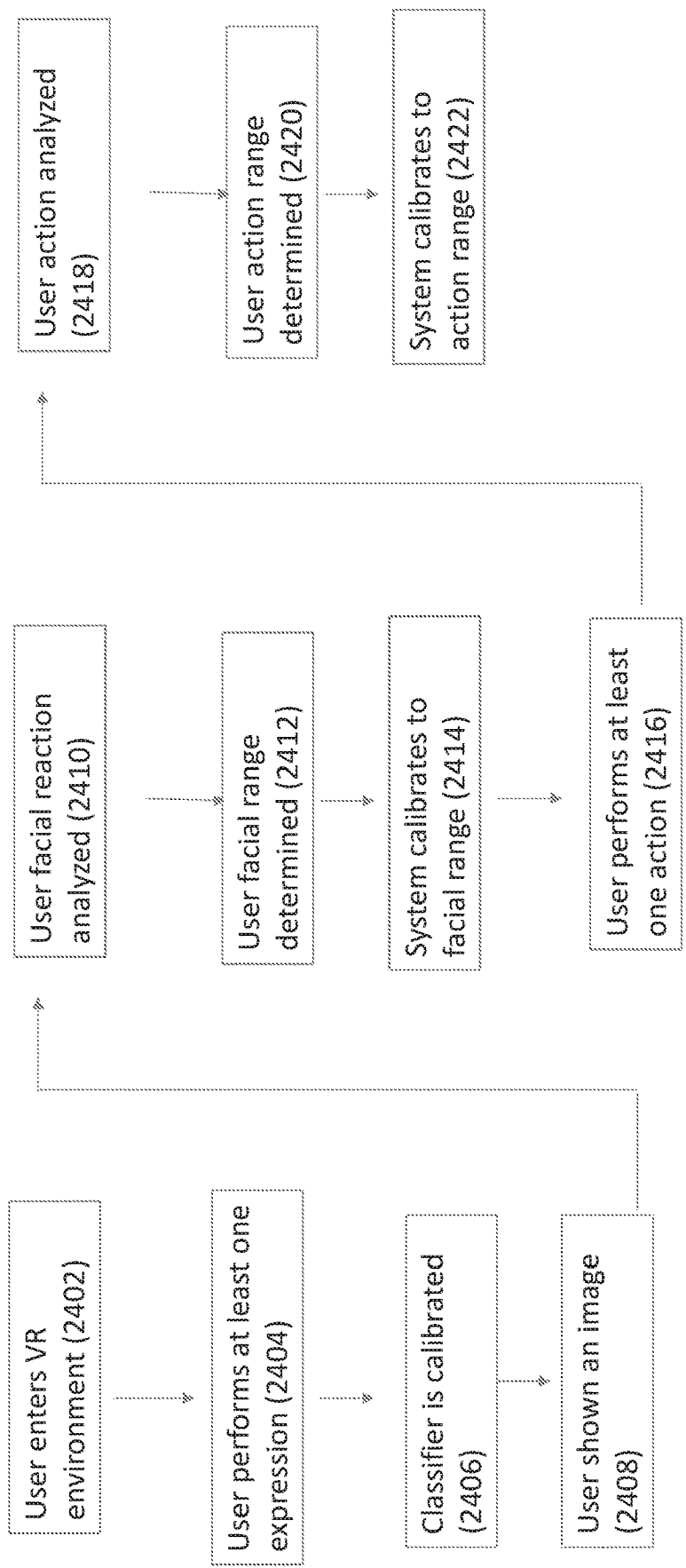
FIG. 24 shows a non-limiting example of a method for calibration of facial expression recognition and of movement tracking of a user in a VR environment according to at least some embodiments of the present disclosure.

FIG. 24 shows a non-limiting example of a method for calibrating facial expression recognition and movement tracking of a user in a VR environment (e.g.) according to at least some embodiments of the present disclosure. The process may begin by performing system calibration, which may include determining license and/or privacy features. For example, the user may not be allowed to interact with the VR environment until some type of device, such as a dongle, is able to communicate with the system in order to demonstrate the existence of a license. Such a physical device may also be used to protect the privacy of each user, as a further layer of authentication. System calibration may also include calibration of one or more functions of a sensor as described herein.

Accordingly, at 2402, the user enters the VR environment, for example, by donning a wearable device (e.g., as described herein) and/or otherwise initiating the VR application. At this point, session calibration can be performed. By "session", it is meant the interactions of a particular user with the system. Session calibration may include determining whether the user is placed correctly with respect to the sensors, such as whether the user is placed correctly in regard to the camera and depth sensor. If the user is not placed correctly, the system can cause a message to be displayed to user, preferably at least in a visual display and/or audio display, but optionally in a combination thereof. The message indicates to the user that the user needs to adjust his or her placement relative to one or more sensors. For example, the user may need to adjust his or her placement relative to the camera and/or depth sensor. Such placement can include adjusting the location of a specific body part, such as of the arm and/or hand of the user.

Optionally and preferably, at least the type of activity, such as the type of game, that the user will engage in is indicated as part of the session calibration. For example, the type of game may require the user to be standing, or may permit the user to be standing, sitting, or even lying down. The type of game can engage the body of the user or may alternatively engage specific body part(s), such as the shoulder, hand and arm for example. Such information is preferably provided so that the correct or optimal user position may be determined for the type of game(s) to be played. If more than one type of game is to be played, optionally this calibration is repeated for each type of game or alternatively may only be performed once.

Alternatively, the calibration process can be sufficiently broad such that the type of game does not need to be predetermined. In this non-limiting example, the user can potentially play a plurality of games or even all of the games, according to one calibration process. If the user is not physically capable of performing one or more actions as required, for example, by not being able to remain standing (hence cannot play one or more games), optionally, a therapist who is controlling the system can decide on which game(s) to be played.

At 2404, the user makes at least one facial expression (e.g., as previously described); the user can be instructed as to which facial expression is to be performed, such as smiling (for example). Optionally, the user can perform a plurality of facial expressions. The facial classifier may then be calibrated according to the one or more user facial expressions at 2406. Optionally, the user's facial expression range is determined from the calibration in 2406, but optionally (and preferably) such a range is determined from the output of steps 2408-2412.

At 2408, the user is shown an image, and the user's facial reaction to the image is analyzed at 2410 (2408 and 2410 can be performed more than once). At 2412, the user's facial expression range may be determined, either at least partially or completely, from the analysis of the user's facial reaction(s).

At 2414, the system can calibrate to the range of the user's facial expressions. For example, a user with hemispatial neglect can optionally be calibrated to indicate a complete facial expression was shown with at least partial involvement of the neglected side of the face. Such calibration optionally is performed to focus on assisting the user therapeutically and/or to avoid frustrating the user.

Next in 2416 to 1822, optionally, the system calibrates to the range of the user's actions. The system may perform user calibration to determine whether the user has any physical limitations. User calibration is preferably adjusted according to the type of activity to be performed, such as the game to be played, as noted above. For example, for a game requiring the user to take a step, user calibration is preferably performed to determine whether the user has any physical limitations when taking a step. Alternatively, for a game requiring the user to lift his or her arm, user calibration is preferably performed to determine whether the user has any physical limitations when lifting his or her arm. If game play is to focus on one side of the body, then user calibration preferably includes determining whether the user has any limitations for one or more body parts on that side of the body. The user performs at least one action in 2416.

User calibration is preferably performed separately for each gesture required in a game. For example, if a game requires the user to both lift an arm and a leg, preferably each such gesture is calibrated separately for the user, to determine any user limitations, in 2418. As noted above, user calibration for each gesture is used to inform the game layer of what can be considered a full range of motion for that gesture for that specific user.

In 2420, such calibration information is received by a calibrator, such as a system calibration module for example. The calibrator preferably compares the actions taken by the user to an expected full range of motion action, and then determines whether the user has any limitations. These limitations are then preferably modeled separately for each gesture.

In 2420, these calibration parameters are used to determine an action range for the user. Therefore, actions to be taken by the user, such as gestures for example, are adjusted according to the modeled limitations for the application layer. The gesture provider therefore preferably abstracts the calibration and the modeled limitations, such that the game layer relates only to the determination of the expected full range of motion for a particular gesture by the user. However, the gesture provider may also optionally represent the deficit(s) of a particular user to the game layer (not shown), such that the system can recommend a particular game or games, or type of game or games, for the user to play, in order to provide a diagnostic and/or therapeutic effect for the user according to the specific deficit(s) of that user.

The system, according to at least some embodiments of the present disclosure preferably monitors a user behavior. The behavior is optionally selected from the group consisting of a performing physical action, response time for performing the physical action and accuracy in performing the physical action. Optionally, the physical action comprises a physical movement of at least one body part. The system is optionally further adapted for therapy and/or diagnosis of a user behavior.

Optionally, alternatively or additionally, the system according to at least some embodiments is adapted for cognitive therapy of the user through an interactive computer program. For example, the system is optionally adapted for performing an exercise for cognitive training.

Optionally, the exercise for cognitive training is selected from the group consisting of attention, memory, and executive function.

Optionally, the system calibration module further determines if the user has a cognitive deficit, such that the system calibration module also calibrates for the cognitive deficit if present.

Figure 25A:
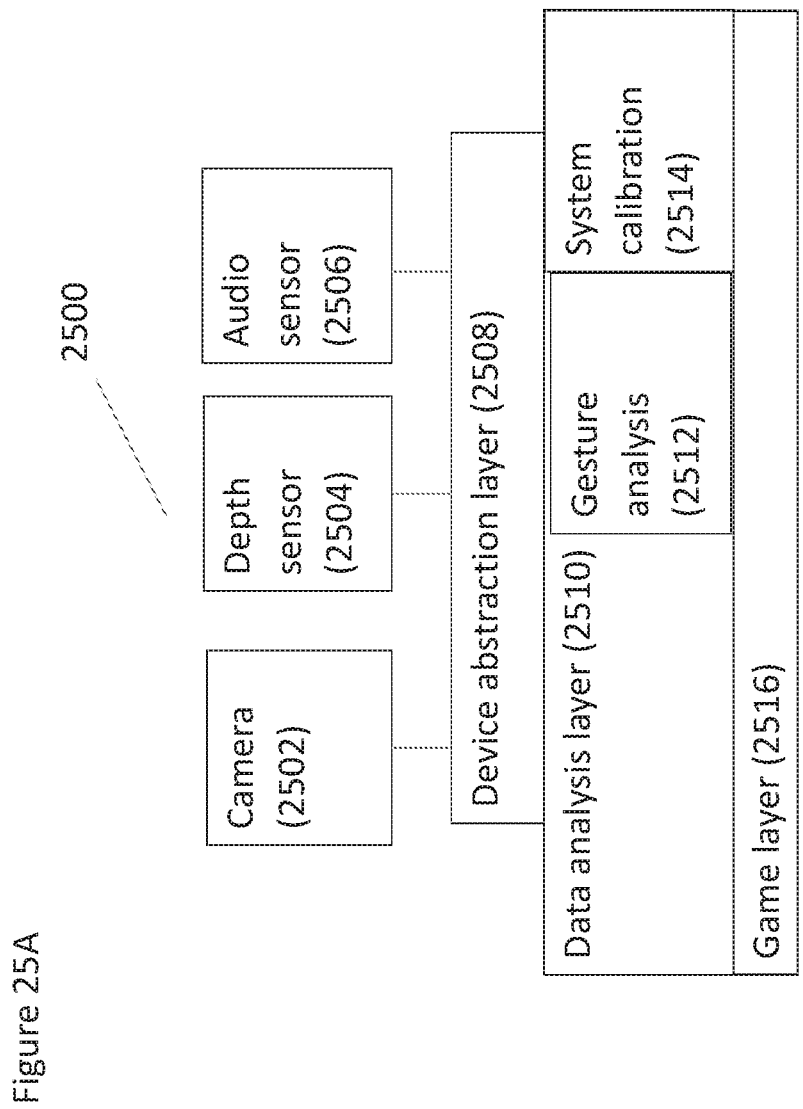
FIGS. 25A-25C show an exemplary, illustrative non-limiting system according to at least some embodiments of the present disclosure.
Figure 26:
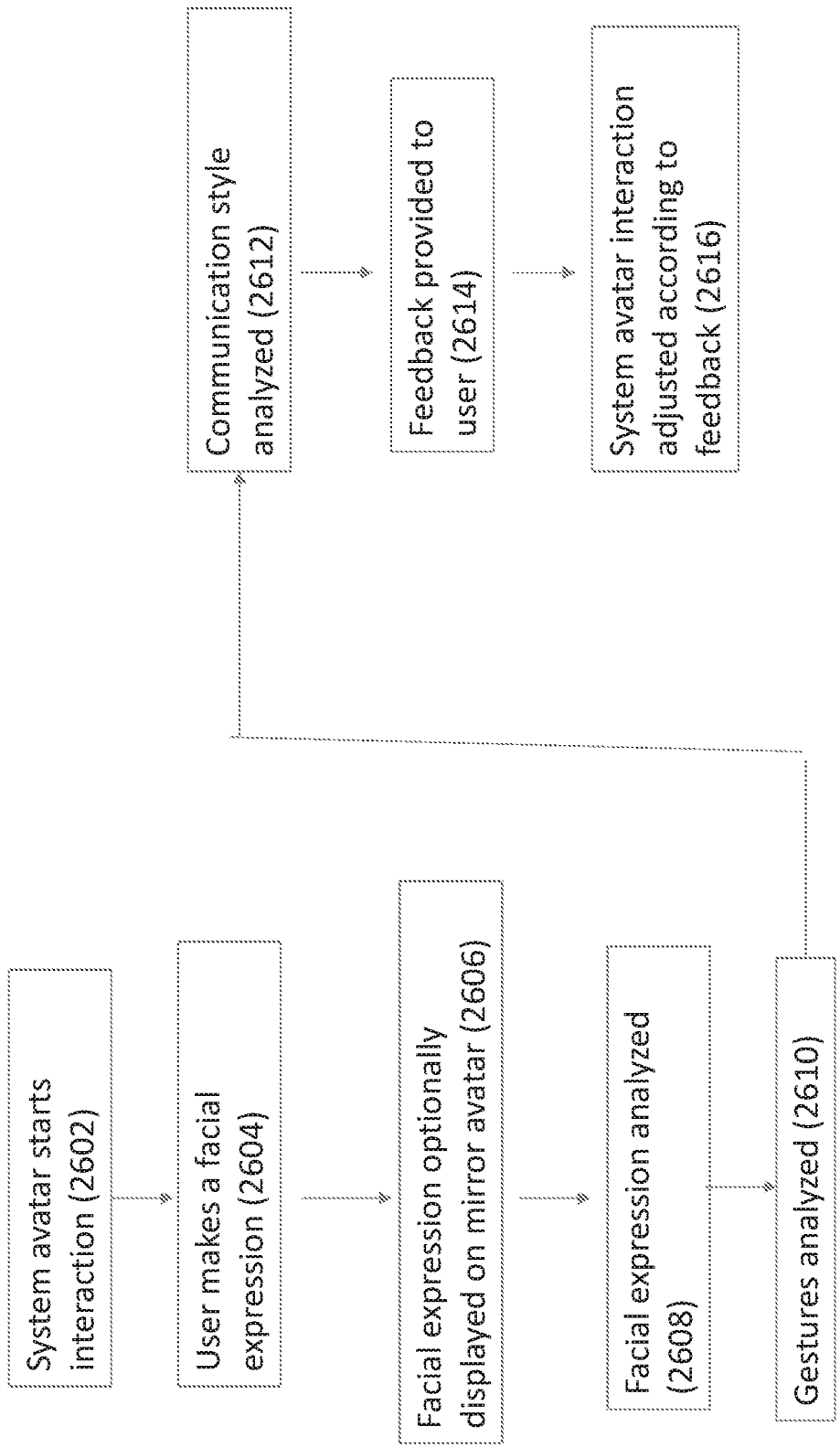
FIG. 26 shows a non-limiting example of a communication method for providing feedback to a user in a VR environment according to at least some embodiments.
Figure 30:
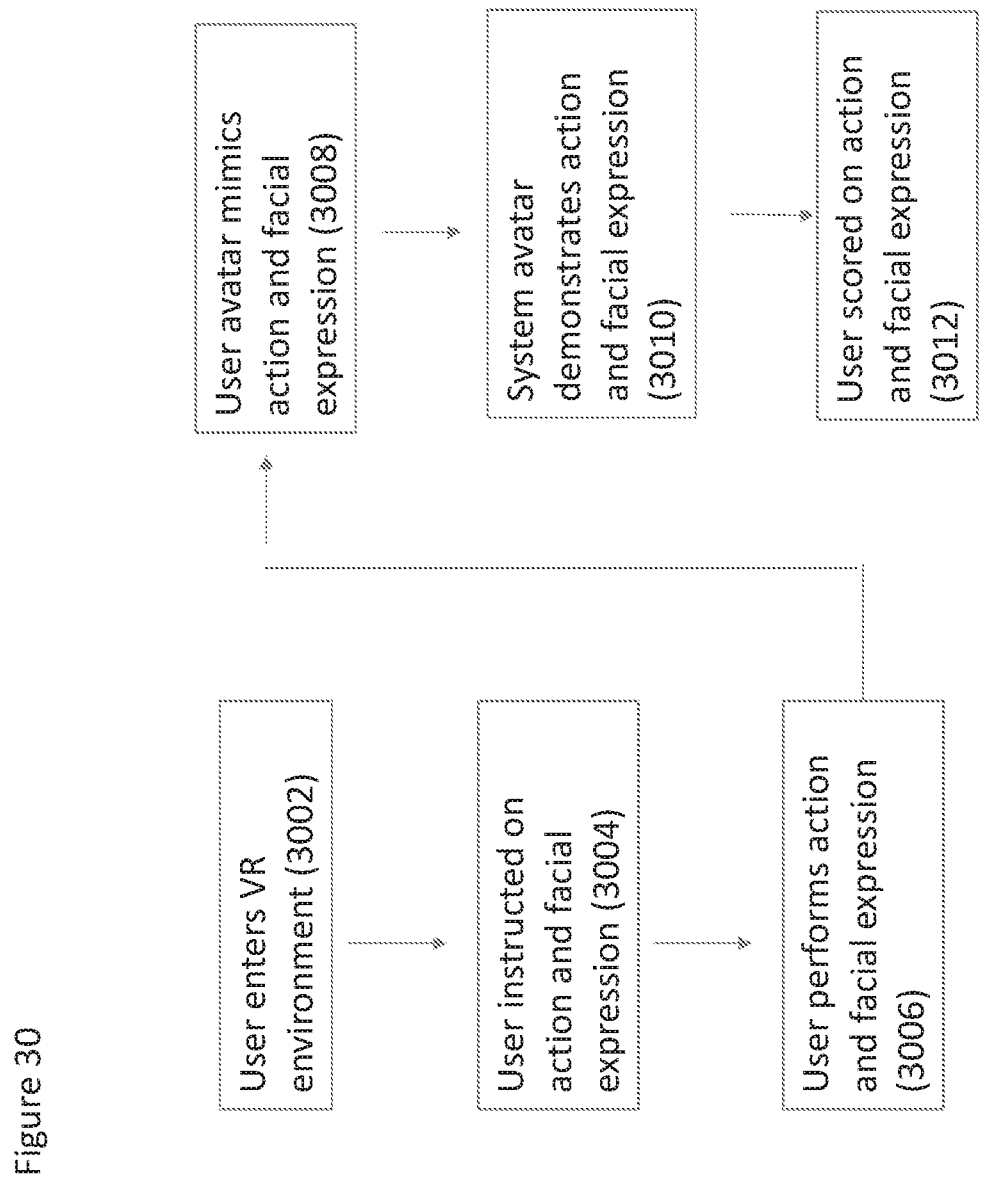
FIG. 30 shows a non-limiting example of a method for playing a game comprising actions and facial expressions in a VR environment according to at least some embodiments of the present disclosure.

FIG. 25A shows an exemplary, illustrative non-limiting system according to at least some embodiments of the present disclosure for supporting the method of FIG. 30, in terms of gesture recognition for a VR (virtual reality) system, which can, for example, be implemented with the system of FIG. 26. As shown, a system 2500 features a camera 2502, a depth sensor 2504 and optionally an audio sensor 2506. As described in greater detail below, optionally camera 2502 and depth sensor 2504 are combined in a single product, such as the Kinect product of Microsoft, and/or as described with regard to U.S. Pat. No. 8,379,101, for example. Optionally, all three sensors are combined in a single product. The sensor data preferably relates to the physical actions of a user (not shown), which are accessible to the sensors. For example, camera 2502 can collect video data of one or more movements of the user, while depth sensor 2504 can provide data to determine the three dimensional location of the user in space according to the distance from depth sensor 2504. Depth sensor 2504 preferably provides TOF (time of flight) data regarding the position of the user; the combination with video data from camera 2502 allows a three dimensional map of the user in the environment to be determined. As described in greater detail below, such a map enables the physical actions of the user to be accurately determined, for example with regard to gestures made by the user. Audio sensor 2506 preferably collects audio data regarding any sounds made by the user, optionally including but not limited to, speech.

Sensor data from the sensors is collected by a device abstraction layer 2508, which preferably converts the sensor signals into data which is sensor-agnostic. Device abstraction layer 2508 preferably handles all of the necessary preprocessing such that if different sensors are substituted, only changes to device abstraction layer 2508 are required; the remainder of system 2500 is preferably continuing functioning without changes, or at least without substantive changes. Device abstraction layer 2508 preferably also cleans up the signals, for example to remove or at least reduce noise as necessary, and can also normalize the signals. Device abstraction layer 2508 may be operated by a computational device (not shown). Any method steps performed herein can be performed by a computational device; also all modules and interfaces shown herein are assumed to incorporate, or to be operated by, a computational device, even if not shown.

The preprocessed signal data from the sensors is then passed to a data analysis layer 2510, which preferably performs data analysis on the sensor data for consumption by a game layer 2516. By "game" it is optionally meant any type of interaction with a user. Preferably such analysis includes gesture analysis, performed by a gesture analysis module 2512. Gesture analysis module 2512 preferably decomposes physical actions made by the user to a series of gestures. A "gesture" in this case can include an action taken by a plurality of body parts of the user, such as taking a step while swinging an arm, lifting an arm while bending forward, moving both arms and so forth. The series of gestures is then provided to game layer 2516, which translates these gestures into game play actions. For example, and without limitation, and as described in greater detail below, a physical action taken by the user to lift an arm is a gesture which can translate in the game as lifting a virtual game object.

Data analysis layer 2510 also preferably includes a system calibration module 2514. As described in greater detail below, system calibration module 2514 optionally and preferably calibrates the physical action(s) of the user before game play starts. For example, if a user has a limited range of motion in one arm, in comparison to a normal or typical subject, this limited range of motion is preferably determined as being the user's full range of motion for that arm before game play begins. When playing the game, data analysis layer 2510 may indicate to game layer 2516 that the user has engaged the full range of motion in that arm according to the user calibration—even if the user's full range of motion exhibits a limitation. As described in greater detail below, preferably each gesture is calibrated separately.

System calibration module 2514 can perform calibration of the sensors in regard to the requirements of game play; however, preferably device abstraction layer 108 performs any sensor specific calibration. Optionally, the sensors may be packaged in a device, such as the Kinect, which performs its own sensor specific calibration.

Figure 25B:
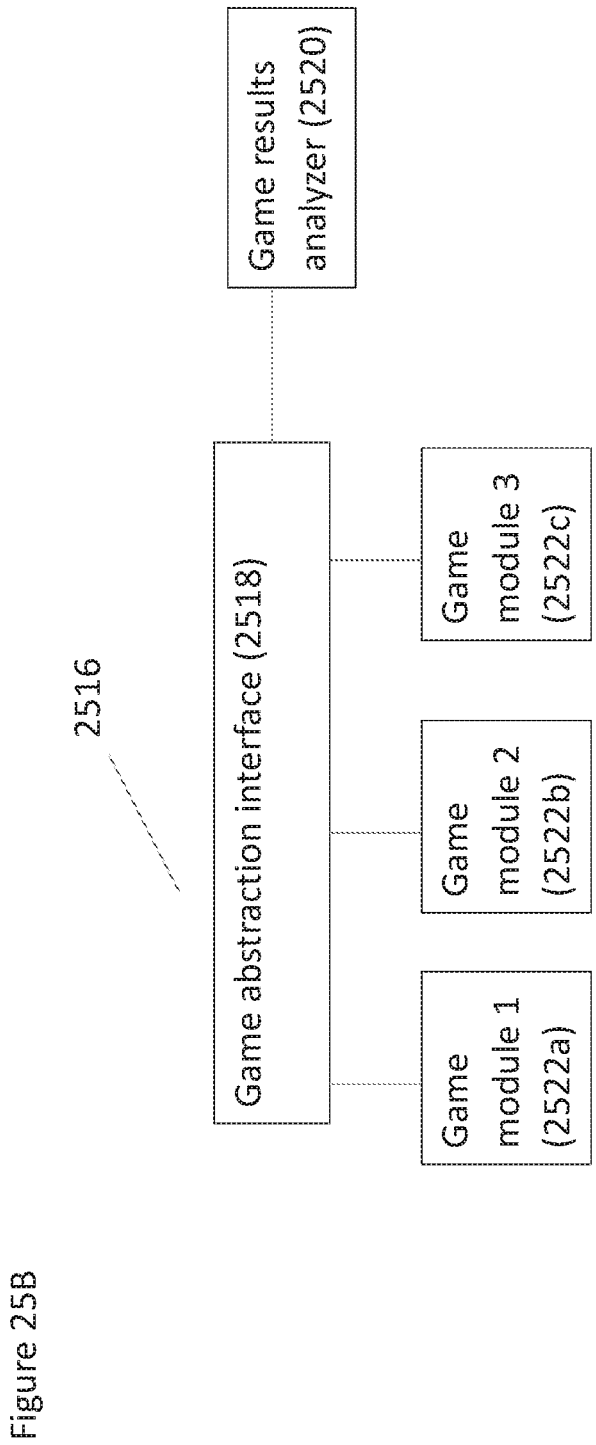

FIG. 25B shows an exemplary, illustrative non-limiting game layer according to at least some embodiments of the present disclosure. The game layer shown in FIG. 25B can be implemented for the game layer of FIG. 25A and hence is labeled as game layer 2516; however, alternatively the game layer of FIG. 25A can be implemented in different ways.

As shown, game layer 2516 preferably features a game abstraction interface 2518. Game abstraction interface 2518 preferably provides an abstract representation of the gesture information to a plurality of game modules 2522, of which only three are shown for the purpose of description only and without any intention of being limiting. The abstraction of the gesture information by game abstraction interface 2518 means that changes to data analysis layer 110, for example in terms of gesture analysis and representation by gesture analysis module 112, can only require changes to game abstraction interface 2518 and not to game modules 2522. Game abstraction interface 2518 preferably provides an abstraction of the gesture information and also optionally and preferably what the gesture information represents, in terms of one or more user deficits. In terms of one or more user deficits, game abstraction interface 2518 can poll game modules 2522, to determine which game module(s) 2522 is most appropriate for that user. Alternatively, or additionally, game abstraction interface 2518 can feature an internal map of the capabilities of each game module 2522, and optionally of the different types of game play provided by each game module 2522, such that game abstraction interface 2518 can be able to recommend one or more games to the user according to an estimation of any user deficits determined by the previously described calibration process. Of course, such information can also be manually entered and/or the game can be manually selected for the user by medical, nursing or therapeutic personnel.

Upon selection of a particular game for the user to play, a particular game module 2522 is activated and begins to receive gesture information, optionally according to the previously described calibration process, such that game play can start.

Game abstraction interface 2518 also optionally is in communication with a game results analyzer 2520. Game results analyzer 2520 optionally and preferably analyzes the user behavior and capabilities according to information received back from game module 2522 through to game abstraction interface 2518. For example, game results analyzer 2520 can score the user, as a way to encourage the user to play the game. Also game results analyzer 2520 can determine any improvements in user capabilities over time and even in user behavior. An example of the latter may occur when the user is not expending sufficient effort to achieve a therapeutic effect with other therapeutic modalities, but may show improved behavior with a game in terms of expended effort. Of course, increased expended effort is likely to lead to increased improvements in user capabilities, such that improved user behavior can be considered as a sign of potential improvement in user capabilities. Detecting and analyzing such improvements can be used to determine where to direct medical resources, within the patient population and also for specific patients.

Game layer 116 can comprise any type of application, not just a game. Optionally, game results analyzer 2520 can analyze the results for the interaction of the user with any type of application.

Game results analyzer 2520 can store these results locally or alternatively, or additionally, can transmit these results to another computational device or system (not shown). Optionally, the results feature anonymous data, for example to improve game play but without any information that ties the results to the game playing user's identity or any user parameters.

Also optionally, the results feature anonymized data, in which an exact identifier for the game playing user, such as the user's name and/or national identity number, is not kept; but some information about the game playing user is retained, including but not limited to one or more of age, disease, capacity limitation, diagnosis, gender, time of first diagnosis and so forth. Optionally, such anonymized data is only retained upon particular request of a user controlling the system, such as a therapist for example, in order to permit data analysis to help suggest better therapy for the game playing user, for example, and/or to help diagnose the game playing user (or to adjust that diagnosis).

Figure 25C:
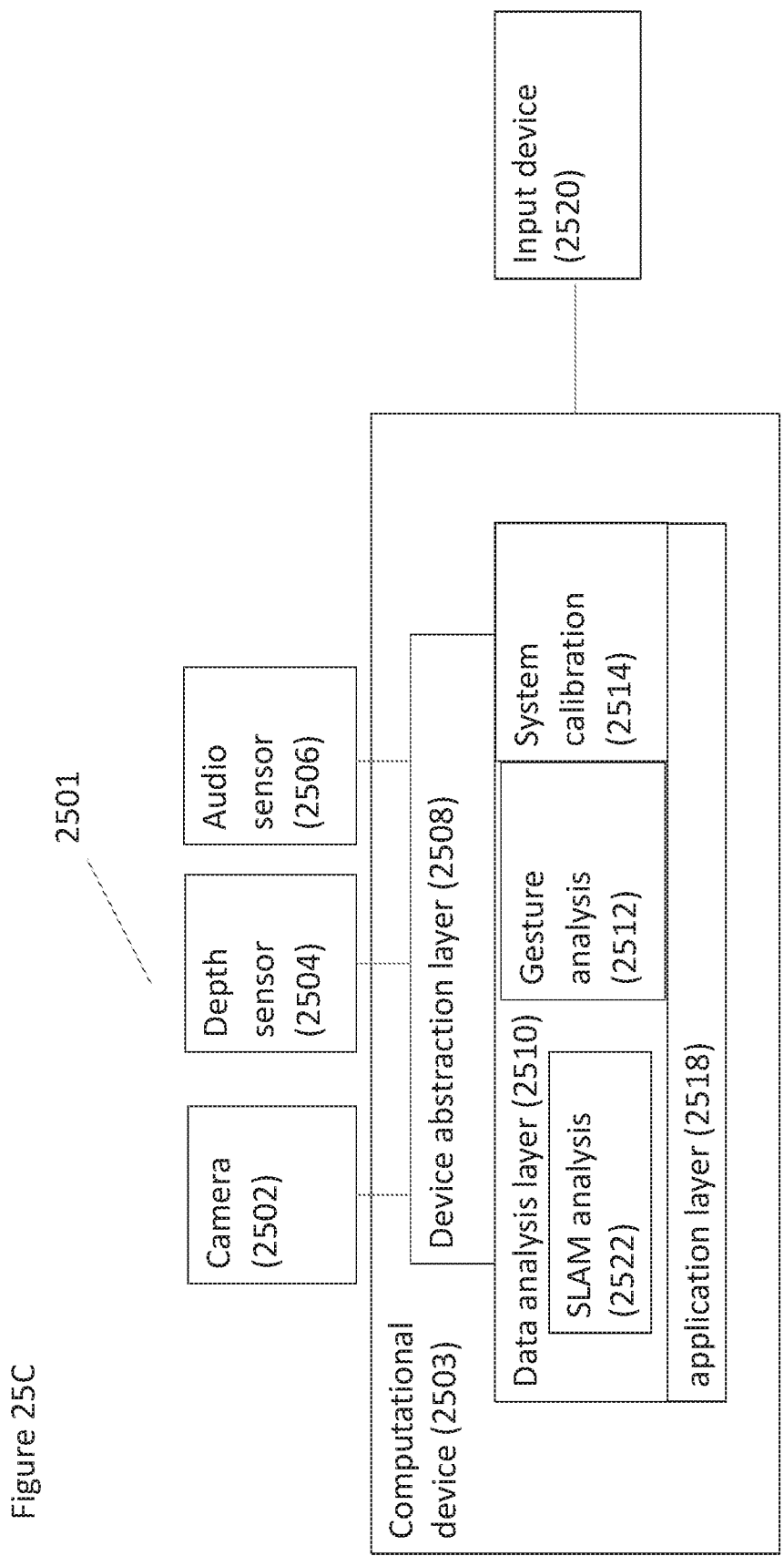

FIG. 25C shows an exemplary, illustrative non-limiting system according to at least some embodiments of the present disclosure for supporting gestures as input to operate a computational device. Components with the same numbers as FIG. 25A have the same or similar function. In a system 2501, a computational device 2503 optionally operates device abstraction layer 2508, data analysis layer 2510 and an application layer 2518. Gestures provided through the previously described sensor configuration and analyzed by gesture analysis 2512 may then control one or more actions of application layer 2518. Application layer 2518 may comprise any suitable type of computer software.

Optionally, computational device 2503 may receive commands through an input device 2520, such as a keyboard, pointing device and the like. Computational device 2503 may provide feedback to the user as to the most efficient or suitable type of input to provide at a particular time, for example due to environmental conditions.

To assist in determining the best feedback to provide to the user regarding the input, data analysis layer 2510 optionally operates a SLAM analysis module 2522, in addition to the previously described components. SLAM analysis module 2522 may provide localization information to determine whether gestures or direct input through input device 2520 would provide the most effective operational commands to application layer 2518.

Optionally, computational device 2503 could be any type of machine or device, preferably featuring a processor or otherwise capable of computations as described herein. System 2501 could provide a human-machine interface in this example.

Optionally computational device 2503 is provided with regard to FIG. 25A, in the same or similar configuration.

FIG. 26 shows a non-limiting example of a method for providing feedback to a user in a VR environment with respect to communications according to at least some embodiments of the present disclosure. This method may be a stand-alone method to coach a user on communication style or skills. To this end, at 2602, a system avatar starts to interact with a user in a VR environment, where the system avatar may be generated by the VR environment, or alternatively, may be an avatar of another user (e.g., a communications coach). Upon the user making a facial expression, where it may be analyzed for classification (2604). As noted in other embodiments, classification may be according to one and/or another of the classification methods described herein. The user preferably makes the facial expression while communicating with the system avatar, for example, optionally as part of a dialog between the system avatar and the user.

At 2606, the classified facial expression of the user may be displayed on a mirror avatar, so that the user can see his/her own facial expression in the VR environment, with the facial expression of the user being optionally analyzed at 2608 (e.g., as described with respect to FIG. 19). Optionally the mirror avatar is rendered so as to be similar in appearance to the user, for example according to the previously described blend shape computation. At 2610, one or more gestures of the user are analyzed, for example as described with regard to FIGS. 25A and 25B, as part of the communication process.

At 2612, the communication style of the user is analyzed according to the communication between the user and the system avatar, including at least the analysis of the facial expression of the user. Feedback may be provided to the user (at 2614) according to the analyzed communication style—for example, to suggest smiling more and/or frowning less. The interaction of the system avatar with the user may be adjusted according to the feedback at 2616, for example, to practice communication in a situation that the user finds uncomfortable or upsetting. This process may be repeated one or more times in order to support the user in learning new communication skills and/or adjusting existing skills.

Figure 27:
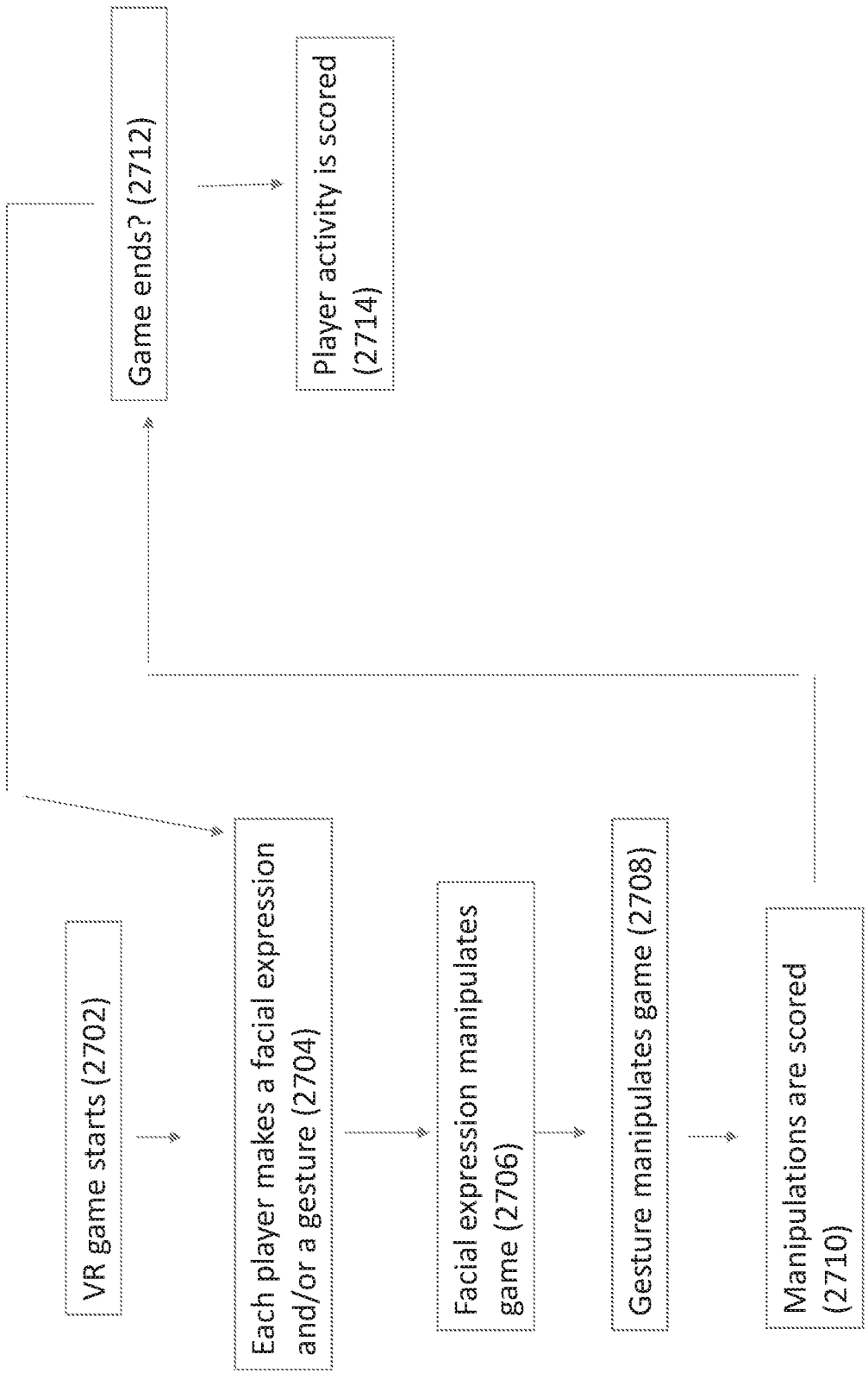
FIG. 27 shows a non-limiting example of a method for playing a game between a plurality of users in a VR environment according to at least some embodiments.

FIG. 27 shows a non-limiting example of a method for playing a game between a plurality of users in a VR environment according to at least some embodiments of the present disclosure. Accordingly, at 2702, the VR game starts, and at 2704, each user makes a facial expression, which is optionally classified (see, e.g., classification methods described herein), and/or a gesture, which is optionally tracked as described herein. At 2706, the facial expression may be used to manipulate one or more game controls, such that the VR application providing the VR environment responds to each facial expression by advancing game play according to the expression that is classified. At 2708, the gesture may be used to manipulate one or more game controls, such that the VR application providing the VR environment responds to each gesture by advancing game play according to the gesture that is tracked. It is possible to combine or change the order of 2706 and 2708.

At 2710, the effect of the manipulations is scored according to the effect of each facial expression on game play. At 2712, optionally game play ends, in which case the activity of each player (user) is scored at 2714. Game play optionally continues and the process returns to 2704.

Figure 28:
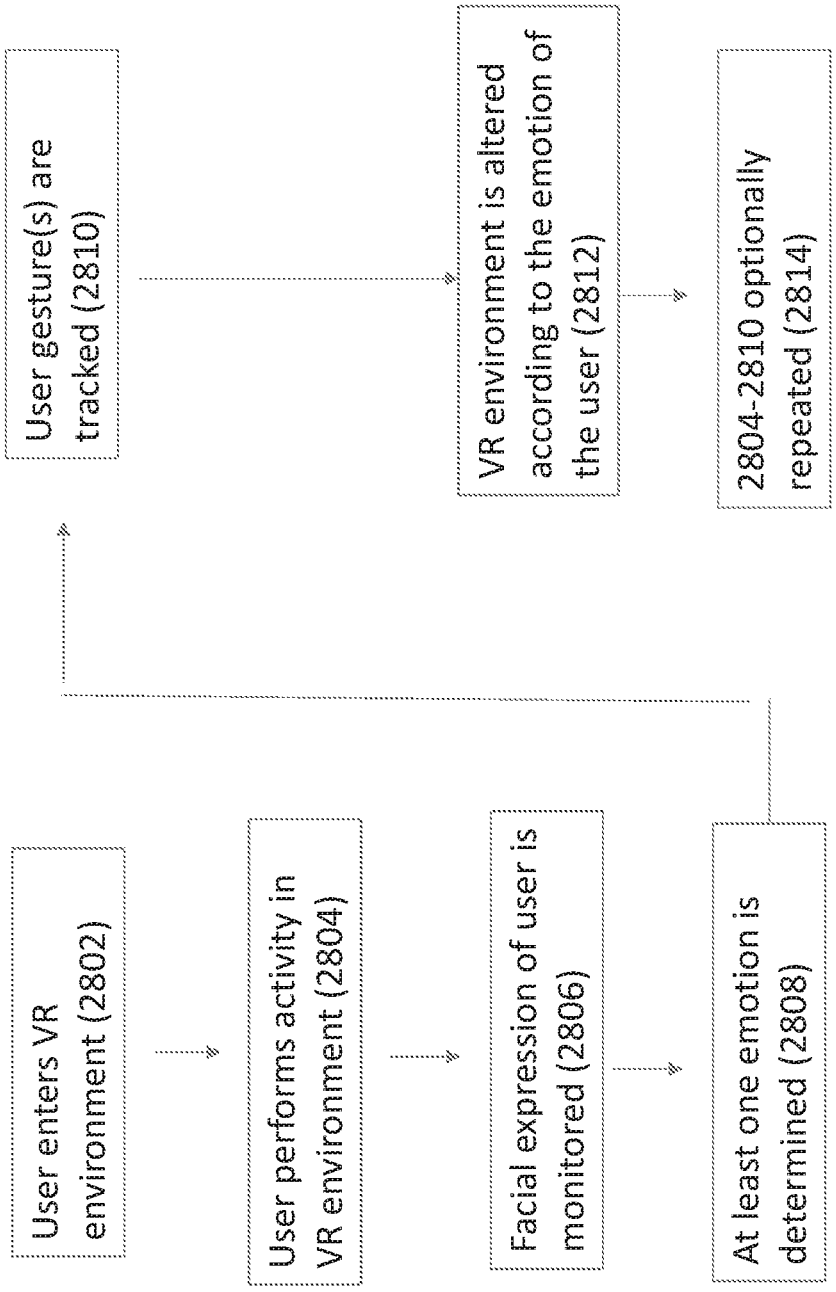
FIG. 28 shows a non-limiting example of a method for altering a VR environment for a user according to at least some embodiments.

FIG. 28 shows a non-limiting example of a method for altering a VR environment for a user according to at least some embodiments of the present disclosure. As shown, at 2802, the user enters the VR environment, for example, by donning a wearable device as described herein and/or otherwise initiating the VR application. At 2804, the user may perform one or more activities in the VR environment, where the activities may be any type of activity, including but not limited to, playing a game, or an educational or work-related activity. While the user performs one or more activities, the facial expression(s) of the user may be monitored (at 2806). At 2808, at least one emotion of the user is determined by classifying at least one facial expression of the user (e.g., classification methods disclosed herein). In addition, at the same time or at a different time, at least one gesture or action of the user is tracked at 2810.

The VR environment is altered according to the emotion of the user (at 2812) and optionally also according to at least one gesture or action of the user. For example, if the user is showing fatigue in a facial expression, then optionally, the VR environment is altered to induce a feeling of greater energy in the user. Also optionally, alternatively or additionally, if the user is showing physical fatigue, for example in a range of motion for an action, the VR environment is altered to reduce the physical range of motion and/or physical actions required to manipulate the environment. The previously described 2804-2810 may be repeated at 2814, to determine the effect of altering the VR environment on the user's facial expression. Optionally, 2806-2810 or 2804-2812 may be repeated.

Figure 29:
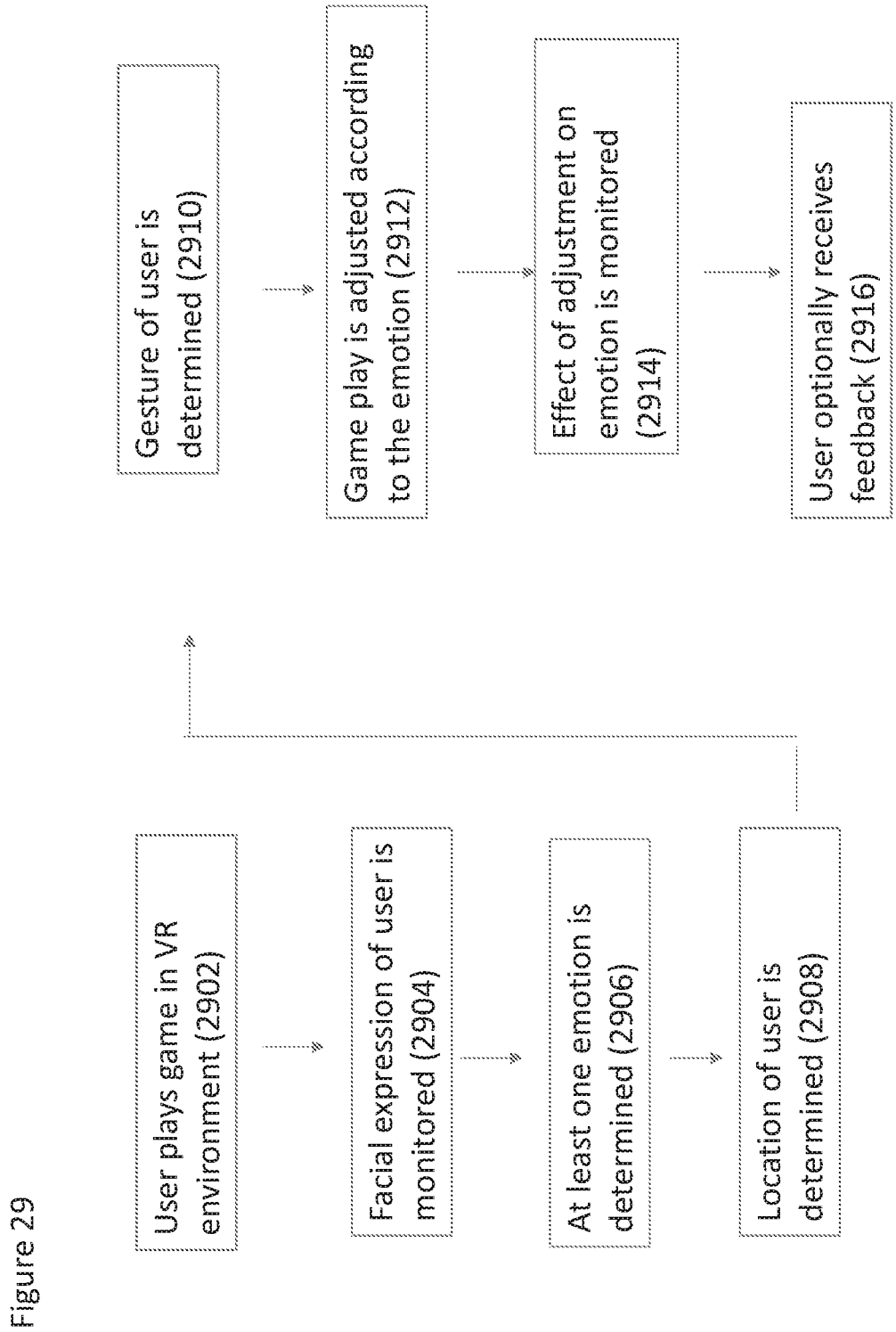
FIG. 29 shows a non-limiting example of a method for altering a game played in a VR environment for a user according to at least some embodiments.

FIG. 29 shows a non-limiting example of a method for altering a game played in a VR environment for a user according to at least some embodiments of the present disclosure. The game can be a single player or multi-player game, but is described in this non-limiting example with regard to game play of one user. Accordingly, at 2902, the user plays a game in the VR environment, for example, using a wearable device (as described in embodiments disclosed herein). While the user plays the game, at 2904, the facial expression(s) of the user are monitored. At least one emotion of the user may be determined, at 2906, by classifying at least one facial expression of the user (e.g., according to any one and/or another of the classification methods described herein).

The location of the user is preferably determined at 2908, while one or more gestures of the user are preferably determined at 2910. Game play is then determined according to the location of the user and/or the gesture(s) of the user.

At 2912, game play may be adjusted according to the emotion of the user, for example, by increasing the speed and/or difficulty of game play in response to boredom by the user. At 2914, the effect of the adjustment of game play on the emotion of the user may be monitored. At 2916, the user optionally receives feedback on game play, for example, by indicating that the user was bored at one or more times during game play. Optionally instead of a "game" any type of user activity may be substituted, including without limitation an educational process, a training process, an employment process (for example, for paid work for the user), a therapeutic process, a hobby and the like.

FIG. 30 shows a non-limiting example of a method for playing a game comprising actions combined with facial expressions in a VR environment according to at least some embodiments of the present disclosure. At 3002, the user enters the VR environment, for example, by donning a wearable device (as described herein) and/or otherwise initiating the VR application. For this non-limiting method, optionally, a tracking sensor is provided to track one or more physical actions of the user, such as one or more movements of one or more parts of the user's body. A non-limiting example of such a tracking sensor is the Kinect of Microsoft, or the Leap Motion sensor.

At 3004, the user may be instructed to perform at least one action combined with at least one facial expression. For example, a system avatar may be shown to the user in the VR environment that performs the at least one action combined with at least one facial expression (the instructions may also be shown as words and/or diagrams). At 3006, the user performs the at least one action combined with at least one facial expression. Optionally, a user avatar mirrors the at least one action combined with at least one facial expression as the user performs them, to show the user how his/her action and facial expression appear (3008). A system avatar demonstrates the at least one action combined with at least one facial expression (3010), for example, to demonstrate the correct way to perform the at least one action combined with at least one facial expression or to otherwise provide feedback to the user.

For example, if the user doesn't accurately/correctly copy the expression of the system avatar, then the system avatar repeats the expression. For example, the user may show an incorrect expression, or, in the case of a brain injury, can show an expression that indicates hemispatial neglect, by involving only part of the face in the expression. The user is then optionally encouraged to attempt the expression again on his/her own face. Similarly, the system avatar may repeat the action if the user does not perform the action correctly or completely (for example, stopping short of grasping an object).

At 3012, the ability of the user to copy one or more expressions is scored. In the above example of hemispatial neglect, such scoring can relate to the ability of the user to involve all relevant parts of the face in the expression. In another non-limiting example, a user with difficulty relating to or mirroring the emotions of others, such as a user with autism for example, can be scored according to the ability of the user to correctly copy the expression shown by the avatar.

Optionally, 3004-3010 are repeated, or 3004-3012 are repeated, at least once but optionally a plurality of times.

The game may, for example, be modeled on a game such as "Dance Central" (e.g., Xbox®) with the addition of facial expression. In such a game, a player views cues for certain dance moves and is required to immediately perform them. The player may be required to perform a dance move with an accompanying facial expression at the appropriate time. Such a game may include the added benefit of being entertaining, as well as being used for therapy and/or training of the user.

Figure 31:
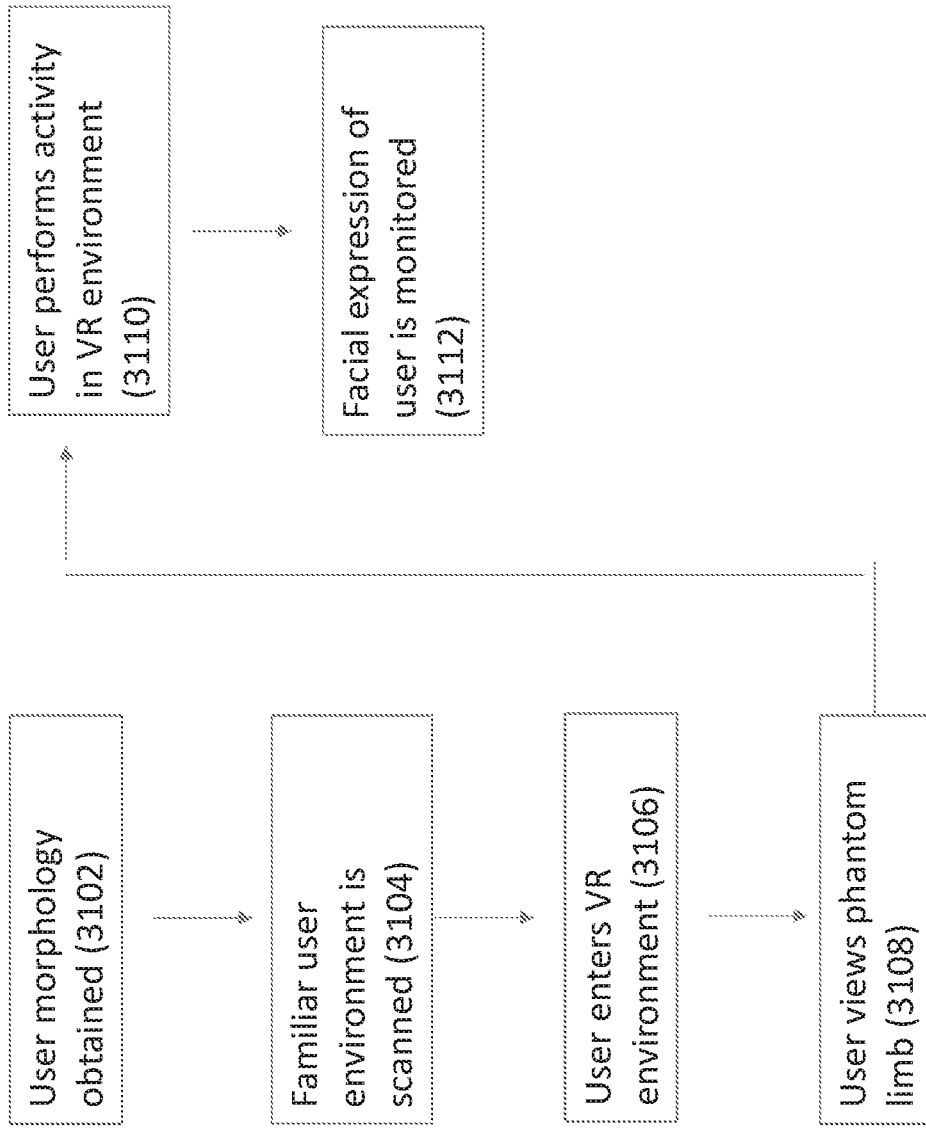
FIGS. 31 and 32 show two non-limiting example methods for applying VR to medical therapeutics according to at least some embodiments of the present disclosure.
Figure 32:
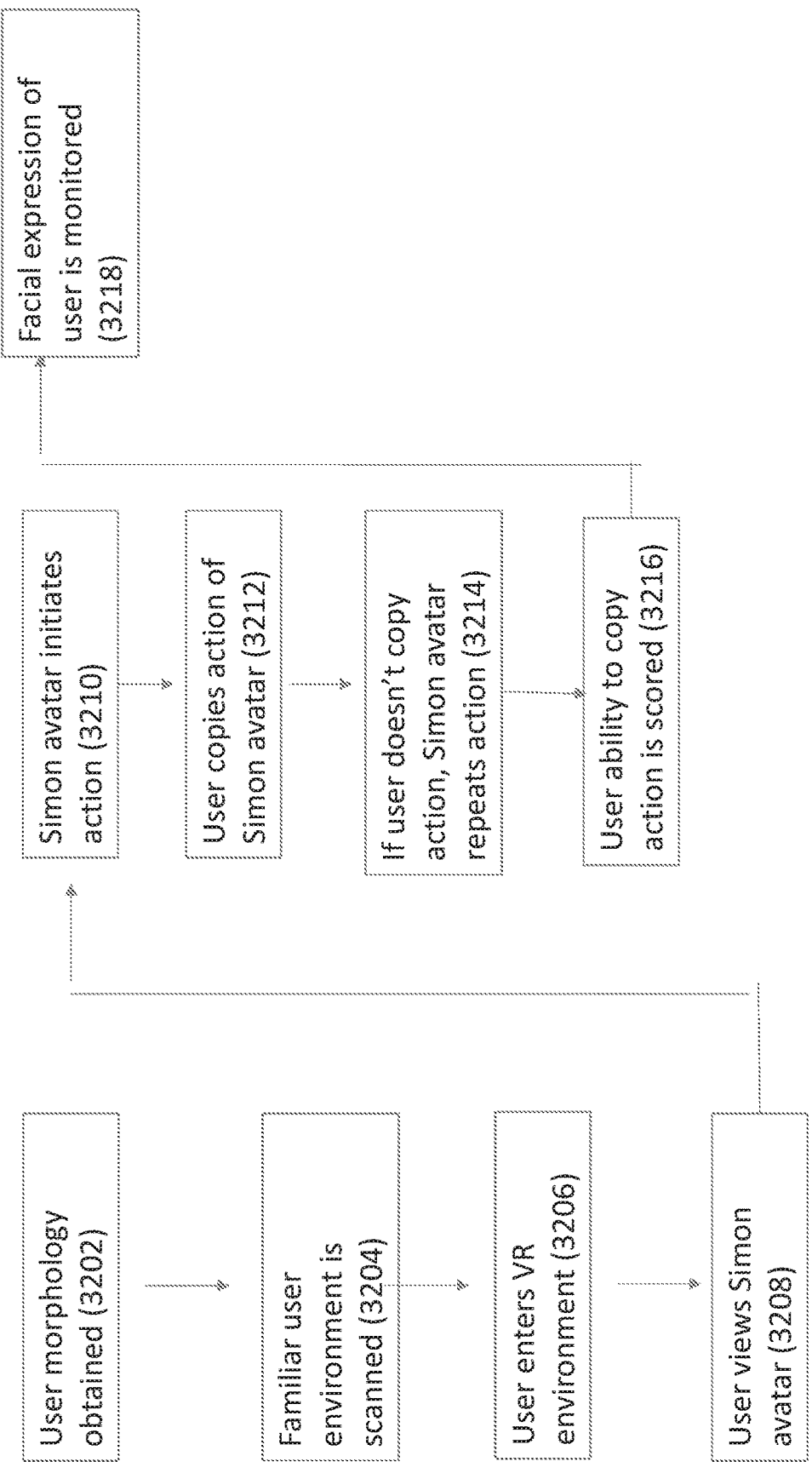

FIGS. 31 and 32 show non-limiting example methods for applying VR to medical therapeutics according to at least some embodiments of the present disclosure. FIG. 31 shows a method for applying VR to medical therapeutics—e.g., assisting an amputee to overcome phantom limb syndrome. At 3102, the morphology of the body of the user (i.e., an amputee) or a portion thereof, such as the torso and/or a particular limb, may be determined, through scanning (for example). Such scanning may be performed in order to create a more realistic avatar for the user to view in the VR environment, enabling the user when "looking down" in the VR environment, to see body parts that realistically appear to "belong" to the user's own body.

At 3104, optionally, a familiar environment for the user is scanned, where such scanning may be performed to create a more realistic version of the environment for the user in the VR environment. The user may then look around the VR environment and see virtual objects that correspond in appearance to real objects with which the user is familiar.

The user enters the VR environment (3106), for example, by donning a wearable device (as described herein) and/or otherwise initiating the VR application. For this non-limiting method, optionally, a tracking sensor may be provided to track one or more physical actions of the user, such as one or more movements of one or more parts of the user's body. A non-limiting example of such a tracking sensor is the Kinect of Microsoft, or the Leap Motion sensor, as previously described.

At 3108, the user "views" the phantom limb—that is, the limb that was amputated—as still being attached to the body of the user. For example, if the amputated limb was the user's left arm, then the user then sees his/her left arm as still attached to his/her body as a functional limb, within the VR environment. Optionally, in order to enable the amputated limb to be actively used, the user's functioning right arm can be used to create a "mirror" left arm. In this example, when the user moved his/her right arm, the mirrored left arm appears to move and may be viewed as moving in the VR environment. If a familiar environment for the user was previously scanned, then the VR environment can be rendered to appear as that familiar environment, which can lead to powerful therapeutic effects for the user, for example, as described below in regard to reducing phantom limb pain. At 3110, the ability to view the phantom limb is optionally and preferably incorporated into one or more therapeutic activities performed in the VR environment.

The facial expression of the user may be monitored while performing these activities, for example to determine whether the user is showing fatigue or distress (3112). Optionally, the user's activities and facial expression can be monitored remotely by a therapist ready to intervene to assist the user through the VR environment, for example, by communicating with the user (or being an avatar within the VR environment).

One of skill in the art will appreciate that the above described method may be used to reduce phantom limb pain (where an amputee feels strong pain that is associated with the missing limb). Such pain has been successfully treated with mirror therapy, in which the amputee views the non-amputated limb in a mirror (see, for example, the article by Kim and Kim, "Mirror Therapy for Phantom Limb Pain", Korean J Pain. 2012 October; 25(4): 272-274). The VR environment described herein can provide a more realistic and powerful way for the user to view and manipulate the non-amputated limb, and hence to reduce phantom limb pain.

FIG. 32 shows another non-limiting example method for applying VR to medical therapeutics according to at least some embodiments of the present disclosure, which can provide a therapeutic environment to a subject who has suffered a stroke, for example (e.g., brain injury). In this non-limiting example, the subject is encouraged to play the game of "Simon says" in order to treat hemispatial neglect. In the game of "Simon says", one player (which in this example may be a VR avatar) performs an action which the other players are to copy—but only if the "Simon" player says "Simon says (perform the action)". Of course, this requirement may be dropped for this non-limiting example, which is described only in terms of viewing and copying actions by the user. 3202-3206 may be similar to 3102-3106 of FIG. 31.

At 3208, the user views a Simon avatar, which is optionally another player (such as a therapist) or alternatively is a non-player character (NPC) generated by the VR system. Preferably the user perceives the Simon avatar as standing in front of him or her, and as facing the user. The user optionally has his or her own user avatar, which represents those parts of the user's body that is normally be visible to the user according to the position of the user's head and body. This avatar is referred to in this non-limiting example as the user's avatar.

At 3210, the Simon avatar can initiate an action, which the user is to mimic with the user's own body. The action includes movement of at least one body part and optionally includes a facial expression as well. At 3212, the user copies—or at least attempts to copy—the action of the Simon avatar. The user can see the Simon avatar, as well as those parts of the user's avatar that are expected to be visible according to the position of the user's head and body. Optionally, for 3210 and 3212, the user's avatar can also be placed in front of the user, for example, next to the Simon avatar. The user can then see both the Simon avatar, whose visual action(s) the user would need to copy, and how the user's body is actually performing those actions with the user's avatar. For this implementation, the user's avatar is rendered so as to be similar in appearance to the user, for example according to the previously described blend shape computation. Additionally or alternatively, the blend shape computation is used to create a more realistic Simon avatar, for example from a real life person as a role model.

At 3214, if the user fails to accurately/correctly copy the action of the Simon avatar, that avatar preferably repeats the action. This process may continue for a predetermined period of rounds or until the user achieves at least one therapeutic goal. At 3216, the ability of the user to perform such actions may be optionally scored, such scoring may include separate scores for body actions and facial expressions. At 3218, the facial expressions of the user while performing the actions can be monitored, even if the actions do not include a specific facial expression, so as to assess the emotions of the user while performing these actions.

Figure 33:
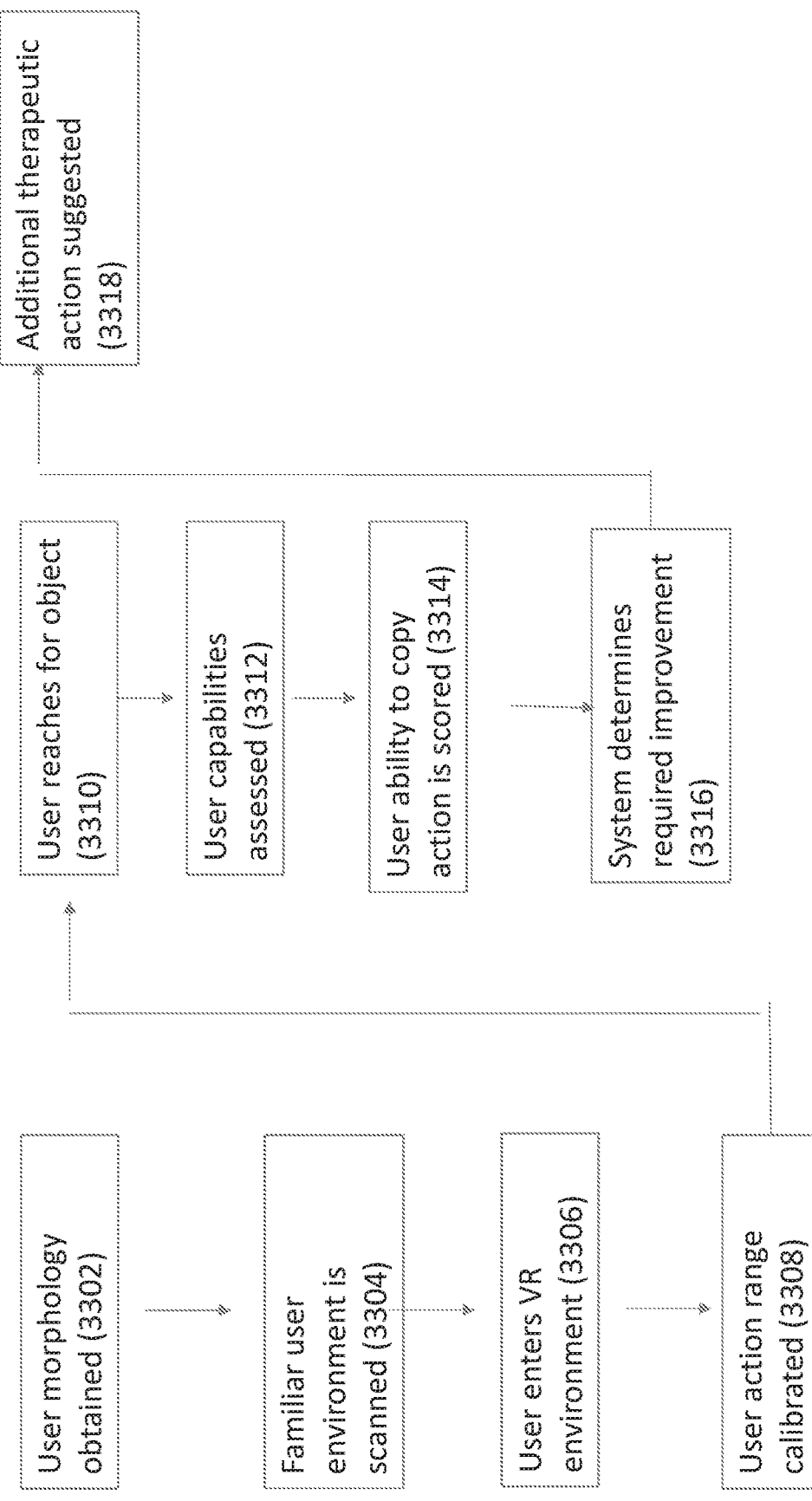
FIG. 33 shows a non-limiting example method for applying VR to increase a user's ability to perform ADL (activities of daily living) according to at least some embodiments.

FIG. 33 shows a non-limiting example method for applying VR to increase a user's ability to perform ADL (activities of daily living) according to at least some embodiments. 3302-3306 may be similar to 3102-3106 of FIG. 31.

In 3308, the user's action range is optionally calibrated as previously described, in order to determine the user's range of motion for a particular action or set of actions, such as for example for a particular gesture or set of gestures. For example, and without limitation, if the user is not capable of a normal action range, then the system may be adjusted according to the range of action of which the user is capable. In 3310, the user reaches for a virtual object in the VR environment, as a non-limiting example of an activity to be performed in the VR environment, for example as a therapeutic activity.

In 3312, the user's capabilities are assessed, for example in terms of being able to reach for and grasp the virtual object, or in terms of being able to perform the therapeutic task in the VR environment. Optionally, in 3314, the user is asked to copy an action, for example being shown by a system or "Simon" avatar. Such an action may be used to further determine the user's capabilities.

The system may then determine which action(s) need to be improved in 3316, for example in order to improve an activity of daily living. For example, and without limitation, the user may need to improve a grasping action in order to be able to manipulate objects as part of ADL. One or more additional therapeutic activities may then be suggested in 3318. The process may be repeated, with the user being assessed in his/her ability to perform ADL actions and also in terms of any improvement thereof.

Figure 34:
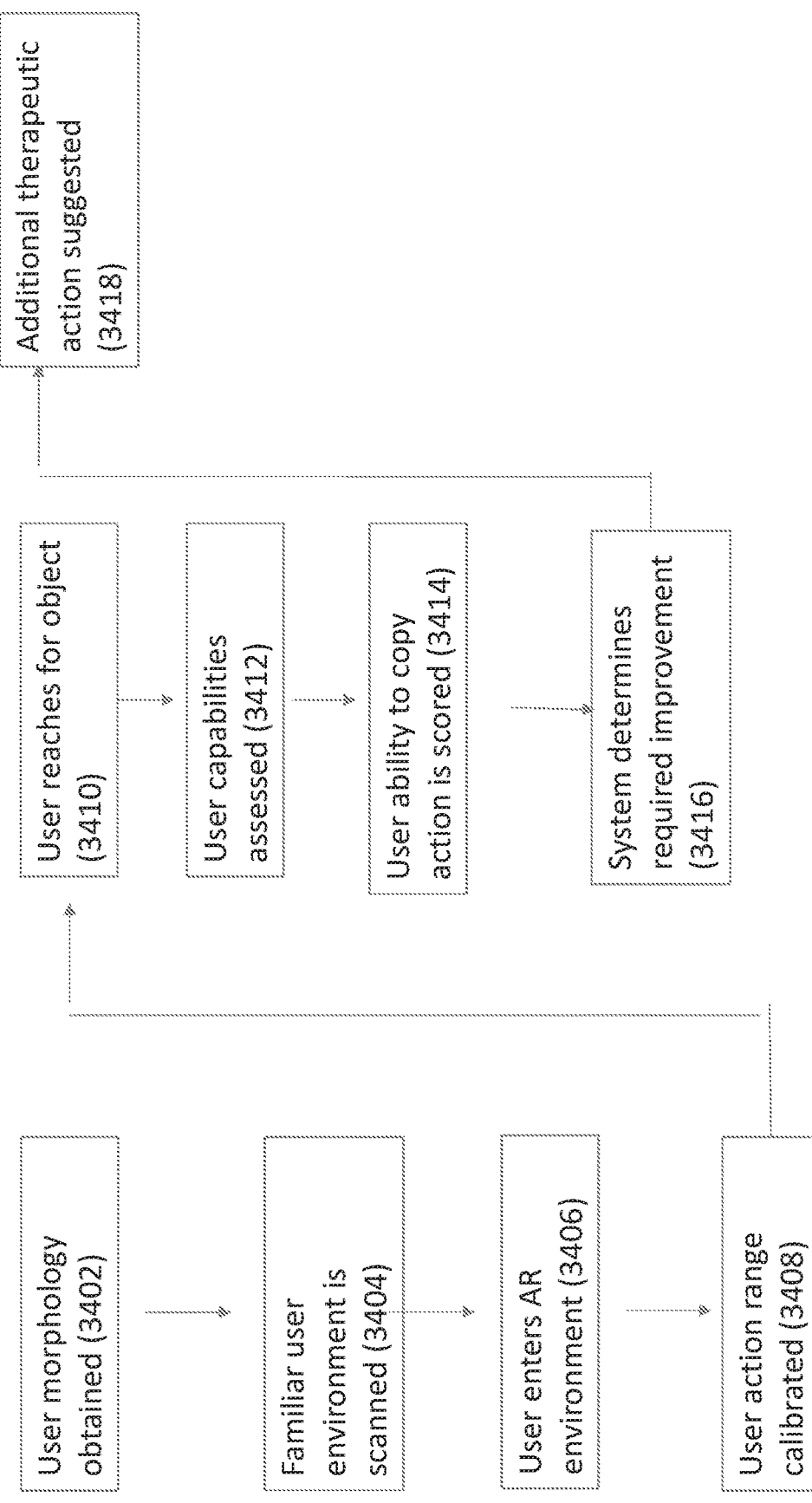
FIG. 34 shows a non-limiting example method for applying AR to increase a user's ability to perform ADL (activities of daily living) according to at least some embodiments.

FIG. 34 shows a non-limiting example method for applying AR to increase a user's ability to perform ADL (activities of daily living) according to at least some embodiments. 3402-3406 may be similar to 3102-3106 of FIG. 31.

In 3408, the user's action range is optionally calibrated as previously described, in order to determine the user's range of motion for a particular action or set of actions, such as for example for a particular gesture or set of gestures. For example, and without limitation, if the user is not capable of a normal action range, then the system may be adjusted according to the range of action of which the user is capable. In 3410, the user reaches for an actual object or a virtual object in the AR environment, as a non-limiting example of an activity to be performed in the AR environment, for example as a therapeutic activity. However, optionally the user reaches at least once for a virtual object and at least once for an actual object, in order to determine the capabilities of the user in terms of interacting with actual objects. Furthermore, by doing both, the user's abilities can be assessed in both the real and the virtual environments. Optionally and preferably, the AR environment is used for diagnosis and testing, while the VR environment is used for training and other therapeutic activities.

In 3412, the user's capabilities are assessed, for example in terms of being able to reach for and grasp the virtual and/or real object, or in terms of being able to perform the therapeutic task in the AR environment. Optionally, in 3414, the user is asked to copy an action, for example being shown by a system or "Simon" avatar. Such an action may be used to further determine the user's capabilities.

The system may then determine which action(s) need to be improved in 3416, for example in order to improve an activity of daily living. For example, and without limitation, the user may need to improve a grasping action in order to be able to manipulate objects as part of ADL. One or more additional therapeutic activities may then be suggested in 3418. The process may be repeated, with the user being assessed in his/her ability to perform ADL actions and also in terms of any improvement thereof.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and apparatuses which may further include any and all elements from any other disclosed methods, systems, and apparatuses, including any and all elements corresponding to disclosed facemask, virtual reality (VR), augmented reality (AR) and SLAM (and combinations thereof) embodiments (for example). In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

What is claimed is:

1. A facial muscle activity determination system for determining a underlying facial activity of a user comprising: an apparatus comprising a plurality of EMG (electromyography) electrodes configured for contact with the face of the user, said apparatus comprising an electrode interface; a mask which contacts an upper portion of the face of the user, said mask including an electrode plate attached to at least eight EMG electrodes and one reference electrode such that said EMG electrodes contact said upper portion of the face of the user, wherein said electrode interface is operatively coupled to said EMG electrodes and a hardware processor, said electrode interface for providing said EMG signals from said EMG electrodes to said hardware processor; and a computational device configured to receive a plurality of EMG signals from said EMG electrodes, and comprising said hardware processor and a memory having instructions thereon operable by said hardware processor to cause the computational device to: receive said EMG signals; process said EMG signals to form processed EMG signals and to determine at least one feature of said EMG signals in said processed EMG signals; determine a roughness of said processed EMG signals according to a defined window, said determining a roughness comprising calculating an EMG-dipole and determining a movement of said processed EMG signals according to said EMG-dipole, and performing a nonlinear transformation of said processed EMG signals to enhance high-frequency contents of said processed EMG signals; classify, using a classifier, an underlying muscle capability of said user according to said at least one feature of said EMG signals and according to said roughness.

2. The system of claim 1, wherein said defined window occurs within 100 ms.

3. The system of claim 1, wherein said processing said EMG signals to form processed EMG signals further comprises removing electrical power line interference (PLI).

4. The system of claim 1, wherein said classifier includes at least one of (1) a discriminant analysis classifier; (2) a Riemannian geometry classifier; (3) Naïve Bayes classifier, (4) a k-nearest neighbor classifier, (5) a RBF (radial basis function) classifier, (6) a Bagging classifier, (7) a SVM (support vector machine) classifier, (8) a node classifier (NC), (9) NCS (neural classifier system), (10) SCRLDA (Shrunken Centroid Regularized Linear Discriminate and Analysis), or (11) a Random Forest classifier.

5. The system of claim 4, wherein said discriminant analysis classifier is one of (1) LDA (linear discriminant analysis), (2) QDA (quadratic discriminant analysis), or (3) sQDA.

6. The system of claim 4, wherein said classifier is one of (1) Riemannian geometry, (2) QDA and (3) sQDA.

7. The system of claim 1, wherein said memory has instructions thereon to further cause the computational device to train, using a training system, said classifier, said training system configured to: receive a plurality of sets of processed EMG signals from a plurality of training users, each set including a plurality of groups of processed EMG signals from each training user, each group of processed EMG signals corresponding to a classified facial expression of said training user in relation to normal underlying muscle activity; determine a pattern of variance for each of said groups of processed EMG signals across said plurality of training users corresponding to each classified facial expression; and compare said processed EMG signals of the user to said patterns of variance to determine whether said underlying muscle activity of the user falls within an expected range of muscle capability.

8. The system of claim 1, wherein said at least eight electrodes comprise eight unipolar EMG electrodes.

9. The system of claim 8, wherein said processing said EMG signals to form processed EMG signals further comprises removing common mode interference of said unipolar electrodes.

10. The system of claim 3, wherein removing PLI comprises filtering said EMG signals with two series of Butterworth notch filters of order 1, a first series of filter at 50 Hz and all its harmonics up to the Nyquist frequency, and a second series of filter with cutoff frequency at 60 Hz and all its harmonics up to the Nyquist frequency.

11. The system of claim 9, wherein said memory has instructions thereon to further cause the computational device to: normalize said EMG signals after said determining said roughness, said normalizing said EMG signals including calculating a log normal of said EMG signals, normalizing a variance for each electrode, and calculating covariance across a plurality of users; train, using a training system before said classifying the facial expression, said classifier on a plurality of sets of processed EMG signals from a plurality of users, each set comprising a plurality of groups of processed EMG signals from each user, each group of processed EMG signals corresponding to a classified facial expression of said user, said training said classifier comprises determining a pattern of covariances for each of said groups of processed EMG signals across said plurality of users corresponding to each classified facial expression; and wherein said classifying comprises comparing said normalized EMG signals of the user to said patterns of covariance to determine whether said underlying muscle activity of the user falls within an expected range of muscle capability.

12. The system of claim 11, wherein said memory has instructions thereon to further cause the computational device to: determine a pattern of variance of each of said groups of processed EMG signals across said plurality of users corresponding to each classified facial expression, wherein said classifying comprises comparing said processed EMG signals of the user to said patterns of variance to determine whether said underlying muscle activity of the user falls within an expected range of muscle capability.

13. The system of claim 12, wherein said training further comprises determining a pattern of variance for each of said groups of processed EMG signals across said plurality of users corresponding to each classified facial expression; and wherein said classifying comprises comparing said processed EMG signals of the user to said patterns of variance to determine whether said underlying muscle activity of the user falls within an expected range of muscle capability.

14. The system of claim 11, wherein: said memory has instructions thereon to further cause the computational device to determine a level of said muscle capability according to a standard deviation of said roughness; said at least one feature of said EMG signals further comprising said level of said muscle capability, said roughness of said EMG-dipole being determined by determining a movement of said signals according to said EMG-dipole, said muscle capability being determined at least partially according to said movement of said processed EMG signals.

15. The system of claim 1, wherein said classifying further comprises determining a range of capabilities for the underlying muscles of a user; and detecting a deficit in one or more muscle capabilities.

16. The system of claim 15, wherein said detecting said deficit comprises detecting a deficit due to one or more of central nervous system damage or peripheral nervous system damage.

* * * * *